(12) United States Patent
Sekar et al.

(10) Patent No.: US 11,601,442 B2
(45) Date of Patent: Mar. 7, 2023

(54) SYSTEM AND METHOD ASSOCIATED WITH EXPEDIENT DETECTION AND RECONSTRUCTION OF CYBER EVENTS IN A COMPACT SCENARIO REPRESENTATION USING PROVENANCE TAGS AND CUSTOMIZABLE POLICY

(71) Applicants: The Research Foundation for the State University of New York, Albany, NY (US); The University of Illinois at Chicago, Chicago, IL (US)

(72) Inventors: Ramasubramanian Sekar, East Setauket, NY (US); Junao Wang, Centereach, NY (US); Md Nahid Hossain, Stony Brook, NY (US); Sadegh M. Milajerdi, Chicago, IL (US); Birhanu Eshete, Chicago, IL (US); Rigel Gjomemo, Chicago, IL (US); V. N. Venkatakrishnan, Chicago, IL (US); Scott Stoller, Setauket, NY (US)

(73) Assignees: THE RESEARCH FOUNDATION FOR THE STATE UNIVERSITY OF NEW YORK, Albany, NY (US); THE BOARD OF TRUSTEES OF THE UNIVERSITY OF ILLINOIS, Chicago, IL (US)

( * ) Notice: Subject to any disclaimer, the term of this patent is extended or adjusted under 35 U.S.C. 154(b) by 299 days.

(21) Appl. No.: 16/544,401

(22) Filed: Aug. 19, 2019

(65) Prior Publication Data
US 2020/0059481 A1 Feb. 20, 2020

Related U.S. Application Data

(60) Provisional application No. 62/719,197, filed on Aug. 17, 2018.

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC .................. H04L 63/1416; H04L 63/1425
(Continued)

(56) References Cited

U.S. PATENT DOCUMENTS

| 7,376,969 | B1 | 5/2008 | Njemanze |
| 8,682,812 | B1 * | 3/2014 | Ranjan ............... H04L 63/1425 706/12 |

(Continued)

FOREIGN PATENT DOCUMENTS

| CN | 103916406 B | 10/2017 |
| CN | 107248976 A | 10/2017 |

(Continued)

OTHER PUBLICATIONS

US 10,356,123 B2, 07/2019, Stolarz et al. (withdrawn)
(Continued)

*Primary Examiner* — Badri Narayanan Champakesan
(74) *Attorney, Agent, or Firm* — Hoffman & Baron, LLP

(57) ABSTRACT

A system associated with detecting a cyber-attack and reconstructing events associated with a cyber-attack campaign, is disclosed. The system performs various operations that include receiving an audit data stream associated with cyber events. The system identifies trustworthiness values in a portion of data associated with the cyber events and assigns provenance tags to the portion of the data based on the identified trustworthiness values. An initial visual representation is generated based on the assigned provenance tags to the portion of the data. The initial visual representation is condensed based on a backward traversal of the initial visual (Continued)

representation in identifying a shortest path from a suspect node to an entry point node. A scenario visual representation is generated that specifies nodes most relevant to the cyber events associated with the cyber-attack based on the identified shortest path.

A corresponding method and computer-readable medium are also disclosed.

24 Claims, 30 Drawing Sheets
(10 of 30 Drawing Sheet(s) Filed in Color)

(58) Field of Classification Search
USPC .......................................................... 726/23
See application file for complete search history.

(56) References Cited

U.S. PATENT DOCUMENTS

| | | | |
|---|---|---|---|
| 8,881,288 B1* | 11/2014 | Levy ................... | G06F 21/577 |
| | | | 709/225 |
| 9,195,829 B1 | 11/2015 | Goradia et al. | |
| 9,208,335 B2 | 12/2015 | Wu et al. | |
| 9,626,359 B1 | 4/2017 | Sun | |
| 9,672,355 B2* | 6/2017 | Titonis ................ | H04W 12/12 |
| 9,900,332 B2 | 2/2018 | Muddu et al. | |
| 10,135,848 B2 | 11/2018 | Muddu et al. | |
| 10,291,645 B1* | 5/2019 | Frantzen .............. | G06F 21/554 |
| 10,764,313 B1 | 9/2020 | Mushtaq | |
| 10,812,516 B2 | 10/2020 | Chenette et al. | |
| 10,992,700 B2 | 4/2021 | Stolarz et al. | |
| 11,323,464 B2 | 5/2022 | Jakobsson | |
| 11,363,057 B1 | 6/2022 | Talbot et al. | |
| 11,392,689 B2 | 7/2022 | Nguyen et al. | |
| 11,423,146 B2 | 8/2022 | Li et al. | |
| 2010/0212013 A1* | 8/2010 | Kim .................... | H04L 63/1416 |
| | | | 709/224 |
| 2010/0235918 A1 | 9/2010 | Mizrahi et al. | |
| 2011/0264608 A1 | 10/2011 | Gonsalves et al. | |
| 2013/0312092 A1 | 11/2013 | Parker | |
| 2015/0332054 A1* | 11/2015 | Eck ..................... | G06F 21/55 |
| | | | 726/25 |
| 2016/0044057 A1 | 2/2016 | Chenette et al. | |
| 2017/0223040 A1* | 8/2017 | Ikuse .................. | G06F 21/552 |
| 2017/0230389 A1 | 8/2017 | Cochenour | |
| 2017/0289187 A1 | 10/2017 | Noel et al. | |
| 2017/0310546 A1* | 10/2017 | Nair .................... | H04L 41/0654 |
| 2017/0346839 A1* | 11/2017 | Peppe ................. | G06F 21/552 |
| 2018/0124098 A1* | 5/2018 | Carver ................ | G06N 20/00 |
| 2018/0337939 A1* | 11/2018 | Agarwal ............. | G06F 16/26 |
| 2018/0375892 A1 | 12/2018 | Ganor | |
| 2019/0121979 A1* | 4/2019 | Chari .................. | G06N 20/00 |
| 2020/0067971 A1 | 2/2020 | Chiu et al. | |
| 2020/0311262 A1 | 10/2020 | Nguyen et al. | |
| 2020/0327225 A1 | 10/2020 | Nguyen et al. | |
| 2021/0058395 A1 | 2/2021 | Jakobsson | |
| 2021/0234882 A1 | 7/2021 | Lee | |
| 2022/0070202 A1 | 3/2022 | Busany et al. | |
| 2022/0174088 A1 | 6/2022 | Zorlular et al. | |
| 2022/0217163 A1 | 7/2022 | Frey et al. | |
| 2022/0222338 A1 | 7/2022 | Gupta | |
| 2022/0224724 A1 | 7/2022 | Bazalgei et al. | |
| 2022/0263855 A1 | 8/2022 | Engelberg et al. | |

FOREIGN PATENT DOCUMENTS

| | | |
|---|---|---|
| CN | 108076040 A | 5/2018 |
| CN | 108140057 A | 6/2018 |
| CN | 108965349 A | 12/2018 |
| CN | 109313687 A | 2/2019 |
| CN | 109347808 A | 2/2019 |
| EP | 4047870 A1 | 8/2022 |
| KR | 20170122548 A | 11/2017 |
| KR | 20190086346 A | 7/2019 |
| KR | 20210014155 A | 2/2021 |
| WO | 2010105184 A2 | 9/2010 |
| WO | 2015087333 A1 | 6/2015 |
| WO | 2018071356 A1 | 4/2018 |

OTHER PUBLICATIONS

Stoiz, Adam, et al., "INformation Fusion Engine for Real-Time Decision-Making (INFERD): A Perceptual System for Cyber Attack Tracking," in 2007 10th International Conference on Information Fusion, Quebec, pp. 1-8. IEEE, 2007.

APT notes. https://github.com/kbandla/APTnotes. Accessed: Nov. 10, 2016.

Hutchins, et al. "Intelligence-Driven Computer Network Defense Informed by Analysis of Adversary Campaigns and Intrusion Kill Chains." Leading Issues in Information Warfare & Security Research 1.1 (2011): 80. http://www.lockheedmartin.com/content/dam/lockheed/data/corporate/documents/LM-White-paper-Intel-Driven-Defense.pdf. Accessed: Nov. 10, 2016.

Miandiant: Exposing One of China's Cyber Espionage Units. https://www.fireeye.com/content/dam/fireeye-www/services/pdfs/mandiant-apt1-report.pdf. Accessed: Nov. 10, 2016.

Neo4j graph databse. https://neo4j.com/.

Network-x graph database. https://networkx.github.io/.

Titan Graph Database, https://tital.thinkaurelius.com/.

Albanesius. "Target Ignored Data Breach Warning Signs." PC Magazine (2014). http://www.pcmag.com/article2/0,2817,2454977,00.asp.2014 [online: accessed Feb. 16, 2017.

Arzt, Steven, et al. "Flowdroid: Precise Context, Flow, Field, Object-Sensitive and Lifecycle-Aware Taint Analysis for Android Apps." SIGPLAN Notices. vol. 49. No. 6. ACM, 2014.

Bates, et al. "Trustworthy Whole-System Provenance for the Linux Kernel." 24th {USENIX} Security Symposium ({USENIX} Security 15). 2015.

Bell, et al. Secure Computer Systems: Mathematical Foundations. Technical Report No. MTR-2547-vol. 1. Mitre Corp Bedford MA, 1973.

Berlin, et al. "Malicious Behavior Detection Using Windows Audit Logs." Proceedings of the 8th ACM Workshop on Artificial Intelligence and Security. ACM, 2015.

Biba. K "Integrity Considerations for Secure Computer Systems." In Technical Report ESD-TR-76-372, USAF Electronic Systems Division, Hanscom Air Force Base, Bedford, MA, 1977.

Braun, et al. "Issues in Automatic Provenance Collection." International Provenance and Annotation Workshop. Springer, Berlin, Heidelberg, 2006.

Debar, et al. "Aggregation and Correlation of Intrusion-Detection Alerts." International Workshop on Recent Advances in Intrusion Detection. Springer, Berlin, Heidelberg, 2001.

Denning. "An Intrusion-Detection Model." IEEE Transactions on Software Engineering 2 (1987): 222-232.

Ediger, et al. "Stinger: High Performance Data Structure for Streaming Graphs." 2012 IEEE Conference on High Performance Extreme Computing. IEEE, 2012.

Efstathopoulos, et al. "Labels and Event Processes in the Asbestos Operating System." ACM SIGOPS Operating Systems Review. Vol. 39. No. 5. ACM, 2005.

Feng, et al. "Anomaly Detection Using Call Stack Information." 2003 Symposium on Security & Privacy, IEEE, 2003.

Forrest, et al. "A Sense of Self for Unix Processes." Proceedings 1996 IEEE Symposium on Security & Privacy. IEEE, 1996.

Gao, et al. "Gray-Box Extraction of Execution Graphs for Anomaly Detection." Proceedings of the 11th ACM Conference on Computer and Communications Security. ACM, 2004.

Gehani, et al. "SPADE: Support for Provenance Auditing in Distributed Environments." In Proceedings of the 13th International Middleware Conference. Springer-Verlag New York, Inc., 2012.

Goel, et al. "Forensix: A Robust, High-Performance Reconstruction System." In 25th IEEE International Conference on Distributed Computing Systems Workshops. IEEE, 2005.

Goel, et al. "The Taser Intrusion Recovery System." ACM SIGOPS Operating Systems Review. Vol. 39. No. 5. ACM, 2005.

(56) References Cited

OTHER PUBLICATIONS

Kemerlis, et al. "Libdft: Practical Dynamic Data Flow Tracking for Commodity Systems." ACM SIGPLAN Notices. vol. 47. No. 7. ACM, 2012.
King, et al. "Backtracking Intrusions." ACM SIGOPS Operating Systems Review. vol. 37. No. 5. ACM, 2003.
King, et al. "Enriching Intrusion Alerts Through Multi-Host Causality." In NDSS. 2005.
Ko, et al. "Execution Monitoring of Security-Critical Programs in Distributed Systems: A Specification-Based Approach." Proceedings. 1997 IEEE Symposium on Security & Privacy (Cat No. 97CB36097). IEEE, 1997.
Krohn, et al. "Information Flow Control for Standard OS Abstractions." ACM SIGOPS Operating Systems Review. vol. 41. No. 6. ACM, 2007.
Kruegel, et al. "Intrusion Detection and Correlation: Challenges and Solutions." vol. 14. Springer Science & Business Media, 2004.
Kruegel, et al. "Anomaly Detection of Web-Based Attacks." Proceedings of the 10th ACM Conference on Computer and Communications Security. ACM, 2003.
Lee, et al. "High Accuracy Attack Provenance Via Binary-Based Execution Partition." In NDSS. 2013.
Lee, et al. "A Data Mining Framework for Building Intrusion Detection Models." Proceedings of the 1999 IEEE Symposium on Security & Privacy (Cat. No 99CB36344). IEEE, 1999.
Li, et al. "Usable Mandatory Integrity Protection for Operating Systems." 2007 IEEE Symposium on Security & Privacy (SP'07). IEEE, 2007.
Loscocco, et al. "Meeting Critical Security Objectives With Security-Enhanced Linux." Proceedings of the 2001 Ottawa Linux Symposium. 2001.
Luk, et al. "Pin: Building Customized Program Analysis Tools with Dynamic Instrumentation." ACM SIGPLAN Notices. vol. 40. No. 6. ACM, 2005.
Lunt, et al. "Real-Time Intrusion Detection Expert System." (IDES). SRI International. Computer Science Laboratory, 1992.
Ma, et al. "Protracer: Towards Practical Provenance Tracing by Alternating Between Logging and Tainting." In NDSS. 2016.
Mao, et al. "Combining Discretionary Policy with Mandatory Information Flow in Operating Systems." In Transactions on Information and System Security (TISSEC) ACM 2011.
McColl, et al. "A Performance Evaluation of Open Source Graph Databases." In Proceedings of the First Workshop on Parallel Programming for Analytics Applications. ACM, 2014.
Mlot. "Neiman Marcus Hackers Set off Nearly 60K Alarms". https://www.pcmag.com/news/320948/neiman-marcus-hackers-set-off-nearly-60k-alarms, http://www.pcmg.com/article2/0,2817,2453873,00.asp,2014 [Online: accessed Feb. 16, 2017.
Muniswamy-Reddy, et al. "Provenance-Aware Storage Systems." In USENIX Annual Technical Conference, General Track. 2006.
Newsome, et al. "Dynamic Taint Analysis for Automatic Detection, Analysis, and Signature Generation of Exploits on Commodity Software." NDSS. vol. 5. 2005.
Ning, et al. "Learning Attack Strategies from Intrusion Alerts." Proceedings of the 10th ACM Conference on Computer and Communications Security. ACM, 2003.
Noel, et al. "Correlating Intrusion Events and Building Attack Scenarios Through Attack Graph Distances." 20th Annual Computer Security Applications Conference. IEEE, 2004.
Pohly, et al. "Hi-Fi: Collecting High-Fidelity Whole-System Provenance." Proceedings of the 28th Annual Computer Security Applications Conference. ACM, 2012.
Qin, et al. "Statistical Causality Analysis of Infosec Alert Data." International Workshop on Recent Advances in Intrusion Detection. Springer, Berlin, Heidelberg, 2003.
Sekar, et al. "A Fast Automaton-Based Method for Detecting Anomalous Program Behaviors." Proceedings 2001 IEEE Symposium on Security & Privacy. S&P 2001.

Shu, et al. "Unearthing Stealthy Program Attacks Buried in Extremely Long Execution Paths." Proceedings of the 22nd ACM SIGSAC Conference on Computerand Communications Security. ACM, 2015.
Sun, et al. "Expanding Malware Defense by Securing Software Installations." International Conference on Detection of Intrusions and Malware, and Vulnerability Assessment. Springer, Berlin, Heidelberg, 2008.
Sun, et al. "Practical Proactive Integrity Preservation: A Basis for Malware Defense." 2008 IEEE Symposium on Security & Privacy (S&P 2008). IEEE, 2008.
Singh, Saurabh, et al., "A Comprehensive Study on APT Attacks and Countermeasures for Future Networks and Communications: Challenges and Solutions," The Journal of Supercomputing 75, No. 8 (2019): 4543-4574.
Liu, Zhijie, et al., "Correlating Multi-Step Attack and Constructing Attack Scenarios Based on Attack Pattern Modeling," in 2008 International Conference on Information Security and Assurance (ISA 2008), pp. 214-219. IEEE, 2008.
Ren, Xueshuang, et al., "DMNAED: A Novel Framework Based on Dynamic Memory Network for Abnormal Event Detection in Enterprise Networks," In PAKDD 2019: Advances in Knowledge Discovery and Data Mining, pp. 574-586, Springer, Cham, 2019.
Anderson, Evan E., et al., "Enterprise Information Security Strategies," Computers & Security 27, No. 1-2 (2008): 22-29.
Milajerdi, Sadegh M., et al., "Holmes: Real-Time APT Detection Through Correlation of Suspicious Information Flows," in 2019 IEEE Symposium on Security and Privacy (SP), pp. 1137-1152. IEEE, 2019.
Stotz, Adam, et al., "INformation Fusion Engine for Real-Time Decision-Making (INFERD): A Perceptual System for Cyber Attack Tracking," in 2007 10th International Conference on Information Fusion, Quebec, pp. 1-8. IEEE, 2007.
Liu, Jianyi, et al., "Multi-Step Attack Scenarios Mining Based on Neural Network and Bayesian Network Attack Graph," ICAIS: Artificial Intelligence and Security, pp. 62-74. Springer, Cham, 2019.
Navarro, Julio, et al., "OMMA: Open Architecture for Operator-Guided Monitoring of Multi-step Attacks," EURASIP Journal on Information Security, 2018, No. 6 (2018).
Li, Zhitang, et al., "Real-Time Correlation of Network Security Alerts," in IEEE International Conference on e-Business Engineering (ICEBE'07), pp. 73-80, IEEE, 2007.
Matthew, Sunu, et al., "Real-Time Multistage Attack Awareness Through Enhanced Intrusion Alert Clustering," in MILCOM 2005-2005 IEEE Military Communications Conference, pp. 1801-1806., vol. 3, IEEE, 2005.
Gao, Peng, et al., "SAQL: A Stream-Based Query System for Real-Time Abnormal System Behavior Detection," in 27th USENIX Security Symposium (USENIX Security 18), pp. 639-656, 2018.
Hossain, Md Nahid, et al., "SLEUTH: Real-Time Attack Scenario Reconstruction from COTS Audit Data," in 26th USENIX Security Symposium (USENIX Security 17), pp. 487-504. 2017.
Hideshima, Yusuke, et al., "STARMINE: A Visualization System for Cyber Attacks," in Proceedings of the 2006 Asia-Pacific Symposium on Information Visualization vol. 60, pp. 131-138. Australian Computer Society, Inc., Jan. 2006.
Virvilis, Nikos, et al., "Trusted Computing vs. Advanced Persistent Threats: Can a Defender Win This Game?" in 2013 IEEE 10th International Conference on Ubiquitous Intelligence and Computing and 2013 IEEE 10th International Conference on Autonomic and Trusted Computing, pp. 396-403. IEEE, 2013.
Sze, et al. "Towards More Usable Information Flow Policies for Contemporary Operating Systems." In Proceedings of the 19th ACM Symposium on Access Control Models and Technologies; pp. 75-84, ACM, 2014.
Sze, et al. "A Portable User-Level Approach for System-Wide Integrity Protection." Proceedings of the 29th Annual Computer Security Applications Conference. ACM, 2013.
Sze, et al. "Provenance-Based Integrity Protection for Windows." Proceedings of the 31st Annual Computer Security Applications Conference. ACM, 2015.

(56) References Cited

OTHER PUBLICATIONS

Uppuluri, et al. "Experiences with Specification-Based Intrusion Detection." International Workshop on Recent Advances in Intrusion Detection. Springer, Berlin, Heidelberg, 2001.

Wagner, et al. "Intrusion Detection Via Static Analysis." Proceedings 2001 IEEE Symposium on Security and Privacy S&P 2001. IEEE, 2000.

Wang, et al. "A Graph Based Approach Toward Network Forensics Analysis." ACM Transactions on Information and System Security (TISSEC) 2008.

Warrender, et al. "Detecting Intrusions Using System Calls: Alternative Data Models." Proceedings of the 1999 IEEE Symposium on Security & Privacy, IEEE, 1999.

Xu, et al. "Taint-Enhanced Policy Enforcement: A Practical Approach to Defeat a Wide Range of Attacks." USENIX Security Symposium. 2006.

Zeldovich, et al. "Making Information Flow Explicit in HiStar." Proceedings of the 7th Symposium on Operating Systems Design and Implementation. USENIX Association, 2006.

\* cited by examiner

ProvenanceTags

Trustworthiness (t-tag)

Benign Authentic: Data from sources trusted to be benign; authenticity can be verified.

Benign: Data from sources believed to be benign;

Unknown: No good basis to trust this source.

Code Vs Data Trustworthiness
- Processes have two t-tags: code t-tag and data t-tag
- Separation (a) aids detection and (b) speeds analysis by focusing on fewer root causes Confidentiality (c-tag)

Secret: Highly sensitive, e.g., / etc / shadow

Sensitive: Disclosure can have significant security impact.

Private: Loss may not pose a direct security threat.

Public: Widely available, e.g., on public web sites

FIG. 1E

Attack Detection Using Provenance Tags

Approach: Focus on *motive* and *means*

Motive: Does an act advance attacker's high-level objectives?
- ☐ Deploy and run attacker code
- ☐ Replace/modify important files, e.g., /etc/passwd, ssh keys,...
- ☐ Steal and exfiltrate sensitive data Means: Can the attacker control the action?
- ☐ Is the process performing the action trustworthy?

FIG. 1F

Attack Detection Policies

SYSTEM AND METHOD ASSOCIATED WITH EXPEDIENT DETECTION AND RECONSTRUCTION OF CYBER EVENTS IN A COMPACT SCENARIO REPRESENTATION USING PROVENANCE TAGS AND CUSTOMIZABLE POLICY

CROSS-REFERENCE TO RELATED APPLICATION(S)

The present non-provisional application claims the benefit of U.S. Provisional Application No. 62/719,197, filed on Aug. 17, 2018, the specification of which is incorporated by reference herein, in its entirety for all purposes.

STATEMENT OF GOVERNMENT LICENSE RIGHTS

This invention was made with government support under grant number DARPA: FA8650-15-C-7561 awarded by The Defense Advanced Research Projects Agency (DARPA) of the United States Department of Defense. The government has certain rights in the invention.

FIELD OF THE DISCLOSURE

The present disclosure relates to a system and method associated with expedient detection and reconstruction of cyber events extracted from audit data in order to generate a compact scenario representation. Even more particularly, the present invention relates to a novel system and method that implements a novel framework for real-time detection, reconstruction and identification of germane cyber events using provenance tags and customizable tag-based security policies. The present system and method further implements novel attack detection and impact analysis methodologies for creation of compact visual graphs that assists an analyst in the identification of the most pertinent events and the source in a targeted cyber-security attack, with the capability to customize threshold values used in the analysis of the respective cyber events obtained from audit data streams in an enterprise.

BACKGROUND

In the technical field of cyber security, safeguarding computer network infrastructures and platforms, which are considered even more expansive and complex nowadays, and protecting them against malicious activity, has proven to be quite arduous for experts and analysts in the field of cyber security.

A cyberattack is a deliberate exploitation of computer systems, technology-dependent enterprises and networks. Cyberattacks often use malicious code to alter computer code, logic or data, resulting in disruptive consequences that can compromise data and lead to cybercrimes, such as information and identity theft. A cyberattack is also known as a computer network attack (CNA).

Organizations seeking to safeguard their assets, trade secrets, other intellectual property, protect their customer identities, avoid expensive and any unwanted business disruptions, and the like, need to do more than just monitor logs and network flow data. Many organizations create millions, or even billions, of events per day, and distilling that data down to a short list of priority offenses has proven to be a formidable and unattainable end goal.

Further, there is currently present in the field of enterprise hosts, a rapid escalation in targeted cyber-attacks ("Enterprise Advanced and Persistent Threats (APTs)") conducted in many instances by skilled adversaries. By combining social engineering techniques (for example, spear-phishing) with advanced exploit techniques, these adversaries routinely by-pass widely-deployed software protections in place, such as ASLR, DEP and sandboxes. As a result, enterprises have come to rely increasingly on second-line defenses, for example, intrusion detection systems (IDS), security information and event management (SIEM) tools, identity and access management tools, and application firewalls. While these tools are generally useful, they typically generate a vast amount of information, making it difficult for a security analyst to distinguish truly significant attacks—as it comes down to the proverbial task of finding the "needle-in-a-haystack" from background noise.

In particular, these known tools provide a set of platform technologies that for example, can inspect network flow data to find and classify valid hosts and servers (assets) on the network, tracking the applications, protocols, services and ports they use. The product(s) collects, stores and analyzes this data, and performs real-time event correlation for use in threat detection and compliance reporting and auditing, protocols that enterprises may implement to combat this problem. Using these known platform(s), billions of events and flows can be reduced and prioritized into a handful of actionable offenses, according to their business impact. While SIEM-based approaches provide significant advantages, the rules are either hard coded or parameterized with a threat feed with concrete indicators of compromise (IoCs). Thus, typically these solutions are able to detect only known threats. However, for any unknown threats, e.g., detected by means of a behavior based rule, such solutions are unable to identify root cause and effectively assist the security analyst. Moreover, these systems can present implementation challenges, as they often rely on manual curation of any semi-structured and unstructured threat feeds, i.e., natural language text, by means of security professionals reading threat advisories and extracting IoCs.

Moreover, in many instances, such analysts exhibit and/or lack the tools to "connect the dots," i.e., piece together fragments of an attack campaign that span multiple applications or hosts and extend over a long time period. Instead, significant manual effort and expertise are needed to piece together numerous alarms emitted by multiple security tools. Hence, many attack campaigns are missed for weeks or even months until discovery occurs, and extensive damage is already accomplished by the intruders.

Security Operations Center (SOC) analysts who use such systems are confronted with a large number of offenses every day. The majority of their time is spent to understand and analyze these offenses, confirm their validity, find related information, and attempt to determine and identify appropriate actions to resolve them. Typically, SOC analysts attempt to find relevant cybersecurity intelligence reports and/or vulnerability reports for the target offenses from various data sources. Many of these SOC analysts, mostly use web search engines to query and manually browse threat and security intelligence Internet services. Given the widely-disparate information sources, an analyst often is faced with many, often conflicting, data sources and hypotheses to read and process to draw an informed and accurate conclusion of the history of the intruder in a particular attack underway or an imminently occurring attack.

In order to effectively contain advanced attack campaigns, there is a need for a new generation of tools that not only assist with detection, but also produce a compact summary of the causal chains that summarize an attack. Such a summary would enable an analyst to quickly ascertain whether there is a significant intrusion, understand how the attacker initially breached security, and determine the projected or actual impact of the attack.

While the problem of piecing together the causal chain of events leading to an attack was first explored in Back-tracker (Samuel T King and Peter M Chen. Backtracking intrusions, In SOSP. ACM, 200325, 26), subsequent research improved on the precision of the dependency chains constructed by Backtracker. However, these works operate in a purely forensic setting and therefore do not deal with the above-described challenges of performing the analysis in real-time.

Hence, it is desirable to implement a real-time attack scenario reconstruction system that can alert analysts in real-time about an ongoing campaign or an imminent campaign, and provide them with a compact, visual summary of the activity in minutes or even seconds of the attack. This would enable a timely response before enormous damage is inflicted on the subject enterprise, for example, recent breaches at Target, British Airways®, Captial One®, Evercore and Neiman Marcus went undetected, in some cases even for months.

Hence, it is further desirable to implement a real-time attack scenario reconstruction system that can alert analysts in real-time about an ongoing campaign or an imminent campaign, by tackling the current problem of event storage and analysis, facing Real-time attack detection and scenario reconstruction systems. Real-time attack detection and scenario reconstruction poses the additional challenges over a purely forensic analysis, such as the mentioned event storage and analysis. It is problematic in real-time attack detection and scenario reconstruction, to effectively sort and process the millions of records from event streams efficiently and simultaneously have algorithms sift through this data in a matter of seconds.

Another problem facing analysts over purely forensic analysis, is the prioritizing of entities for analysis. Hence, it is desirable to assist the analyst, who is typically overwhelmed with the volume of colossal audit data, to be able to prioritize and quickly "zoom in" on the most likely attack scenario.

Yet, another problem facing cyber analysts over purely forensic analysis, is succinctly summarizing the attack scenario, starting from the attacker's entry point that can be effectively identified, and identifying the impact of the entire campaign on the system. Hence, it is further desirable to assist the analyst by implementation of a system associated with succinct real-time attack scenario reconstruction that can effectively prioritize colossal amounts of events and quickly "zoom in" on the most likely and/or realistic attack scenario.

Yet further, another problem facing cyber analysts as compared to purely forensic analysis, is dealing with common usage scenarios. Hence, it is further desirable to assist the analyst by implementation of a system and method associated with succinct real-time attack scenario reconstruction that can cope with normal, benign activities that may resemble activities commonly observed during attacks, for example, innocuous software downloads.

Hence, it is further desirable to assist the cyber analyst, by implementation of a system and method associated with real-time attack scenario reconstruction that can effectively prioritize and quickly "zoom in" on the most likely attack scenario and determine the point of entry and/or source of a cyber-attack expediently.

It is yet further desirable to assist the cyber analyst, by implementation of a system and method associated with real-time attack scenario reconstruction that can effectively and efficiently reason through the data, with an alternate hypothesis as well.

It is yet further desirable to implement a novel cyber security system associated with real-time attack scenario reconstruction that can effectively contain advanced attack campaigns, detect well prior to extensive damage and/or in advance of such damage, and produce a compact summary of the causal chains that summarize an attack. Such a novel summary enable an analyst to quickly ascertain whether there is a significant intrusion, understand how the attacker initially breached security, and determine the impact of the attack.

It is yet further desirable to implement a novel cyber security system associated with real-time attack scenario reconstruction that can eliminate the vast numbers of false alarms produced by prior systems, and prevent analysts from failing to flag real attacks resulting from this flurry of false alarms produced by prior systems.

It is yet further desirable to implement a novel cyber security system associated with real-time attack scenario reconstruction that not only can detect pieces of an attack campaign, but can also "connect the dots" intelligently to aid the analyst in more accurate identifications of realistic breaches with elimination of large volume of false positives of prior systems, with a proven much lower rate of false positives.

It is yet further desirable to implement a novel cyber security system associated with real-time attack scenario reconstruction that eliminates reliance on manual analysis, expertise and insight, by implementation of a tag-based approach for identifying subjects, objects and events, most likely involved in attacks, including assessment of trustworthiness and sensitivity of respective data and processes, with the ability to prioritize and focus the analysis, thereby avoiding tedious, time consuming, and unreliable incident investigation(s).

It is yet further desirable to implement a novel cyber security system associated with real-time attack scenario reconstruction that eliminates reliance on manual analysis, expertise and insight, by implementation of novel algorithms that leverage tags for root-cause identification and impact analysis of major cyber events, providing the ability to prioritize and focus the analysis for cyber analysts, thereby avoiding tedious, time consuming, and unreliable incident investigation(s).

It is yet further desirable to implement a novel cyber security system associated with real-time attack scenario reconstruction including implementation of novel algorithms including distance threshold(s), shortest path analysis and/or edge weight analysis, that leverage tags to permit analysis of millions of events and produce an attack scenarios graph with as little as a hundred of events, representing five orders of magnitude reduction in event volume and related analysis, thereby avoiding tedious, time consuming, ineffective and unreliable incident investigation(s).

It is yet further desirable to implement a novel cyber security system associated with real-time attack scenario reconstruction including a customizable policy framework for tag initialization and propagation in order to enable fine-tuned detection and cyber analysis techniques that avoid false positives, and in particular, in cases where benign applications exhibit similar behaviors that resemble attacks.

Hence, it is yet further desirable to implement a novel cyber security system associated with real-time attack scenario reconstruction including implementation of compact data structures for objects and subjects as well as events (which often outnumbers objects and subjects) by storing events inside subjects using unique data structures, thereby eliminating the need for subject-to-event pointers, or the need for event identifiers, which results in enormous memory usage that strains resources. Even further, such system and method implements graph data structures, in which respective dependencies are stored, in order to support fast detection and real-time analysis for analysts with the ability to store millions of events using a small amount of memory (for example, in a few hundred MBs) as compared to enormous usage of memory that strain system resources used by prior systems.

Embodiments of the disclosure further described herein are directed to a novel cyber security system and method associated with real-time attack scenario reconstruction that can detect attacks with low false positive rates; automatically identify the entry point of the attack and its impact; and present the entire attack in the form of a novel compact visual representation and related analysis that captures the key steps involved in the attack thereby eliminating false positives and effectively containing potential damage to an enterprise when encountered by such cyber-attacks.

SUMMARY OF THE INVENTION

In accordance with an embodiment or aspect, the present technology is directed to a system and method associated with detecting a cyber-attack and reconstructing events associated with a cyber-attack campaign. The system and method comprises a memory configured to store instructions; and a processing device coupled to the memory. The processing device executes a real-time attack scenario reconstruction application with the instructions stored in memory, wherein the application is configured to perform various operations.

In accordance with an embodiment or aspect, disclosed is a system and method that includes the various operations that include receiving an audit data stream associated with cyber events. The system and method further includes identifying trustworthiness values in a portion of data associated with the cyber events. The system and method further includes assigning provenance tags to the portion of the data based on the identified trustworthiness values. The system and method yet further includes generating an initial visual representation based on the assigned provenance tags to the portion of the data. The system and method yet further includes condensing the initial visual representation based on a backward traversal of the initial visual representation in identifying a shortest path from a suspect node to an entry point node. The system and method yet further includes generating a scenario visual representation that specifies nodes most relevant to the cyber events associated with the cyber-attack based on the identified shortest path.

In accordance with certain other aspects or embodiments or aspects, the system and method includes further operations, which are provided hereinbelow respectively. Accordingly, in certain aspects or embodiments, the system and method further includes condensing the initial visual representation based on a forward traversal of the initial visual representation in identifying the shortest path from the suspect mode to the entry point node. In yet a further disclosed embodiment, the system and method further includes generating a scenario visual representation that specifies nodes most relevant to the cyber events associated with the cyber-attack based on multiple identified shortest paths. In yet a further disclosed embodiment, the system and method further includes the provenance tags further comprise trustworthiness tags. In yet a further disclosed embodiment, the system and method further includes the provenance tags further comprise confidentiality tags assigned to the portion of the data based on identified confidentiality values. In yet a further disclosed embodiment, the system and method further includes the portion of the data comprises one or more of objects and subjects. In yet a further disclosed embodiment, the system and method further includes that the objects are referenced within events using an index into a per-subject table of object identifiers. In yet a further disclosed embodiment, the system and method further includes the shortest path in the initial visual representation is determined based on a shortest weighted path. In yet a further disclosed embodiment, the system and method further includes that the shortest weighted path is determined based on the weight of an edge that connects two nodes and their assigned provenance tags. In yet a further disclosed embodiment, the system and method further includes that the shortest path is determined based on a predetermined distance threshold value. In yet a further disclosed embodiment, the system and method further includes that the provenance tags are further assigned to the portion of the data based on identified sensitivity values.

In accordance with yet another disclosed embodiment, a computer readable medium is disclosed storing instructions that, when executed by a real-time attack scenario reconstruction processing device, performs various operations. The various disclosed operations include receiving an audit data stream associated with cyber events. Further disclosed operations include identifying trustworthiness values in a portion of data associated with the cyber events. Yet a further disclosed operation includes assigning provenance tags to the portion of the data based on the identified trustworthiness values. Yet a further disclosed operation includes generating an initial visual representation based on the assigned provenance tags to the portion of the data. Yet a further disclosed operation includes condensing the initial visual representation based on a backward traversal of the initial visual representation in identifying a shortest path from a suspect node to an entry point node. Yet a further disclosed operation includes generating a scenario visual representation that specifies nodes most relevant to the cyber events associated with the cyber-attack based on the identified shortest path.

Yet a further disclosed operation includes condensing the initial visual representation based on a forward traversal of the initial visual representation in identifying the shortest path from the suspect mode to the entry point node. Yet a further disclosed operation includes generating a scenario visual representation that specifies nodes most relevant to the cyber events associated with the cyber-attack based on multiple identified shortest paths.

In certain aspects or embodiments, the computer readable medium further includes the provenance tags further comprise trustworthiness tags. In certain aspects or embodiments, further disclosed is the provenance tags further comprise confidentiality tags assigned to the portion of the data based on identified confidentiality values. Yet a further disclosed embodiment includes the portion of the data comprising one or more of objects and subjects. Yet a further disclosed embodiment is that the objects are referenced within events using an index into a per-subject table of object identifiers. Yet a further disclosed embodiment is that the shortest path in the initial visual representation is determined based on a shortest weighted path. Yet a further disclosed embodiment includes that the shortest weighted path is determined based on the weight of an edge that connects two nodes and their assigned provenance tags. Yet a further disclosed embodiment includes that the shortest path is determined based on a predetermined distance threshold value. Yet a further disclosed embodiment includes the provenance tags are further assigned to the portion of the data based on identified sensitivity values.

These and other purposes, goals and advantages of the present application will become apparent from the following detailed description read in connection with the accompanying drawings.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

Some embodiments or aspects are illustrated by way of example and not limitation in the figures of the accompanying drawings in which:

FIG. 1E provides an overview illustration outlining exemplary provenance tags implemented in accordance with certain aspects or embodiments of the disclosed system.

FIG. 1F provides an overview illustration outlining the aspects of attack detection as associated with the focus on motive and/or means of the attacker, in accordance with certain aspects or embodiments of the disclosed system.

Figure 1:
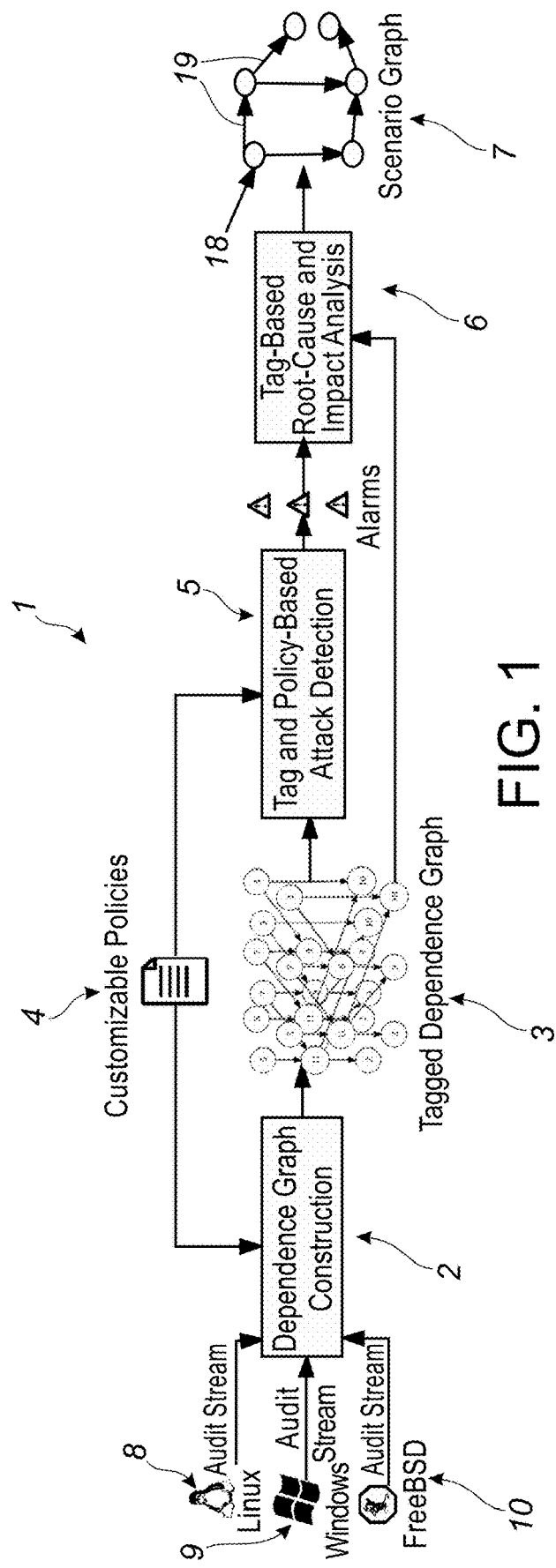
FIG. 1 provides an overview of exemplary components of the disclosed system and method associated with real-time attack scenario reconstruction, in accordance with an embodiment.

It should be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The present disclosure relates to a system and method associated with expedient detection and reconstruction of cyber events extracted from audit data in order to generate a compact scenario representation. Even more particularly, the present invention relates to a novel system and method that implements a novel framework for real-time detection, reconstruction and identification of germane cyber events using provenance tags and customizable security policies. The present system and method further implements novel attack detection and impact analysis methodologies for creation of compact visual graphs that enables an analyst in the expedient identification of the most pertinent attack steps and the source in a targeted cyber-security attack, with the capability to customize threshold values used in the analysis of the respective cyber events obtained from audit data streams of an enterprise.

More particularly, the disclosed system and method implements real-time detection of attacks and respective event data, including attack reconstruction from COTS audit logs. The disclosed system and method implements a novel main memory graph data model and a rich tag-based policy framework that facilitates the analysis of a cyber-attack with both improved efficient and targeted precision in identifying a source. The disclosed system was evaluated on large datasets from at least three (3) major OSes under attack by an independent red team, efficiently re-constructing all the attacks with very few errors.

In particular, the disclosed system and method provides for real-time reconstruction of attack scenarios on an enterprise host. In order to meet the scalability and real-time needs of the current above-described problems, disclosed is a novel platform-neutral, main-memory based, dependency graph abstraction of audit-log data. Further disclosed is a system and method associated with real-time attack scenario reconstructions from COTS audit data by implementation of efficient, tag-based techniques for attack detection and reconstruction thereof, including source identification and impact analysis. Further disclosed are methods to reveal the big picture of attacks by construction of compact, visual graphs of attack steps using a novel graph data structure, with compact data structures being used for objects and subjects, and further for events (which more often outnumbers objects and subjects in data sets), thereby eliminating subject-to-event pointers or the need for event identifiers.

In accordance with an embodiment, it is generally the case that attacks at least initially originate from outside the enterprise. For example, an adversary can initiate the attack by hijacking a web browser through externally supplied malicious input, by plugging in an infected USB memory stick, or by supplying a zero-day exploit to a network server running within the enterprise. It is generally the case that the adversary has not implanted persistent malware on the host before commencement of monitoring the system of the enterprise. It is also generally the case that the OS kernel and audit systems are considered trustworthy at the outset of usage.

FIG. 1 provides an overview of exemplary components of the disclosed system and method associated with real-time attack scenario reconstruction, in accordance with an embodiment. In particular, in certain embodiments or aspects, the disclosed system and method is OS-neutral, and currently supports Operating Systems (OS) such as, for example, Microsoft Windows®, Linux and FreeBSD. Other contemplated generations of operating systems are also supported and/or capable of being supported by respective adaptation of the disclosed system and method thereto. As shown in FIG. 1, audit data from these Operating System(s) (for example, audit stream—Linux 8, audit stream—Windows® 9, and/or audit stream—Free BSD 10 is processed into a platform-neutral graph representation, where vertices and/or nodes 18 represent subjects (processes) and objects (files, sockets), and edges 19 (for example, shown as directional arrows between nodes and/or vertices 18) denote audit events (e.g., operations such as read, write, execute, and connect). The scenario graph 7 (also shown in example scenario graphs in FIGS. 6-12) serves as the basis for attack detection as well as causality analysis and scenario reconstruction. The system initially processes the streams (8, 9, 10) and initially generates a tagged dependence graph 3 using dependence graph construction module 2. Customizable policies 4 may be implemented in certain aspects or embodiments.

In particular, a customizable policy framework 4 for tag initialization and propagation may be implemented. A sensible default policy may be used but such policy can also be overridden to accommodate behaviors specific to a particular OS or application. This feature enables tuning of respective detection and analysis techniques in order to avoid false positives in cases where benign applications exhibit behaviors that resemble attacks. Policies also enable an analyst to test "alternate hypotheses" of attacks, by reclassifying what is considered trustworthy or sensitive and re-running the analysis in an alternate scenario. If an analyst suspects that some behavior is the result of an attack, policies can also be used to capture these behaviors, and the analysis can then be re-run in order to discover the cause and impact. Since the disclosed system and method can process and analyze audit data at a rate of tens of thousands of times faster than the rate at which it is generated, efficient, parallel, real-time testing of alternate hypotheses is thus, possible.

The disclosed system and method addresses the challenge of efficient event storage and analysis, with the development of a novel compact main-memory dependence graph representation. Graph algorithms on main memory representation can be orders of magnitude faster than on-disk representations, which proves to be an important factor in achieving real-time analysis capabilities. In experiments, the disclosed system was able to process 79 hours worth of audit data from a FreeBSD system in 14 seconds, with a main memory usage of 84 MB. This performance represents an analysis rate that is 20K times faster than the rate at which the data was generated, which is a significant improvement in processing than prior systems. Hence, space-efficient in-memory dependence graph representations can be generated using the dependence graph construction component 2 shown in FIG. 1.

Further disclosed is the implementation of a novel tag-based approach for identifying subjects, objects and events that are most likely involved in attacks by generating a tagged dependence graph component 3 shown in FIG. 1. Tags enable the system to prioritize and focus the analysis, thereby addressing the challenge mentioned above to assist the analyst who is usually overwhelmed with the volume of data, to prioritize and quickly "zoom in" on the most likely attach scenario. Tags encode an assessment of trustworthiness and sensitivity of data (i.e., objects) as well as processes (subjects). This assessment is based on data provenance derived from audit logs. In this sense, tags derived from audit data are similar to coarse-grain information flow labels. The analysis can further support finer-granularity tags as well, e.g., fine-grained taint tags, if they are available.

In certain aspects or embodiments, taint detection checks will highlight specific security risks primarily associated with web sites which are attacked using techniques such as for example, SQL injection or buffer overflow attack approaches. Generally, a variable that can be modified by an outside user (for example a variable set by a field in a web form) poses a potential security risk. If that variable is used in an expression that sets a second variable, that second variable is now also suspicious. The taint checking tool proceeds variable by variable until it has a complete list of all variables, which are potentially influenced by outside input. If any of these variables are used to execute dangerous commands (such as direct commands to a SQL database or the host computer OS), the taint checker warns that the program is using a potentially dangerous tainted variable. The computer programmer may then re-design the software program to create a safe wall around the dangerous input.

Tags are described in greater detail hereinbelow along with their application to attack detection, in accordance with certain aspects or embodiments of the disclosed system and method.

Hence, such tag and policy-based attack detection component 5 can be implemented and accomplished as shown in FIG. 1. In certain embodiments, novel algorithms are implemented that leverage tags for root-cause identification and impact analysis. Starting from alerts or alarms generated by the tag and policy-based attack detection component 5 shown in FIG. 1, a backward analysis algorithm can be implemented in certain embodiments, that follows the dependencies in the graph to identify the sources of the attack. Starting from the sources of the attack as determined during the backward analysis, then a full impact analysis of the actions of the adversary using a forward search is performed in order to generate a more refined sub-graph of the initial provenance graph, that includes objects and subjects affected by the attack and the analyst can then review. Essentially, the starting points for the backward analysis are the alarms generated by the detection policies in component 5.

Figure 6:
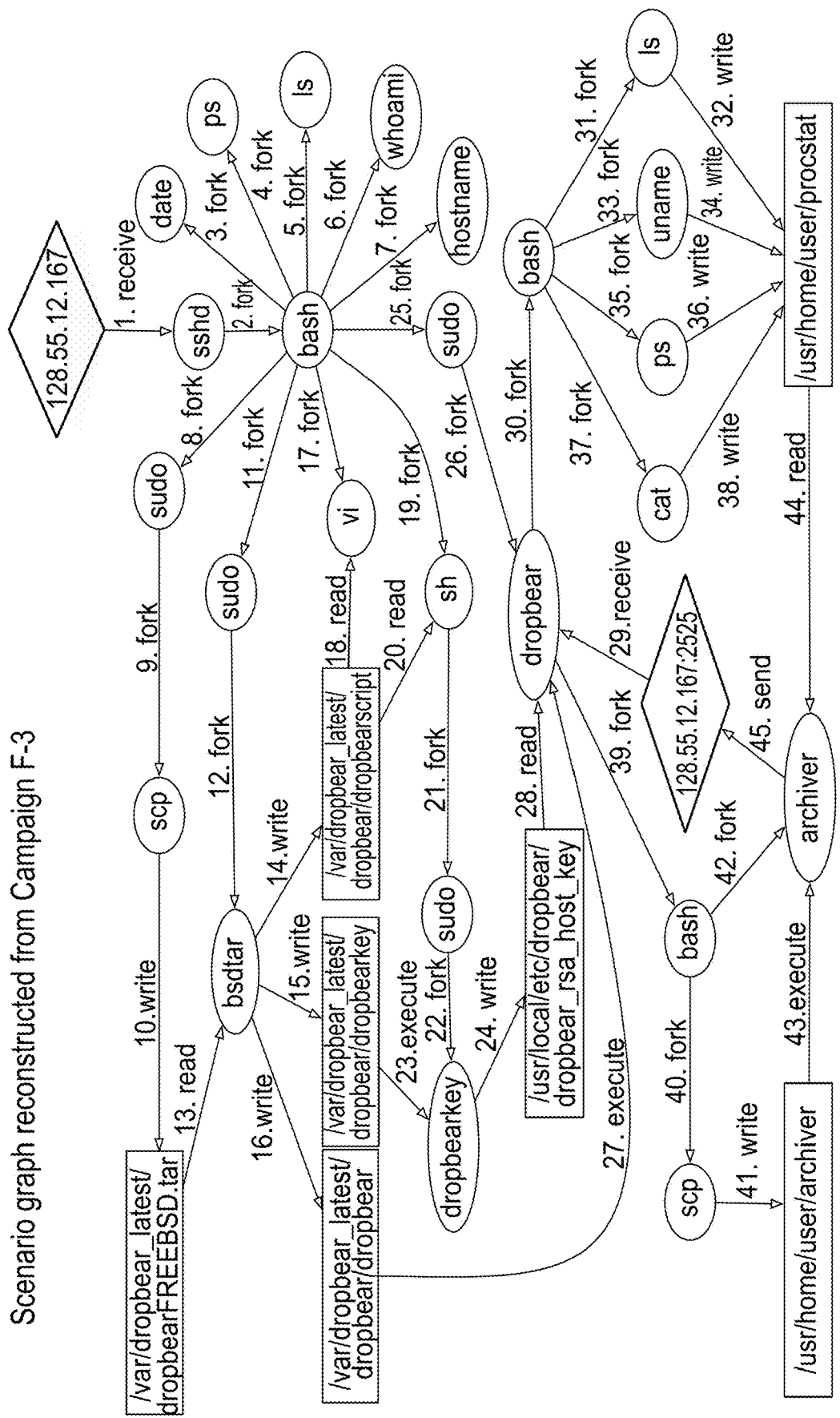
FIG. 6 provides an illustration of a scenario graph representation reconstructed from campaign F-3, in accordance with an embodiment of the disclosed system and method.

In certain embodiments, one or more of several criteria for pruning these searches are implemented in order to produce a compact graph. Also, a number of transformations may be implemented in certain embodiments, that can further simplify the compact graph and produce a graph that visually captures the attack in a succinct and semantically meaningful way, for example, the graph generated as shown in FIG. 6, which is accomplished in certain embodiments during implementation of the scenario graph component 7 as shown in FIG. 1.

Experiments show that the disclosed tag-based approach is very effective. For example, the system in certain embodiments can analyze 38.5 M events and produce an attack scenario graph with for example, just 130 events, representing five orders of magnitude reduction in event volume. Following such tag and policy-based attack detection 5, the system generates alarms about potential and may perform tag-based root-cause and impact analysis as shown in component 6 of FIG. 1.

Dependence graphs are used to trace back to the root causes of intrusions in component 6 (tag-based root-cause and impact analysis) shown in FIG. 1. These graphs are built by correlating events collected by a logging system and by determining the causality among system entities, to help in forensic analysis after an attack is detected.

Hence, starting from alerts produced by the attack detection component 5 shown in FIG. 1, the backward analysis algorithm follows the dependencies in the graph to identify the sources of the attack. Starting from the sources, the system performs a full impact analysis in component 6 of FIG. 1, with respect to the actions of the adversary using a forward search. Several criteria for pruning these searches in order to produce a compact graph may be implemented. The disclosed analysis procedures leverage the results from principled tag-based detection methods and therefore are inherently more precise than known systems such as back-tracker. For example, if an attack deliberately writes into a well-known log file, Backtracker's search heuristics may remove the log file from the final graph, whereas the current system implements tag-based analysis that will prevent that node from being pruned away.

Hence, the system is able to perform real-time reconstruction of APT (Advanced Persistent Threat) campaign from audit logs and provide compact visual summary of the campaign. The major challenges remain data volume with hundreds of millions to billions of events per day to track. Generally, only a small fraction of these events are actually attacks, perhaps one in a million so it becomes finding a "needle in a haystack" and further avoid being swamped in false positives. In addition, connecting the dots in which linking successive steps of an APT campaign also becomes a challenge. The disclosed system is able to overcome many of these challenges by applying various novel techniques described in greater detail hereinbelow. APTs combine both social engineering (for example, spearphishing) with advanced exploits. Enterprises are often forced to rely on second-line defenses such as intrusion detection systems (IDS), security incident and event management (SIEM) programs, which have proven to result in many APT campaigns remaining undetected even for months. The difficulty of spotting the minuscule fraction of real attacks within vast quantities of data emitted by these systems and further connecting the dots to stitch isolated steps together to generate a larger campaign are addressed by the disclosed system and method.

A typical attack campaign lifecycle includes an initial compromise, the malware gaining foothold, some lateral movement, and high value asset acquisition. An initial compromise relies on vulnerability exploitation and/or social engineering. Attackers may accomplish their attacks via phishing or malicious website attacks while exploiting vulnerabilities and/or browsers of the victim. Next, gaining a foothold requires attackers to deploy and execute custom malware. Hence, network scans and malware propagation occurs and essentially, can result in a high value asset acquisition by infecting code and/or databases. Often times, the attack steps are linked by information flows that can be tracked in accordance with one or more embodiments or aspects of the disclosed system and method.

One of the novel features of the disclosed system and method that facilitates reconstruction of COTS audit data and generating of a compact representation is the implementation of a Main Memory Dependency Graph shown in components 2 and 3 of FIG. 1 or example graph shown in FIG. 6. Such main memory dependency graph eliminates vast amounts of memory usage otherwise required to achieve compactness of graphing of such events and is achieved without loss of any important information.

In fact, during experimental evaluations, the disclosed system and method was able to process, in a matter of seconds, audit logs containing tens of millions of events generated during the engagement; successfully detect and reconstruct the details of these attacks, including their entry points, activities in the system, and exfiltration points; filter away extraneous events, achieving very high reductions rates in the data (up to 100K times), thus providing a clear semantic representation of the attacks containing almost no noise from other activities in the system; and further achieve low false positive and false negative rates.

In order to support such results with fast detection and real-time analysis, the system stores dependencies in a graph data structure. One possible option for storing this graph is a graph database. However, the performance of popular databases such as Neo4J or Titan is limited during implementation of several graph algorithms unless main memory is large enough to hold most of data. Moreover, the memory use of general graph databases is too high to achieve the results of the disclosed system and method. Even STINGER and NetworkX, two graph databases optimized for main-memory performance, use about 250 bytes and 3 KB, respectively, per graph edge. The number of audit events reported on enterprise networks can easily range in billions to tens of billions per day, which will require main memory in the range of several terabytes. In contrast, the disclosed system and method provide a much more space-efficient dependence graph design that uses in certain aspects or embodiments, only about 10 bytes per edge. In one experiment, we were able to store 38M events in just 329 MB of main memory.

In accordance with certain aspects or embodiments, the disclosed dependency graph, for example as shown in FIG. 6, is a per-host data structure. The dependency graph can reference entities on other hosts, but is optimized for the common case of intra-host reference. The graph represents two types of entities: subjects, which represent processes, and objects, which represent entities such as files, pipes, and network connections. Subject attributes include process id (pid), command line, owner, and tags for code and data. Objects attributes include name, type (file, pipe, socket, etc.), owner, and tags. Events reported in the audit log are captured using labeled edges between subjects and objects or between two subjects. For brevity and illustrative purposes, UNIX names such as read, connect, and execve are used for events.

A number of techniques were developed to reduce storage requirements for the disclosed dependence graph. In certain aspects or embodiments, whenever possible, 32-bit identifiers are implemented instead of 64-bit pointers. This reduction of size of identifiers to 32-bits, permits a single host's dependence graph to contain for example, 4 billion objects and subjects. The number of objects/subjects in one of the largest data sets used, was a few orders of magnitude smaller than this number.

While the disclosed system and method, emphasizes compact data structures for objects and subjects, compactness of events is even more important: events generally outnumber objects and subjects by about two orders of magnitude in the largest data set. Moreover, in certain aspects or embodiments, the ratio of events to objects+ subjects increases with time. For this reason, an ultra-compact representation for events was developed that can use as little as 6 bytes of storage for many events, and is further described below in connection with FIG. 2A.

In certain embodiments, events are stored inside subjects, thereby eliminating a need for subject-to-event pointers and/or the need for event identifiers. The representation of events uses variable-length encoding, so that in the typical case, they can use just 4 bytes of storage, but when needed, they can use for example, 8, 12, or 16 bytes. Most events operate on an object and have a timestamp. Since a per-subject order of events is maintained, the disclosed system dispenses with microsecond granularity for timestamps, and instead opting for millisecond resolution. In addition, the system stores only relative time(s) since the last event on the same subject allows for 16-bits for the timestamp in the typical case. It is noted that longer intervals are supported by recording for example, a special "timegap" event that can represent millions of years.

Furthermore, objects are referenced within events using an index into a per-subject table of object identifiers. These indices are analogous to file descriptors—they tend to have small values, since most subjects use a relatively small number of objects. This enables object references to be represented using for example, 8 bits or less. In addition, event names are encoded for frequently occurring events (e.g., open, close, read and write) using for example, 3 bits or less. This leaves the system with several bits for storing a summary of event argument information, while still being within 32 bits.

The disclosed system can navigate from subjects to objects using the event data stored within subjects. However, forensic analysis also requires the system to navigate from objects to subjects. For this purpose, the system needs to maintain event information within objects using object-event records. Object event records are maintained only for a subset of events: specifically, events such as read and write that result in a dataflow. Other events (for example, open) are not stored within objects. Object-event records are further reduced or shrunk, by storing a reference to the corresponding subject-event record, instead of duplicating information.

In certain aspects or embodiments, as with subject-event records, the system implements a variable-length encoding for object-event records that enables them to be stored for example, in just 16 bits, in a common case. In order to illustrate how this is possible during implementation, objects tend to be operated on by a single subject at a time. Typically, this subject performs a sequence of operations on the object, e.g., an open followed by a few reads or writes, and then a close.

By allowing object-event records to reuse the subject from their respective predecessor, the disclosed system can avoid the need for storing subject identifiers in most records. Next, the system permits object-event records to store a relative index for event records within subjects. Two successive event records within a subject that operate on the same object are likely to be relatively close to each other, for example, with tens or hundreds of events in-between. Therefore, the relative index stored with the object-event record can be for example, 12 bits or less in most cases, thus allowing these records to be, for example, 16 bits or less in the typical case.

This design thus allows the system to store bidirectional timestamped edges in as little as 6 bytes (for example, 4 bytes for a subject-event record and 2 bytes for an object-event record). In experiments with larger data sets, the total memory use of the system is within 10 bytes per event on average.

The variable length encoding allows the disclosed system to represent full information about important (but rare) events, such as rename, chmod, execve, and so on. Therefore, compactness is achieved without losing any important information. Although such encoding slows down access, access times are still typically less than 100 ns, which is many orders of magnitude faster than disk latencies that dominate random access on disk-resident data structures.

Figure 2A:
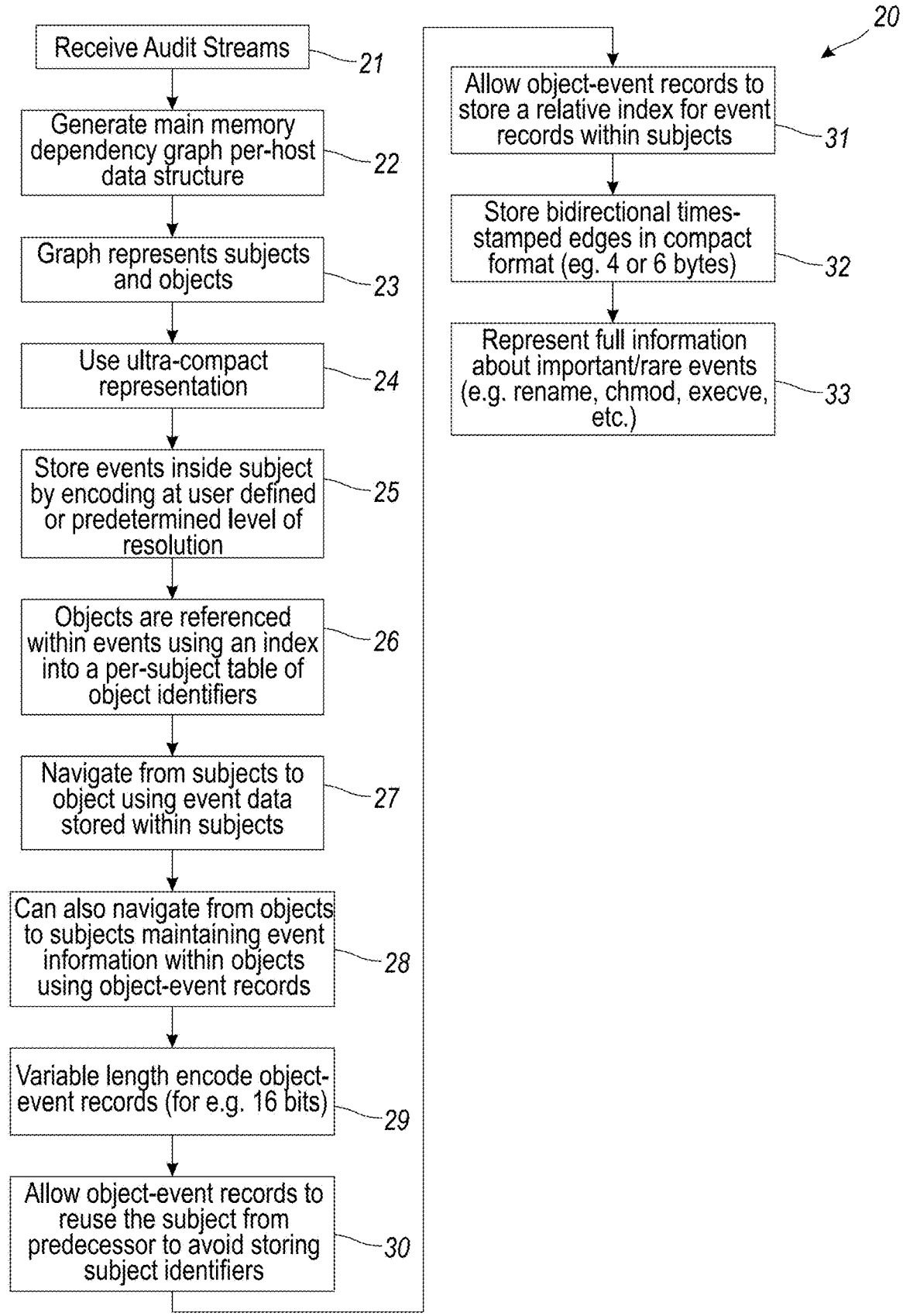
FIG. 2A provides an overview flowchart illustration of analysis of audit data by navigation from objects to subject, creation/maintaining of object-event records and a relative index, in accordance with certain aspects or embodiments of the disclosed system.

FIG. 2A provides an overview of the encoding and storage of dependencies in a graph data structure. In particular, FIG. 2A provides an overview flowchart illustration of analysis of audit data by navigation from objects to subject, creation/maintaining of object-event records and a relative index, in accordance with certain aspects or embodiments of the disclosed system.

More particularly, the process 20 shown in FIG. 2A begins at step 21 in which the system receives audit streams, also as shown in FIG. 1 audit streams 8, 9 or 10 (including from various operating systems such as Linux, Windows® FreeBSD. Next, the system generates a main memory dependency graph per-host data structure in step 22.

In this regard, the main memory dependency graph is a per-host data structure that can reference entities on other hosts but is optimized for the common case of intra-host reference. The system develops a graph that represents two types of entities: subjects, which represent processes, and objects, which represent entities such as files, pipes, and network connections. Subject attributes include process id (pid), command line, owner, and tags for code and data. Objects attributes include name, type (file, pipe, socket, etc.), owner, and tags. Events reported in the audit log are captured using labeled edges 19 between nodes 18 (such as subjects and objects and/or between two subjects).

Hence, in step 23, the graph represents subject and objects with events as reported in the audit log being captured as labeled edges between such subjects and objects or between two subjects.

While certain embodiments or aspects emphasizes compact data structures for objects and subjects, compactness of events is even more important: events outnumber objects and subjects by about two orders of magnitude in exemplary data sets of large magnitude. Moreover, the ratio of events to objects and subjects necessarily increases with time. For this reason, the disclosed system implements an ultra-compact representation shown in step 24 for events that can use for example, as little as 6 bytes of storage for many events.

Next, the system stores events inside subject structure by variable length coding (VLC) or other form of encoding, at a user-defined or pre-determined level of resolution at step 25. In particular, events are stored inside subjects, thereby eliminating a need for subject-to-event pointers, or the need for event identifiers. Their representation uses variable-length encoding, so that in the typical case, they can use for example, 4 bytes of storage, but when needed, they can use 8, 12, or 16 bytes. In certain aspects or embodiments, events operate on an object and have a timestamp. Since a per-subject order of events is maintained, in certain embodiments or aspects the system can dispense with microsecond granularity for timestamps, instead opting for millisecond resolution. In addition, the system stores only the relative time with respect to the time between the last event occurring on the same subject, which permits elimination of 16-bits for the timestamp in the typical case. Next, in step 26, objects are referenced within events using an index into a per-subject table of object identifiers. These indices are similar file descriptors—they tend to have small values, since most subjects use a relatively small number of objects. This enables object references to be represented using for example, 8 bits or less.

Event names are encoded for frequently occurring events (e.g., open, close, read and write) using 3 bits or less. This leaves us with several bits for storing a summary of event argument information, while still being within for example, 32 bits. The system can also can navigate from subjects to objects using the event data stored within subjects in step 28. However, forensic analysis also requires us to navigate from objects to subjects. For this purpose, the system, in certain embodiments, also maintains event information within objects using object-event records in step 28. Object event records are maintained only for a subset of events: specifically, events such as read and write that result in a dataflow. Other events (e.g., open) are not stored within objects. Object-event records are further compressed or shrunk by storing a reference to the corresponding subject-event record, instead of duplicating information.

As with subject-event records, in step 29, the system implements a variable-length encoding for object-event records that enables them to be stored in for example, just 16 bits in the most common case. In order to determine how this is possible, by way of background, objects tend to be operated on by a single subject at a time. Typically, this subject performs a sequence of operations on the object, e.g., an open followed by a few reads or writes, and then a close. By allowing object-event records to reuse the subject from their predecessor in step 30, the system can avoid the need for storing subject identifiers in most records. Next, in step 31, the system allows object-event records to store a relative index for event records within subjects. Two successive event records within a subject that operate on the same object are likely to be relatively close to each other, for example, with tens or hundreds of events therebetween. Hence, the relative index stored with object-event record can be for example, 12 bits or less in most cases, thus allowing these records to be 16 bits or less in the typical case.

This embodiment permits the system to store bidirectional timestamped edges in step 32 for example, in 6 bytes (or even 4 bytes for a subject-event record and 2 bytes for an object-event record). In evaluations conducted using larger data sets, the total memory use of the system is within 10 bytes per event on average.

The variable length encoding allows the system to represent full information about important (but rare) events, such as rename, chmod, execve, etc. in step 33. Hence, compactness is achieved without losing any important information. Although such encoding slows down access, access times are still typically less than 100 ns, which is many orders of magnitude faster than disk latencies that dominate random access on disk-resident data structures.

Referring back to FIG. 1, the tag and attack detection component 5 as shown in FIG. 1, is used to summarize the determination and/or assessment of the trust-worthiness and sensitivity of objects and subjects. This assessment in certain aspects or embodiments is based on three main factors: 1) provenance; 2) prior system knowledge; and 3) behavior.

The provenance factor is related to the tags on the immediate predecessors of an object or subject in the dependence graph. Prior system knowledge is the system knowledge about the behavior of important applications, such as remote access servers and software installers, and important files such as /etc/passwd and /dev/audio. Behavior is the system observed behavior of subjects, and how they compare to their expected behavior.

In particular, the disclosed system and method is directed to a novel policy framework, as described in greater detail hereinbelow with respect to at least FIGS. 1D, 2C, 3A-3E and TABLE 1, for initializing and propagating tags based on these factors. In the absence of specific policies, a default policy is used that propagates tags from inputs to outputs. The default policy assigns to an output the lowest among the trustworthiness tags of the inputs, and the highest among the confidentiality tags. This policy is conservative in that it can err on the side of over-tainting, but will not cause attacks to go undetected, or cause a forward (or backward) analysis to miss objects, subjects or events, as described in greater detail hereinbelow with respect to at least FIGS. 4A-4D and 5A-5C.

Tags play a central role in certain aspects or embodiments of the disclosed system. Tags provide important context for attack detection. Each audited event is interpreted in the context of these tags to determine its likelihood of contributing to an attack. In addition, tags are instrumental for the speed of any forward and backward analysis as described in FIGS. 4, 4A-4D and 5A-5C hereinbelow. Finally, tags play a central role in scenario reconstruction by eliminating vast amounts of audit data that satisfy the technical definition of dependence but do not meaningfully contribute to the understanding of an attack.

Tag design is directed to define the following trustworthiness tags (t-tags):

1) A Benign authentic tag is assigned by the system to data/code received from sources trusted to be benign, and whose authenticity can be verified;

2) A Benign tag reflects a reduced level of trust than or as compared to the benign authentic tag. While the data/code is still determined by the system to be benign, adequate authentication hasn't been performed to verify the source. Hence, the system will assign the data/code a benign tag in such instances; or 3) An Unknown tag is assigned by the system to data/code from sources about which there is no information on trustworthiness. Such data/code can sometimes be even malicious.

Policies define what sources are benign and what forms of authentication are sufficient. In the simplest case, these policies take the form of whitelists, but the system supports more complex policies as well. If no policy is applicable to a source, then its t-tag is set to unknown.

The following confidentiality tags (c-tags) are defined, to effectively analyze and/or facilitate the analyst in reasoning about information associated with stealing attacks. Such tags are assigned to code as follows:

1) Secret: Highly sensitive information, such as login credentials and private keys are assigned a secret confidentiality tag;

2) Sensitive: Data whose disclosure can have a significant security impact, e.g., reveal vulnerabilities in the system, but does not provide a direct way for an attacker to gain access to the system is assigned a sensitive confidentiality tag;

3) Private: Data whose disclosure is a privacy concern, but does not necessarily pose a security threat is assigned a private confidentiality tag; or 4) Public: Data that can be widely available, e.g., on public web sites, is assigned a public confidentiality tag.

In certain embodiments, an important aspect of the disclosed system and method is the separation between t-tags for code and data. Specifically, a subject (i.e., a process) is given two t-tags: one that captures its code trustworthiness (code t-tag) and another for its data trustworthiness (data t-tag). This separation between t-tags assigned for code and data significantly improves attack detection. More importantly, it can significantly speed up forensic analysis by focusing the analysis on fewer suspicious events, while substantially reducing the size of the reconstructed scenario. Note that confidentiality tags in certain embodiments are associated only with data (and not the code itself).

Pre-existing objects and subjects are assigned initial tags using tag initialization policies associated with the disclosed system and method. Objects representing external entities, such as a remote network connection, also are assigned initial tags. The remainder of the objects and subjects are created during system execution, and their tags are determined using tag propagation policies. Finally, attacks are detected using behavior-based policies referred to as detection policies. If no specific policy is provided, then sources are tagged with unknown trustworthiness. Similarly, in the absence of specific propagation policies, the default propagation policy and/or conservative propagation policy is used in certain embodiments.

Tag-based and/or policy-based attack detection component 5 as shown in FIG. 1, is limited to information available in audit data, in certain aspects or embodiments. Hence, the use of provenance reflected in audit data is a potential basis for detection in such embodiments. Since tags are a function of provenance, the system uses such tags for attack detection. Audit data is generally considered trustworthy, so tags will provide a sound basis for detection.

Detection methods should not require detailed application-specific knowledge. In contrast, most existing intrusion detection and sandboxing techniques interpret each security-sensitive operation in the context of a specific application to determine whether it could be malicious. This requires expert knowledge about the application, or in-the-field training in a dynamic environment, where applications may be frequently updated. Hence, instead of focusing on application behaviors that tend to be variable—as prior systems do, the disclosed system and method instead focuses any respective analysis and attack detection techniques on the high-level objectives of most attackers, such as backdoor insertion and data exfiltration. Specifically, in certain aspects or embodiments, the disclosed system combines the analysis and/or scenario reconstruction as associated with an attacker's motive and means.

In this regard, if an event in the audit data can help the attacker achieve his/her key high-level objectives, that would provide the motivation and justification for using that specific event in an attack. But, this is generally not enough since the attacker also needs the means to cause this event, or more broadly, influence it. Note that the tags in the disclosed system and method are designed to capture means—if a piece and/or portion of data or code bears the unknown t-tag, then it was derived from (and hence influenced by) untrusted sources.

As for the high-level objectives of an attacker, several reports and white papers have identified that the following steps listed below are typical in most advanced attack campaigns:

1. Deploy and run attacker's code on victim system;
2. Replace or modify important files, e.g., /etc/passwd or ssh keys; and
3. Exfiltrate sensitive data.

While attacks with a transient effect may be able to avoid the first two steps, for most sophisticated attacks, such as those used in APT campaigns, generally require the establishment of a more permanent footprint on the victim system. In those cases, there does not seem to be a way to avoid one or both of the first two steps. Even in those cases where the attacker's goal could be achieved without establishing a permanent base, the third step listed above usually represents an essential attacker goal.

Unlike prior approaches, the disclosed system relies on application-independent policies. Policies are developed by implementation and analysis of provenance information computed from audit data. In particular, an audit event is analyzed to determine if it advances an attacker's high-level objectives, thereby providing a motive for the attack; while the provenance and/or provenance tags derived from the entire audit history is used to determine if the attacker had the means to influence this event.

Figure 1A:
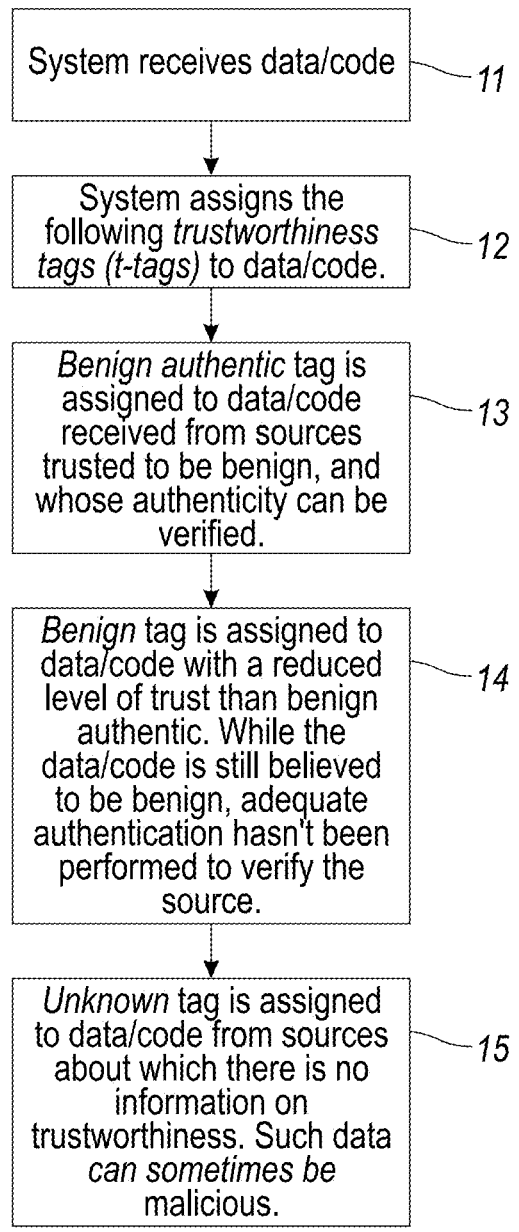
FIG. 1A provides a flowchart illustration associated with the assignment of various trustworthiness tags (t-tags) to audit data/code based on the current policy of the system, in accordance with an embodiment of the disclosed system and method.
Figure 1B:
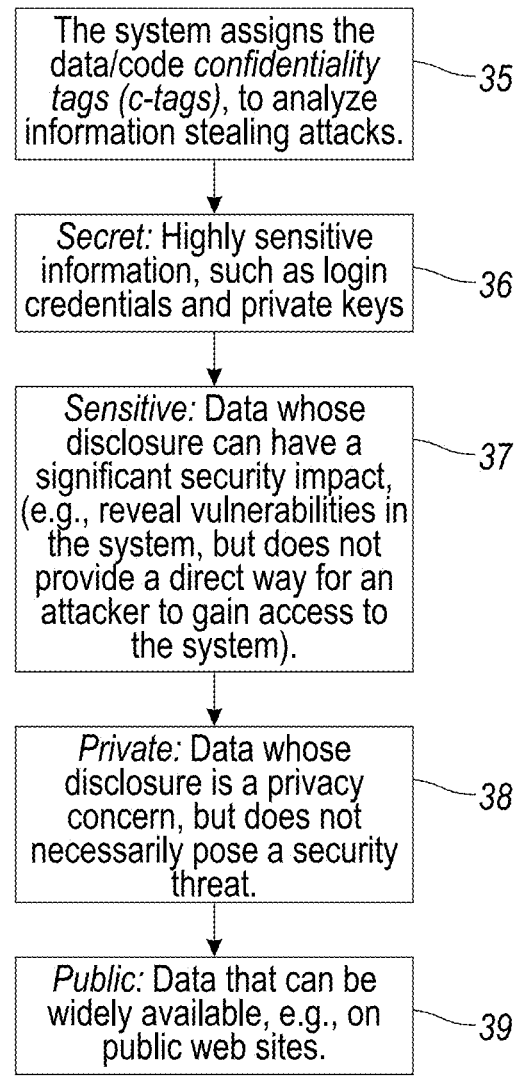
FIG. 1B provides a flowchart illustration associated with the assignment of various confidentiality tags (c-tags) to audit data/code in order to analyze an attack, in accordance with an embodiment of the disclosed system and method.
Figure 1C:
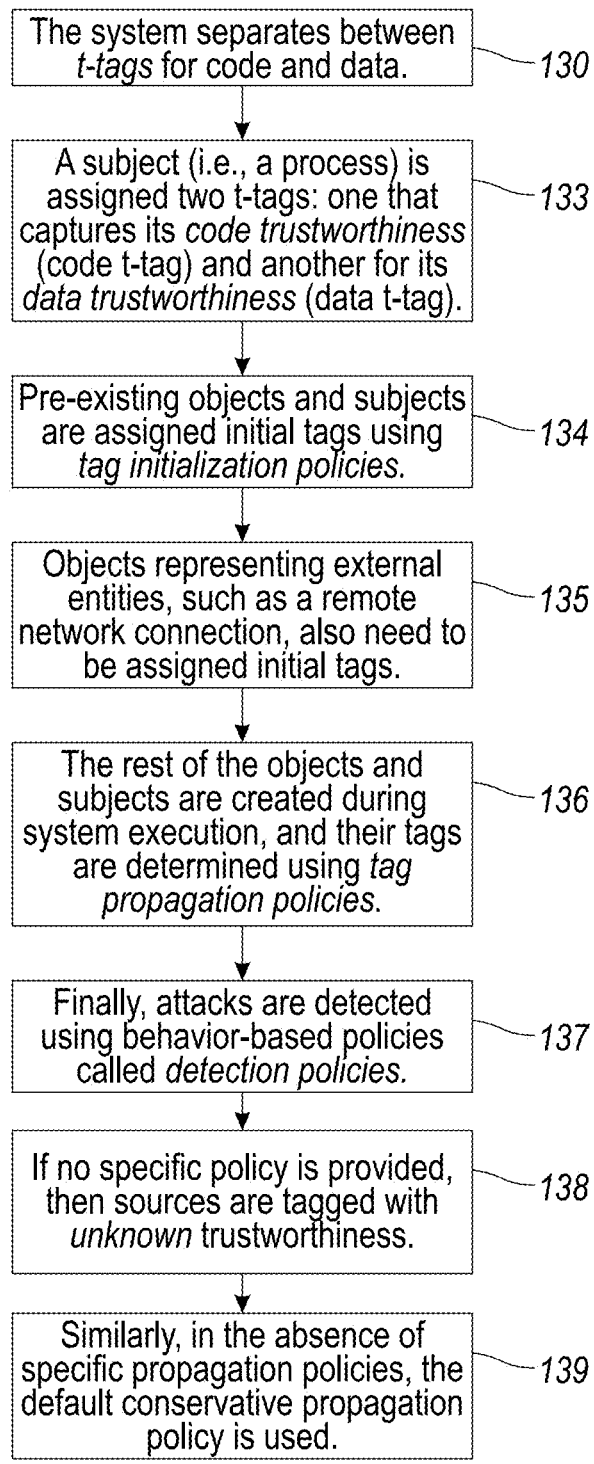
FIG. 1C provides a flowchart illustration overview of implementation tag initialization policies, tag propagation policies, and/or detection policies, as associated with tag and policy-based attack detection component 5 in FIG. 1, in accordance with an embodiment of the disclosed system and method.
Figure 1D:
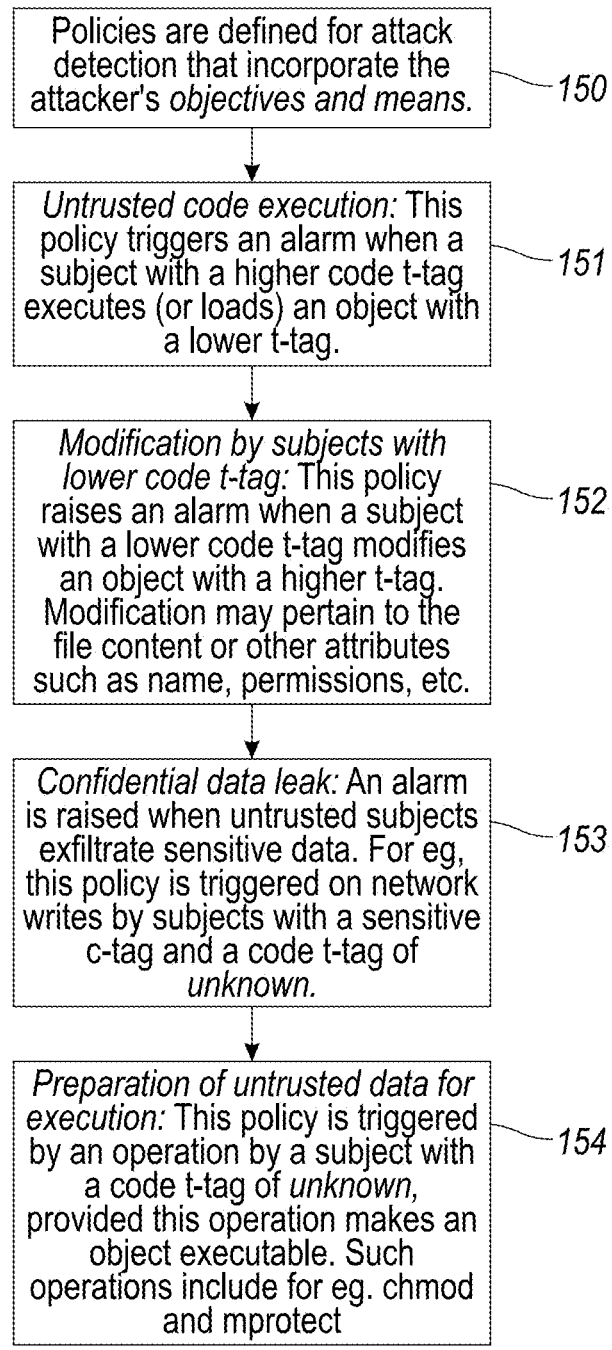
FIG. 1D provides a flowchart overview of attack detection using provenance tags and the focus on motive and/or means of the attacker in establishing policies for attack detection that incorporate the attacker's objectives and means, in accordance with certain aspects or embodiments of the disclosed system.

Based on the above reasoning, the following policies as shown in customizable policies component 4 of FIG. 1 using considerations such as provenance tags outlined in FIG. 1E, and motive and means outlined in FIG. 1F, are defined by the disclosed system and method for attack detection that incorporate the attacker's objectives and means, as shown in FIG. 1D.

Untrusted code execution: This policy triggers an alarm when a subject with a higher code t-tag executes (or loads) an object with a lower t-tag3. Customized policies can also be defined for interpreters—for example, such as bash so that reads are treated the same as loads.

Modification by subjects with lower code t-tag: This policy raises an alarm when a subject with a lower code t-tag modifies an object with a higher t-tag. Modification may pertain to the file content or other attributes such as name, permissions, etc.

Confidential data leak: An alarm is raised when untrusted subjects exfiltrate sensitive data. Specifically, this policy is triggered on network writes by subjects with a sensitive c-tag and a code t-tag of unknown.

Preparation of untrusted data for execution: This policy is triggered by an operation by a subject with a code t-tag of unknown, provided this operation makes an object executable. Such operations include for example, chmod and mprotec. Binary code injection attacks on present day OSes ultimately involve a call to change the permission of a writable memory page so that it becomes executable. The system provides that to the extent that such memory permission change operations are included in the audit data, this policy can spot those operations. Furthermore, implementation can identify mprotect operations that occur in conjunction with library loading operations. This policy is not triggered on those mprotect operations.

It is important to note that "means" in certain embodiments, is not diluted just because data or code passes through multiple intermediaries. For instance, the untrusted code policy does not require a direct load of data from an unknown web site; instead, the data could be downloaded, extracted, uncompressed, and possibly compiled, and then loaded. Regardless of the number of intermediate steps, this policy will be triggered when the resulting file is loaded or executed. This is one of the more important reasons for the effectiveness of the disclosed attack detection system.

Today's vulnerability exploits typically do not involve untrusted code in their first step, and hence won't be detected by the untrusted code execution policy. However, the eventual goal of an attacker is to execute his/her code, either by downloading and executing a file, or by adding execute permissions to a memory page containing untrusted data. In either case, one of the above policies can detect the attack. A subsequent backward analysis as described hereinbelow in connection with FIGS. 4A-4D, can help identify the first step of the exploit.

Additional detector inputs can also be easily integrated in alternate embodiments of the disclosed system and method. For instance, if an external detector flags a subject as a suspect, this can be incorporated by setting the code t-tag of the subject to unknown. As a result, the remaining detection policies mentioned above can all benefit from the information provided by the external detector. Moreover, setting of unknown t-tag at suspect nodes preserves the dependency structure between the graph vertices that cause alarms, a fact that is exploited in forensic analysis.

The fact that many of the policies are triggered by untrusted code execution should not be interpreted to mean that they work in a static environment, in which no new code is permitted in the system. Indeed, software updates and upgrades do occur constantly, but in an enterprise setting, the disclosed system does not generally anticipate end users to be downloading unknown code from random sites since system parameters/rules (for example, firewalls and other security measures) are typically in place in such enterprise systems that block random system downloads. Accordingly, the disclosed system also supports standardized software updating mechanisms such as those used on contemporary OS(es).

A flexible policy framework for tag assignment, propagation, and attack detection is implemented in accordance with an embodiment of the disclosed system and method. The system expresses policies using a simple rule-based notation provided hereinbelow, for example:

exec(s, 0) : o.ttag < benign → alert ("UntrustedExec")

The example rule is triggered when the subject s executes a (file) object o with a t-tag less than benign. Its effect is to raise an alert named UntrustedExec. As illustrated by this example, rules in the disclosed system are generally associated with events, and include conditions on the attributes of objects and/or subjects involved in the event. Attributes of interest include for example:

name: regular expressions can be used to match object names and subject command lines. For example, Perl syntax may be used for regular expressions;

tags: conditions can be placed on t-tags and c-tags of objects and/or subjects. For subjects, code and data t-tags can be independently accessed; and/or ownership and permission: conditions can be placed on the ownership of objects and subjects, or permissions associated with the object or the event.

The following policy trigger points are listed in TABLE 1 hereinbelow:

TABLE 1

| Event | Direction | Alarm trigger | Tag trigger |
| --- | --- | --- | --- |
| define | | | init |
| read | O→S | read | propRd |

TABLE 1-continued

| Event | Direction | Alarm trigger | Tag trigger |
|---|---|---|---|
| load, execve | O→S | exec | propEx |
| write | S→O | write | propW r |
| rm, rename | S→O | write | |
| chmod, chown | S→O | write, modify | |
| setuid | S→S | | propSu |

In TABLE 1, edges with policy trigger points are shown. In the direction column, S indicates Subject and O indicates object. The next two columns indicate trigger points for detection policies (that may trigger alarms) and/or tag setting policies.

The effect of a policy depends on its type. The effect of a detection policy is to raise an alarm. For tag initialization and propagation policies, the effect is to modify tag(s) associated with the object or subject involved in the event. While the disclosed system implements, a rule-based notation to specify policies, in an example implementation, each rule is encoded as a (C++) function.

In order to provide a finer degree of control over the order in which different types of policies are checked, the system associates policies with trigger points instead of events. In addition, trigger points provide a level of indirection that enables sharing of policies across distinct events that have a similar purpose.

Referring back to TABLE 1, shown are the trigger points currently defined in the example policy framework. The first column identifies events, the second column specifies the direction of information flow, and the last two columns define the trigger points associated with these events.

It is noted that the system uses a special event called define to denote audit records that define a new object. This pseudo-event is assumed to have occurred when a new object is encountered for the first time, for example, establishment of a new network connection, the first mention of a pre-existing file, creation of a new file, etc. The remaining events in TABLE 1 are generally self-explanatory.

When an event occurs, all detection policies associated with its alarm trigger are executed. Unless specifically configured, detection policies are checked only when the tag of the target subject or object is about to change ("Target" in the example, refers to the destination of data flow in an operation). Following this, policies associated with the event's tag triggers are tried or implemented in the order in which they are specified. Once a matching rule is identified, the tags specified by this rule are assigned to the target of the event, and the remaining tag policies are not evaluated.

Next is described with greater particularity, the tag initialization and propagation policies in an example system.

The tag initialization policies are invoked at the init trigger, and are used to initialize tags for new objects, or preexisting objects when they are first mentioned in the audit data. When a subject creates a new object, the object inherits the subject's tags by default; however, this can be overridden using tag initialization policies in accordance with an embodiment of the disclosed system and method.

The example tag initialization policy is explained further below. In certain embodiments, the use of regular expressions to conveniently define initial tags for groups of objects are used.
  init(o): match(o.name, "^IP:(10\.0|127)") → o.ttag = BENIGN_AUTH, o.ctag = PRIVATE
  init(o): match(o.name, "^IP:") → o.ttag = UNKNOWN, o.ctag = PRIVATE
  init(o): o.type = = FILE → o.ttag = BENIGN_AUTH, o.ctag = PUBLIC The first rule specifies tags for intranet connections, identified by address prefixes 10.0 and 127 for the remote host. It is useful in a context where the disclosed system isn't deployed on the remote host. If the disclosed system is deployed on the remote host, there will be no define event associated with the establishment of a network connection, and hence this policy won't be triggered, in accordance with an embodiment. Instead, the system will already have computed a tag for the remote network endpoint, which will then propagate to any local subject that reads from the connection.

The second rule states that all other hosts are untrusted. All preexisting files are assigned the same tags by the third rule. The disclosed implementation uses two additional policies that specify c-tags.

In certain aspects or embodiments, tag propagation policies can be used to override default tag propagation semantics. Different tag propagation policies can be defined for different groups of related event types, as indicated in the "Tag trigger" column in TABLE 1.

Tag propagation policies can be used to prevent "overtainting" that can result from files such as .bash_history that are repeatedly read and written by an application each time it is invoked. As an example, the following listed policy skips taint propagation for the specific file listed below:
  propRd(s, o): match(o.name, "\.bash_history$") → skip.

It is noted that skip as used in the above example policy, leaves tags unchanged and essentially does nothing further. Listed below is an example policy that treats files read by bash, which is an interpreter—as a load, and hence updates the code t-tag.
  propRd(s, o): match(s.cmdline, "^\bin\bash$") → s.code_ttag = s.data_ttag = o.ttag, s.ctag = o.ctag Although trusted servers such as sshd interact with untrusted sites, they can be expected to protect themselves, and let only authorized users access the system. Such servers should not have their data trustworthiness down-graded. A similar comment applies to programs such as software updaters and installers that download code from untrusted sites, but verify the signature of a trusted soft-ware provider before the install.
  propRd (o,$): match (s.cmdline, "^/sbin/sshd$") → skip Moreover, when the login phase is complete, typically identified by execution of a setuid operation, the process appropriate tags are assigned for example, as listed below.
  propSu (s): match (s.cmdline, "^/usr/sbin/sshd$") → s.code_ttag = s.data_ttag = BENIGN, s.ctag = PRIVATE Referring back to FIG. 1, the disclosed system and method provides space-efficient in-memory dependence graph representation as shown in component 2. It further provides effective attack detection based on untrustworthiness and confidentiality tags as shown in components 3 and 5. The system includes a customizable policy framework for tag assignment and propagation in component 4. In turn, the system generates alarms after components 5, which provides for effective and efficient tag-based root-cause (either via backward and/or forward analysis) and/or impact analysis in component 6. Hence, the embodiment of the disclosed system shown in FIG. 1 facilitates generating a fast, real-time, accurate and compact visual representation of APT campaigns and therefore, can effectively assist an analyst to spot and/or identify the attacks in advance of any anticipated and/or actual extensive damage.

As described below with respect to FIGS. 1A-1D, the implementation of provenance tags with respect to component 5 (tag and policy-based attack detection) of FIG. 1, is essential to identify the entry points of an attack campaign, as will be further described in greater detail hereinbelow with respect to FIGS. 3A-3E and FIGS. 4, 4A-4D and 5A-5C.

Regarding the assigned level of trustworthiness (t-tag) described hereinabove, data derived from sources believed to be benign are identified by the system as benign as shown in FIG. 1A. Shown in FIG. 1A is an overview illustration of example provenance tags that are assigned to data/code, implemented in certain aspects or embodiments of the disclosed system. A t-tag or trustworthiness tag can range from benign—flagged as data from sources believed to be benign or unknown in which there is no good basis to trust this source of data.

Referring to FIG. 1A, the system receives data and/or code in step 11. Next, the system assigns trustworthiness tags (t-tags) to received data/code in step 12. A benign authentic tag is assigned to data/code received from sources to be benign and whose authenticity can be verified in step 13. In step 14, a benign t-tag is assigned to data/code with a reduced level of trust than benign authentic. It is noted that while the data/code is still believed to be benign, adequate authentication hasn't been performed to verify the source. Whereas, in step 15, an unknown t-tag is assigned to data/code received from sources about which there is no information on trustworthiness. Such data can sometimes be malicious data.

In addition, a confidentiality (c-tag) is assigned to data/code and can range from secret to public. FIG. 1B provides a flowchart illustration associated with the assignment of various confidentiality tags (c-tags) to audit data/code in order to analyze an attack, in accordance with an embodiment of the disclosed system and method.

In particular, FIG. 1B shows that system assigns the data/code a confidentiality tag (c-tags) in order to analyze information stealing attacks and/or a cyber-attack. Step 36 provides for assigning a c-tag of secret for data/code that is indicative of highly sensitive information for example, a login credential, private keys, or /etc/shadow. In step 37, a c-tag of sensitive is assigned to data/code whose disclosure can have a significant security impact, for example, reveal vulnerabilities in the system, but that does not provide a direct way for an attacker to gain access to the system. Next, in step 38, a c-tag of private is assigned to data/code whose disclosure is a privacy concern and/or indicative of loss that may not necessarily pose a direct security threat. A c-tag of public is assigned in step 39 to data that is widely available for example, on public web sites.

In certain embodiments, there are t-tags assigned for code as well as data. In addition, code such as subjects or processes can be assigned two t-tags: a code t-tag and data-tag. The separation of t-tags for such subject or process facilitates in the detection and/or speeds respective impact and/or root-cause analysis by focusing on few root causes. This separation of t-tags helps reduce the size of the reconstructed scenario.

FIG. 1C provides a flowchart illustration overview of implementation tag initialization policies, tag propagation policies, and/or detection policies, as associated with tag and policy-based attack detection component 5 in FIG. 1, in accordance with an embodiment of the disclosed system and method.

In step 130, the system separates between t-tags for code and data, as described above. The system identifies if the received information is data or code. The system assigns a confidentiality tag which are associated only with data (and not code). More particularly, a subject (for example, a process) is assigned two t-tags: one that captures its code trustworthiness (code t-tag) and another for its data trustworthiness (data t-tag) in step 133. Next, pre-existing objects and subjects are assigned initial tags using tag initialization policies in step 134. Objects representing external entities, such as a remote network connection, also need to be assigned initial tags in step 135. The rest of the objects and subjects (for example not pre-existing objects nor objects representing external entities) are created during system execution, and their tags are determined using tag propagation policies in step 136.

In step 136, such tag propagation policies (as described hereinabove) can be used to override default tag propagation semantics. Different tag propagation policies can be defined for different groups of related event types, as indicated for example in the "Tag trigger" column shown in TABLE 1. Tag propagation policies can be used to prevent "overtainting" that can result from files such as .bash_history that are repeatedly read and written by an application each time it is invoked. Finally, attacks are detected using behavior-based policies called detection policies in step 137. Such attack detection policies are also further described in connection with FIGS. 3A-3E hereinbelow.

The effect of a detection policy is to raise an alarm. Whereas, for tag initialization and propagation policies, the effect is to modify tag(s) associated with the object or subject involved in the event. In order to provide a finer degree of control over the order in which different types of policies are checked, the system associates policies with trigger points instead of events. In addition, trigger points provide a level of indirection that enables sharing of policies across distinct events that have a similar purpose. TABLE 1 indicates how the trigger points are currently defined in an exemplary policy framework. The first column identifies events, the second column specifies the direction of information flow, and the last two columns define the trigger points associated with these events.

A special event called define denotes audit records that define a new object. This pseudo-event is assumed to have occurred when a new object is encountered for the first time, e.g., establishment of a new network connection, the first mention of a pre-existing file, creation of a new file, etc.

In this regard, when an event occurs, all detection policies associated with its alarm trigger are executed. Unless specifically configured, detection policies are checked only when the tag of the target subject or object is about to change. ("Target" refers to the destination of data flow in an operation.) Following this, policies associated with the event's tag triggers are implemented in the order in which they are specified. As soon as a matching rule is identified, the tags specified by this rule are assigned to the target of the event, and the remaining tag policies are not evaluated.

Figure 4:
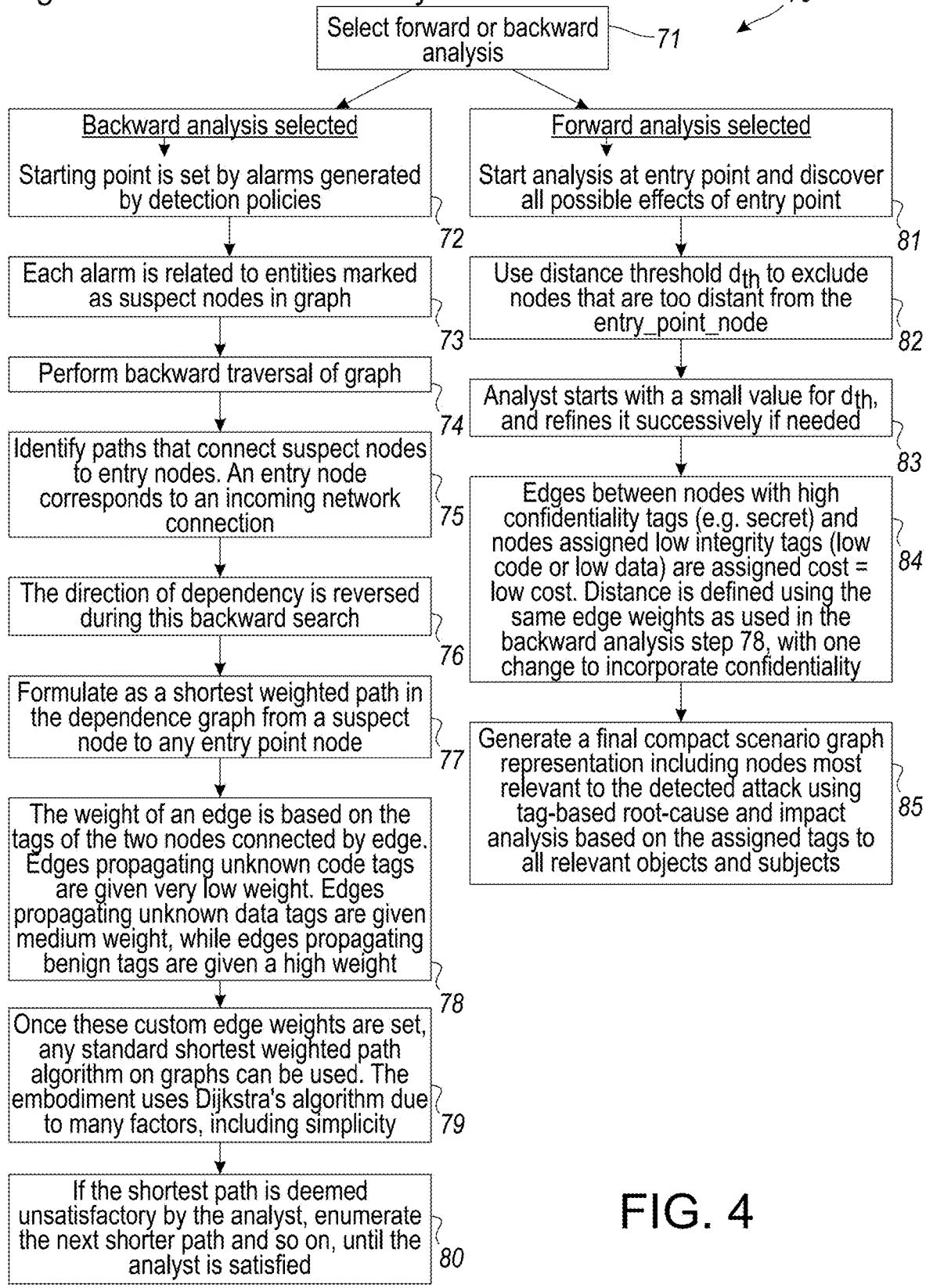
FIG. 4 provides a flowchart illustration of tag-based bi-directional analysis used in generating a scenario reconstruction of audit data, in accordance with certain aspects or embodiments of the disclosed system.
Figure 4A:
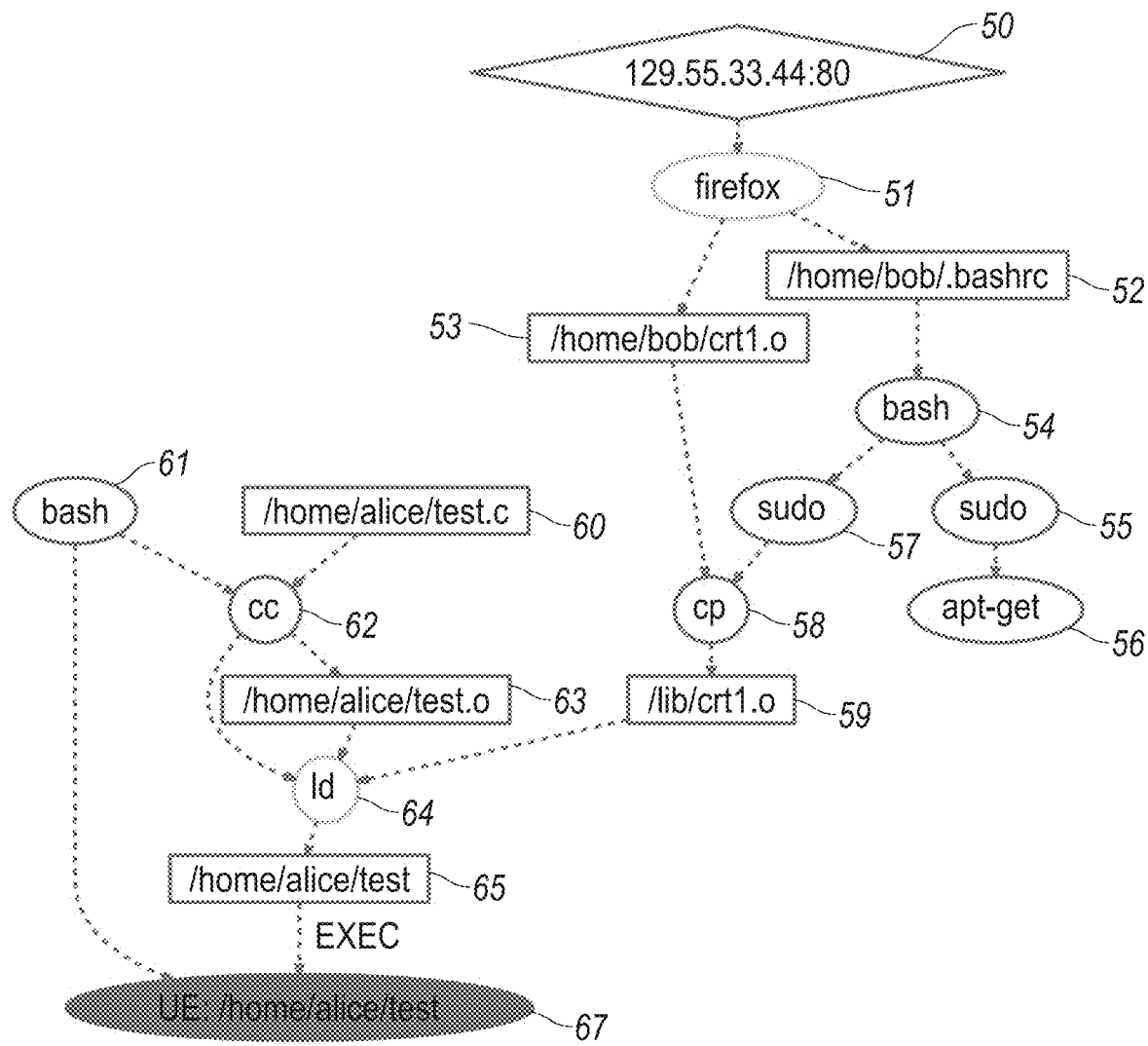
FIGS. 4A-4D provide overview illustrations of various reconstruction scenario representations in graphical format, specifically as associated with backward analysis traversal implemented in step-wise fashion, as outlined in flowchart illustration in FIG. 4. In particular, each of FIGS. 4A-4D provide respective illustrations of reconstruction scenario representations implemented incrementally in step-wise sequential formats, each in accordance with an embodiment of the disclosed system and method.
Figure 4B:
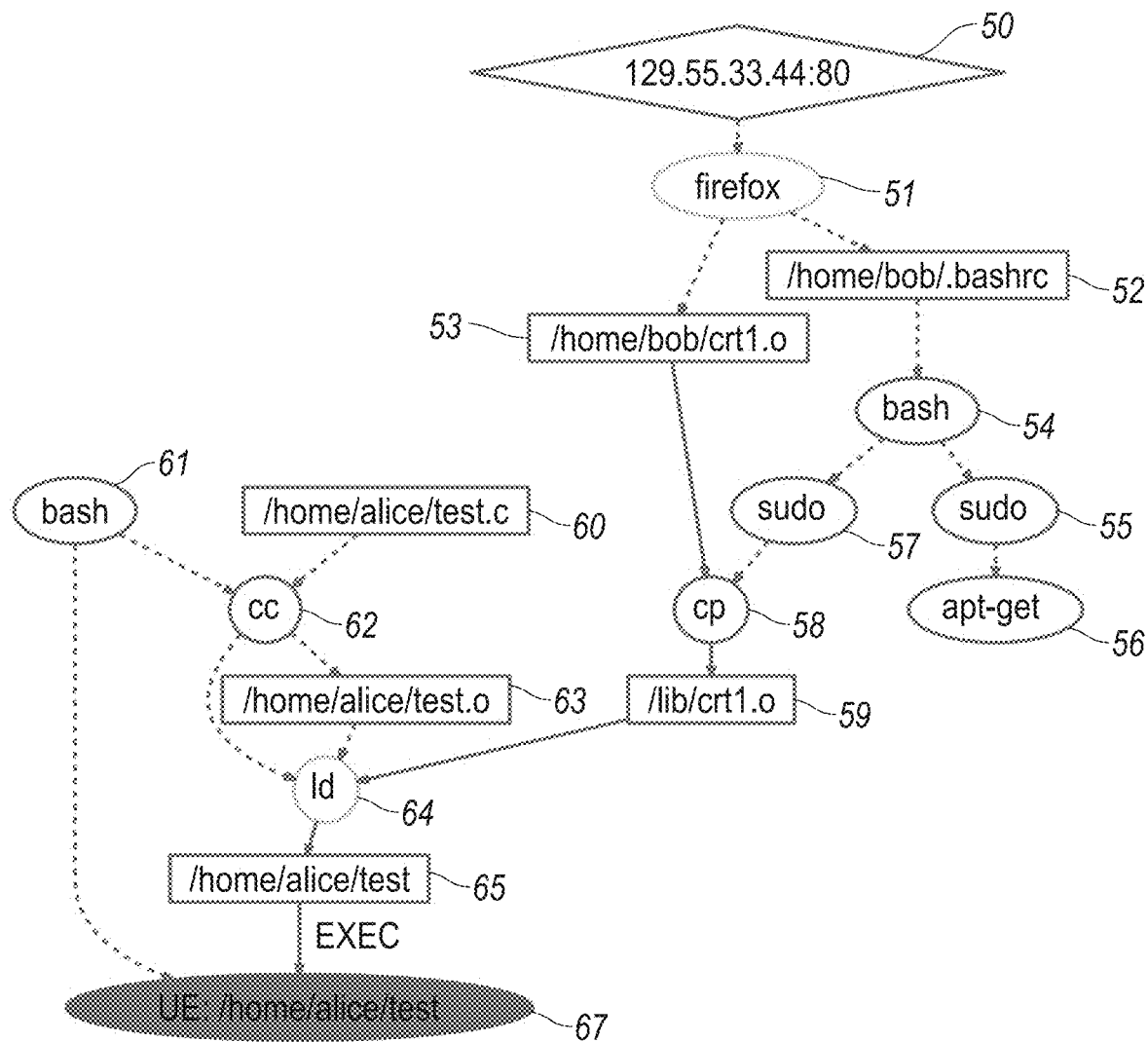
Figure 4C:
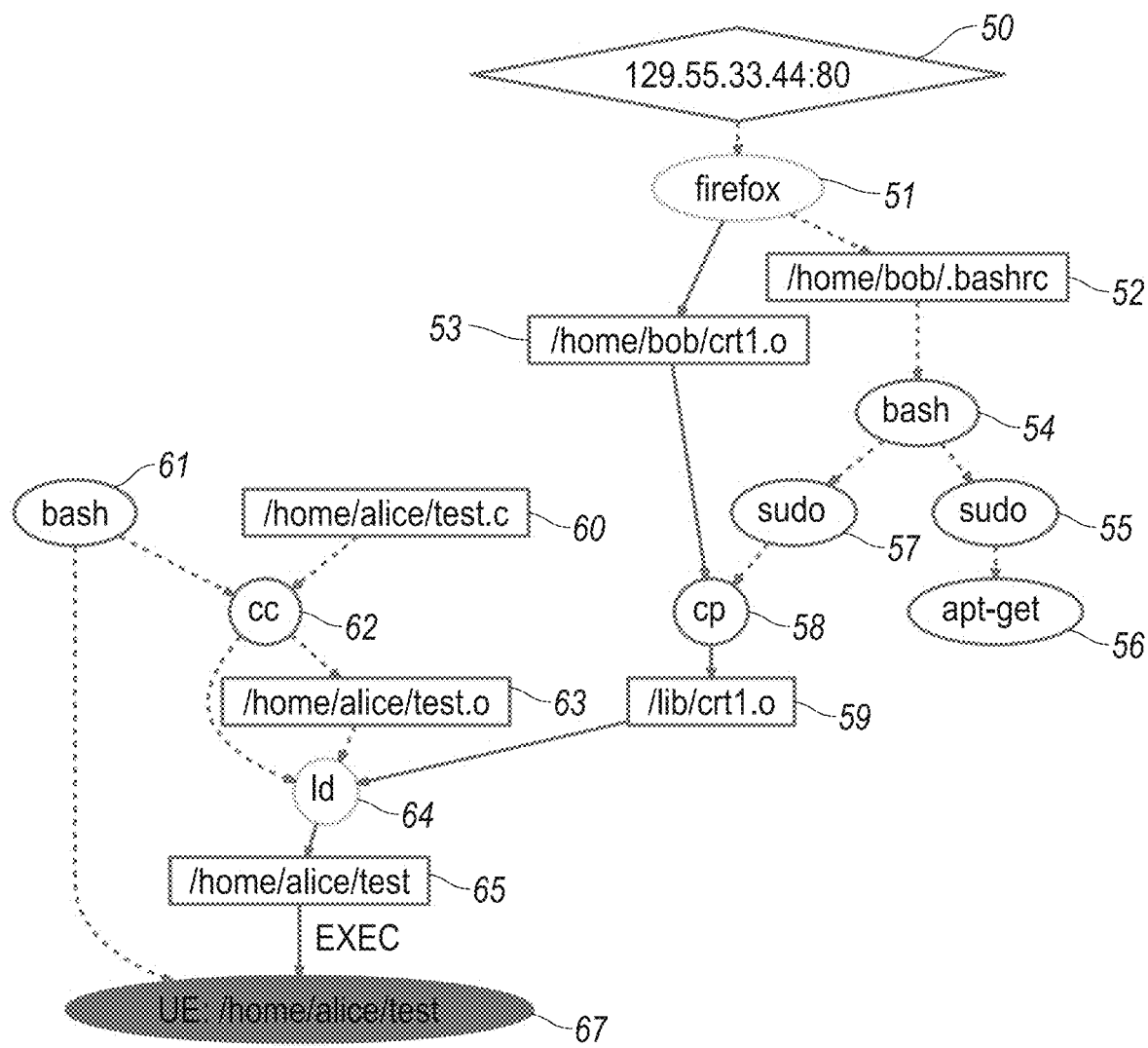
Figure 4D:
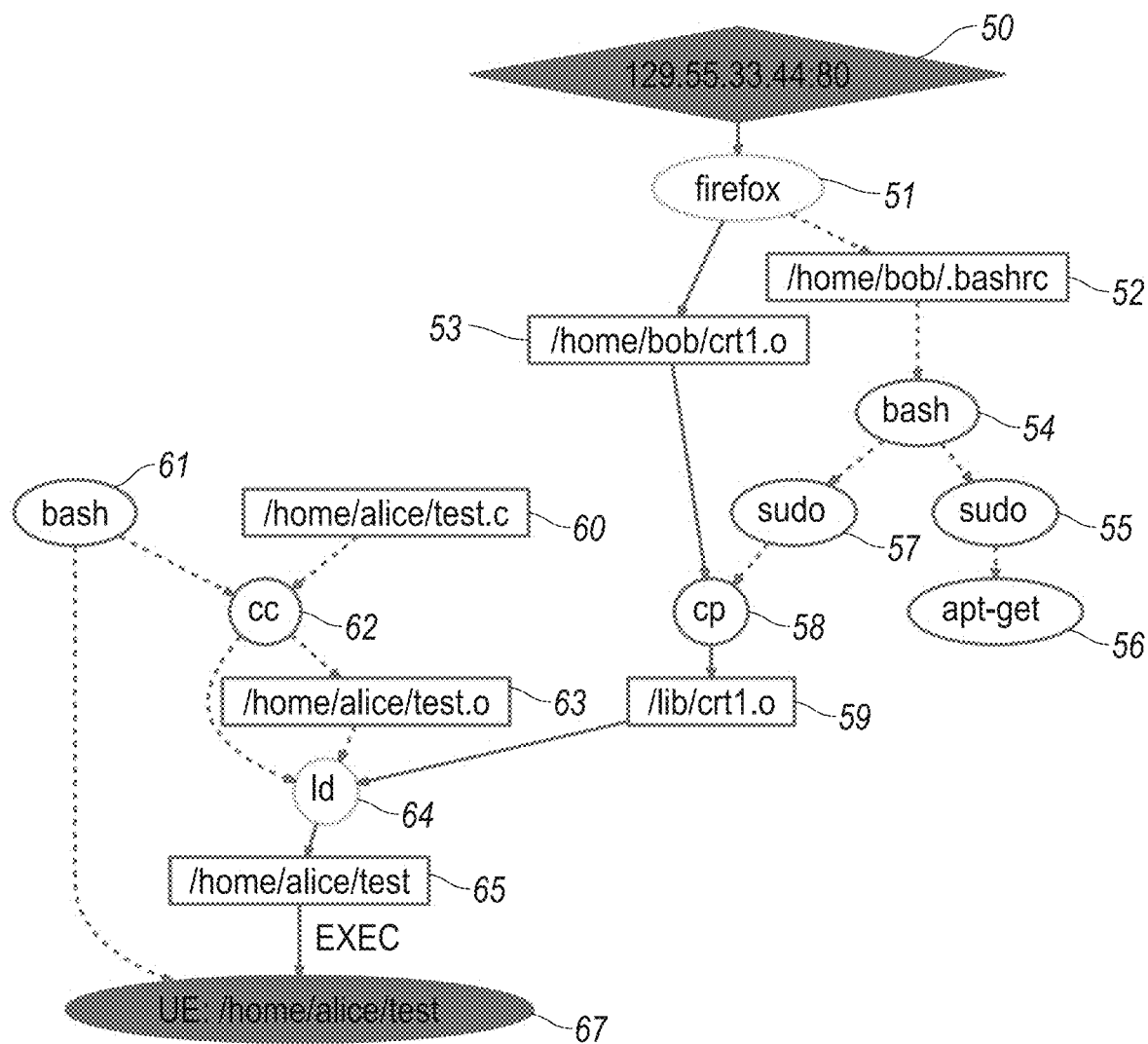

It is noted that the starting points for the backward analysis described further in FIGS. 4-4D, are the alarms generated by the detection policies. In particular, each alarm is related to one or more entities, which are marked as suspect nodes in the graph. Backward search involves a backward traversal of the graph to identify paths that connect the suspect nodes to entry nodes. The direction of the dependency edges is reversed in such a traversal and as further described hereinbelow.

As described hereinabove, if no specific policy is provided, then source(s) are tagged with unknown trustworthiness in step 138 of FIG. 1C. Similarly, in the absence of specific propagation policies, the default conservative propagation policy is used in step 139.

FIG. 1E provides an overview illustration outlining example provenance tags implemented in accordance with certain aspects or embodiments of the disclosed system. A trustworthiness (t-tag) as described hereinabove in FIG. 1A, defines benign authentic data as data originating from sources trusted to be benign and the authenticity of which can be verified; benign data originating from sources believed to be benign as opposed to unknown data originating from essentially a source with no good basis to trust or an unknown source. A confidentiality (c-tag) is assigned as described hereinabove in FIG. 1B, including those with greater levels of confidentiality and/or sensitivity such as: secret c-tag for highly sensitive information; sensitive c-tag for data the disclosure of which would or can have significant security impact; and private c-tag for information in which a loss thereof may not necessarily pose a direct security threat. Finally, a public c-tag is assigned to publicly available information, for example, as found on public websites. Further outlined in FIG. 1E is the separation of code and data in the assignment of trustworthiness tags. In certain aspects or embodiments, processes are essentially assigned two t-tags: code t-tag and data t-tag. The separation thereof aids in the detection of entry points or attacks, and speeds analysis thereof by focusing on fewer root causes.

FIG. 1F provides an overview illustration of attack detection using for example, the provenance tags of FIG. 1E, as well as analysis of the focus on motive and/or means of the attacker, in accordance with certain aspects or embodiments of the disclosed system.

In particular when implementing the policy of the disclosed system and method during the attack detection component 5 of FIG. 1, part of the consideration of such implemented policy (and/or customization thereof) is the motive and/or means of the attacker as further described in connection with FIGS. 1D and 1F.

FIG. 1D provides a flowchart overview of attack detection using provenance tags and the focus on motive and/or means of the attacker in establishing policies for attack detection that incorporate the attacker's objectives and means, in accordance with certain aspects or embodiments of the disclosed system.

The disclosed system relies on application-independent policies. Policies are developed by implementation and analysis of provenance information computed from audit data. In particular, an audit event is analyzed to determine if it advances an attacker's high-level objectives, thereby providing a motive for the attack; while the provenance derived from the entire audit history is used to determine if the attacker had the means to influence this event.

In particular, beginning with step 150 of FIG. 1D, it is noted that policies are defined for attack detection that incorporate the attacker's objectives and/or means. Step 151 provides for an untrusted code execution (UE). This policy triggers an alarm when a subject with a higher code t-tag executes (or loads) an object with a lower t-tag. Customized policies can be defined for interpreters such as bash so that for example, reads are treated the same as loads.

In step 152, a suspicious modification (SM) by subjects with lower code t-tag policy raises an alarm when a subject with a lower code t-tag modifies an object with a higher t-tag. Modification may pertain to the file content or other attributes such as name, permissions, etc.

A confidential data leak alarm (DL) in step 153 is raised when untrusted subjects exfiltrate sensitive data. Specifically, this policy is triggered on network writes by subjects with a sensitive c-tag and a code t-tag of unknown. In step 154, a policy associated with preparation of untrusted data for execution (UP) is triggered by an operation by a subject with a code t-tag of unknown, provided this operation makes an object executable. Such operations include for example, chmod and mprotect. Binary code injection attacks on current OS(es) ultimately involve a call to change the permission of a writable memory page so that it becomes executable. It is noted that to the extent that such memory permission change operations are included in the audit data, this policy can spot them.

Hence, by focusing the detection techniques on the high-level objectives of most attackers as outlined in overview FIGS. 1D and 1F, the system is able to combine analysis and hence, reasoning about an attacker's motive and means. An event in the audit data can help the attacker achieve his/her key high-level objectives, that would provide the motivation and justification for using that event in an attack. But this has proven to be insufficient since the attacker also needs the means to cause this event, or more broadly, influence it. Note that the implementation of the provenance tags in embodiments of the disclosed system and method are also designed to capture means of the attacker. Hence, for example, if a piece of data or code bears the unknown t-tag, then it was derived from (and hence influenced by) untrusted sources.

The disclosed system will analyze whether an act advances the attacker's high—level objections. The following steps are typical such as 1) deploy and run the attacker code on victim's system; 2) replace or modify important files such as for e.g., /etc/passwd or ssh keys; and/or 3) ex-filtrate sensitive data, as outlined in FIG. 1F.

While attacks with a transient effect may be able to avoid the first two steps, most sophisticated attacks, such as those used in APT campaigns, require the establishment of a more permanent footprint on the victim system. In those cases, there does not seem to be a way to avoid one or both of the first two steps. Even in those cases where the attacker's goal could be achieved without establishing a permanent base, the third step usually represents an essential attacker goal. Based on the above reasoning, the disclosed system defines the policies outlined in steps 150-154 of FIG. 1D for attack detection that incorporate the attacker's objectives and means in customization of such policies.

Furthermore as outlined in FIG. 1F, in addition to focusing on the motive of the attacker and whether the act advances the attacker's high-level objections, in certain embodiments, the system also determines the means of the attacker. In certain aspects or embodiments, the disclosed system further analyzes factors such as whether the attacker can control the action. The system also determines whether the process performing the action is trustworthy.

Figure 2B:
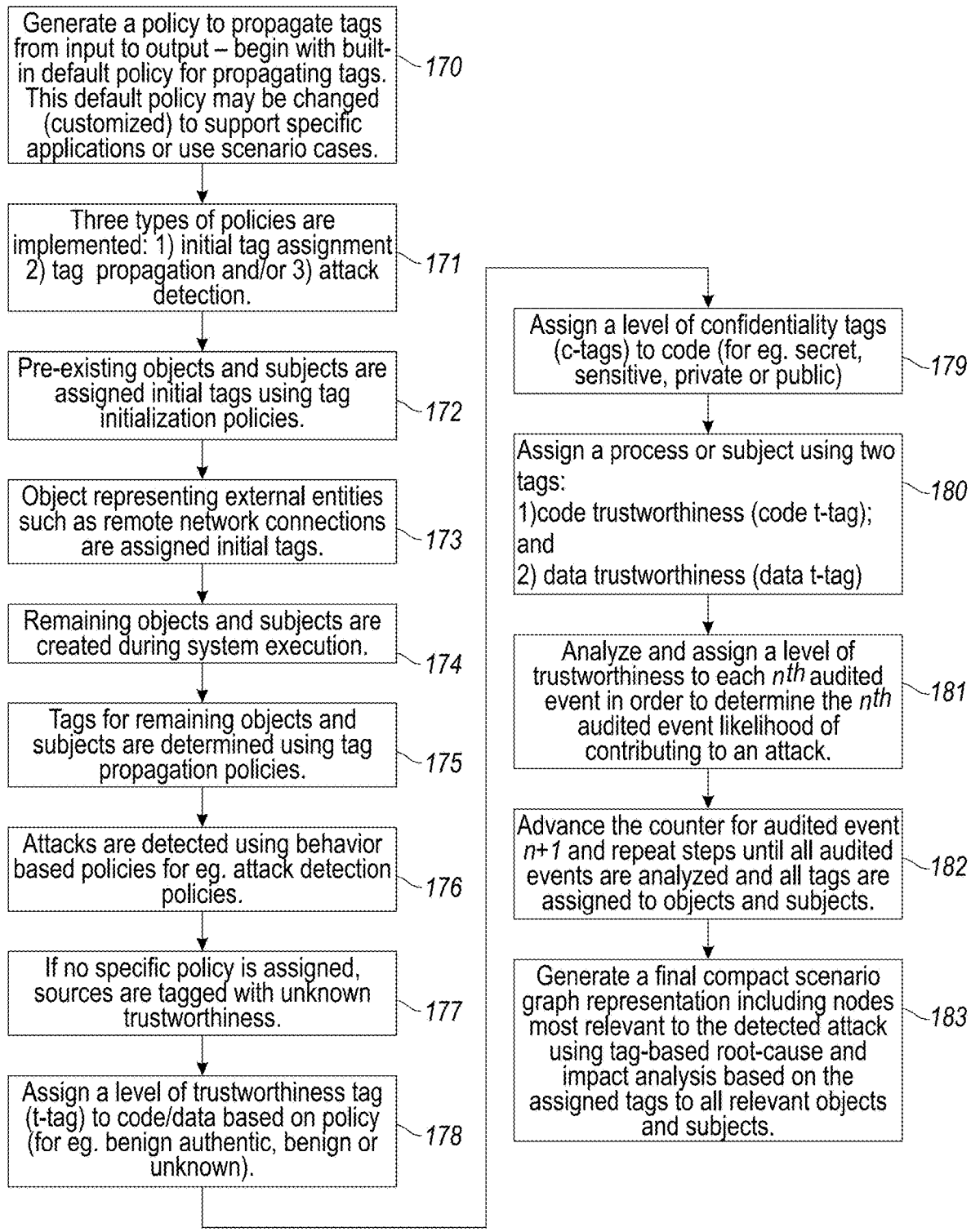
FIG. 2B provides a flowchart illustration of an embodiment associated with propagating of tags from input to output, including usage of objects and analysis of each audited event in generating a final compact scenario graph representation, in accordance with certain aspects or embodiments of the disclosed system.

FIG. 2B provides a flowchart illustration of an embodiment associated with propagating of tags from input to output, including usage of objects and analysis of each audited event in generating a final compact scenario graph representation, in accordance with certain aspects or embodiments of the disclosed system.

In step 170 the system generates a policy to propagate tags from input to output. In certain embodiments, the system commences with a built-in default policy for propagating tags. This default policy may be changed, modified and/or customized by the user or system to support specific applications or specific-use scenario cases. In general, the disclosed system and method is associated with implementation of one or more kinds of policies that are implemented in various forms and/or components as shown in FIG. 1. For example, as shown in FIG. 1, various policies can be implemented initially in component 2 during dependence graph construction in which initial tag assignments occur (for example, using a default policy), customizable policies component 4 (permitting customization) and during tag and policy-based attack detection—component 5. The three policies shown in step 171 of FIG. 2B, include 1) initial tag assignment; 2) tag propagation and/or 3) attack detection. In step 172 pre-existing objects and subjects are assigned initial tags using tag initialization policies. Objects representing external entities such as remote network connections are assigned initial tags in step 173. Remaining objects and subjects are created during system execution in step 174. Any tags for remaining objects and subjects are determined using tag propagation policies in step 175. Next, attacks are detected using behavior based policies for example, using attack detection policies in step 176. If no specific policy is assigned then sources are tagged with unknown trustworthiness in step 177. Next, the system in step 178 assigns a level of trustworthiness tag (t-tag) to code/data based on the set policy (for example, benign, authentic, benign or unknown). The system assigns a level of confidentiality tags (c-tags) to code (for example, secret, sensitive, private or public) in step 179. The system assigns a process or subject using a delineation and/or separation using for example, up to two tags in step 180 (code trustworthiness (code t-tag) and/or data trustworthiness (data t-tag). Additional contemplated tags for assignment to respective processes and/or subjects may be implemented in alternate embodiments. The system in certain embodiments analyzes and assigns a level of trustworthiness by incrementing the $n^{th}$ audited event counter in determination of whether the $n^{th}$ audited event has likelihood of contributing to the attack in step 181. The system will advance the counter for each audited event n+1 and repeat the steps until all audited events are analyzed and respective tags are assigned to all objects and subjects in step 182.

In this regard, the system in certain embodiments will perform a backward and/or forward analysis as described in connection with FIGS. 4, 4A-4D and 5A-5C further herein, in which entry points of an attack campaign are identified and/or further assess the impact of a campaign, beginning from one or more identified entry points (identified during backward analysis) and further identifying all the possible effects dependent on such determined entry point, during forward analysis. Forward analysis will implement a threshold value $d_{th}$ to exclude nodes that are "too far" from any suspect nodes. The same cost metric used for backward analysis may be implemented but further modified to consider confidentiality. Some alarms are related to exfiltration of confidential data, so the system would decide which edges represent the flow of confidential that should be included in the final compact scenario representation. Hence, following such analysis the system would generate a final compact scenario graph representation in step 183, in which nodes most relevant to the detected attack using tag-based root-cause and impact analysis (shown in component 6 of FIG. 1) and based on the assigned tags to all relevant subjects and objects associated with the received audited events during backward and/or forward analysis (described in FIG. 4 hereinbelow). In certain embodiments, edges between nodes with high confidentiality tags (e.g., secret) and nodes with low code integrity tags (e.g., unknown process) or low data integrity tags (e.g., unknown socket) are assigned a cost of low or zero (0), while edges to nodes with benign tags are assigned a high cost. The scenario graphs as described in FIGS. 6-12, are generally the result of forward analysis and provide a succinct view of the attack to facilitate analysis by the cyber and/or security analyst.

The result of backward and/or forward analysis as applied in step 183 results in a compact scenario graph representation with the following characteristics. 1) Pruning uninteresting nodes—the result of forward analysis may include many dependencies that are not relevant for the attack, e.g., subjects writing to cache and log files, or writing to a temporary file and then removing it. These nodes may appear in the results of the forward analysis, but no suspect nodes depend on them, so they can be pruned; 2) Merging entities with the same name—this simplification merges subjects that have the same name, disregarding their process ids and command-line arguments; and/or 3) Repeated event filtering—this simplification merges into one, those events that occur multiple times (e.g., multiple writes, multiple reads) between the same entities. If there are interleaving events, then two events are shown representing the first and the last occurrence of an event between the two entities.

Figure 2C:
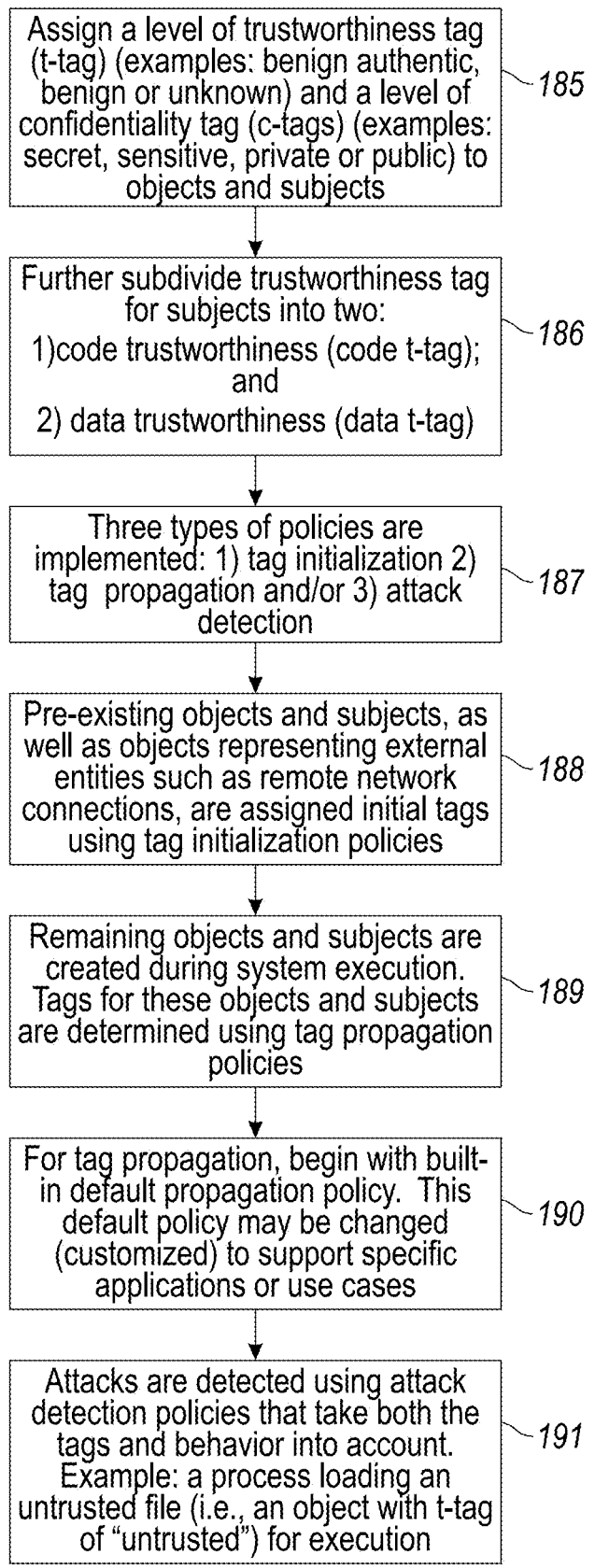
FIG. 2C provides a flowchart illustration of yet another embodiment associated with the assignment of tags using tag initialization policies, tags for other objects and subjects using tag propagation policies and customization of respective policy used in attack detection, in accordance with certain aspects or embodiments of the disclosed system.

FIG. 2C provides a flowchart illustration of yet another embodiment associated with the assignment of tags using tag initialization policies, tags for other objects and subjects using tag propagation policies and customization of respective policy used in attack detection, in accordance with certain aspects or embodiments of the disclosed system.

In step 185, the system assigns a level of trustworthiness tag (t-tag) such as above-described benign authentic, benign, unknown and/or other contemplated t-tag(s) associated with a level of trustworthiness. In addition, a level of confidentiality tag (c-tag) is assigned for example, secret, sensitive, private, public and/or other contemplated c-tag(s) associated with a level of confidentiality. Next, at step 186, the system further subdivides the trustworthiness tag for subjects into two: 1) code trustworthiness (code-tag); and 2) data trustworthiness (data t-tag). Other contemplated subdivisions associated with the type of trustworthiness for subjects may be implemented and/or tags assigned. Next, three types of policies are implemented in step 187, in particular 1) tag initialization; 2) tag propagation and/or 3) attack detection policies as described hereinabove. Any pre-existing objects and subjects, as well as objects representing external entities such as remote network connections, are assigned initial tags using tag initialization policies in step 188. Remaining objects and subjects are created during system execution in step 189. Tags for these objects and subjects are determined using tag propagation policies in step 189. With respect to tag propagation, the system begins with a built-in default propagation policy in accordance with an embodiment in step 190. This default policy may be changed (and/or customized) to support or adapt to specific applications or use cases. Next, in step 191 attacks are detected using attack detection policies that take both the tags and behavior aspects into account. For example, a process loading an untrusted file (i.e. an object with t-tag of "untrusted") for execution is detected using an attack detection policy.

Figure 3A:
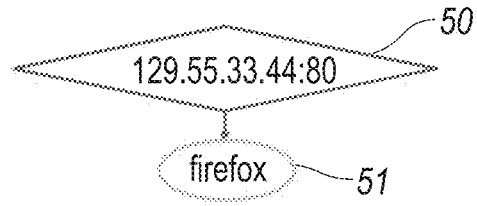
FIGS. 3A-3E provide illustrations of exemplary reconstruction scenario representations in graphical format, as associated with attack detection policies implemented in step-wise fashion, as outlined in overview FIGS. 1D and 1F. Each of FIGS. 3A-3E provide respective illustrations of reconstruction scenarios representations organized in step-wise sequential fashion, each in accordance with an embodiment of the disclosed system and method.
Figure 3B:
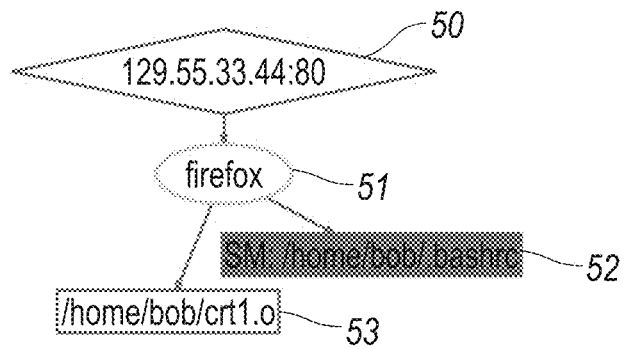

FIGS. 3A-3E provide exemplary reconstruction scenario representations in graphical format, as associated with attack detection policies (shown in component 5 of FIG. 1) implemented in step-wise fashion for an attack, as outlined in overview FIGS. 1D and 1F. Each of FIGS. 3A-3E provide respective illustrations of reconstruction scenarios representations organized in step-wise sequential fashion, each in accordance with an embodiment of the disclosed system and method. FIG. 3A, provides the IP address (129.55.33.44:80) of an untrusted source shown in red diamond 50. The yellow-orange color node 51 shows that firefox browser was launched which stems from and/or was read from a "red" untrusted location which was the IP address shown in red diamond 50. FIG. 3B shows the next level of attack detection with the addition of boxes 52 and 53. In particular, shown is red box 52, is the addition of SM, since the address has been flagged by the system as a suspicious modification (SM), and reads as SM:/home/bob.bashrc in box 52. Essentially a subject with a lower code tag modified a higher t-tag file, and hence, has been flagged or triggered by the system as an SM, as part of the attack detection policies component 5 of FIG. 1. The intruder has written to the file, /home/bob.bashrc in step 53, which is deemed by the system to be an untrusted file in box 52 since read from an untrusted source, IP address listed in diamond 50. Once data is propagated from an untrusted source, the system will flag a policy of a certain level.

Figure 3C:
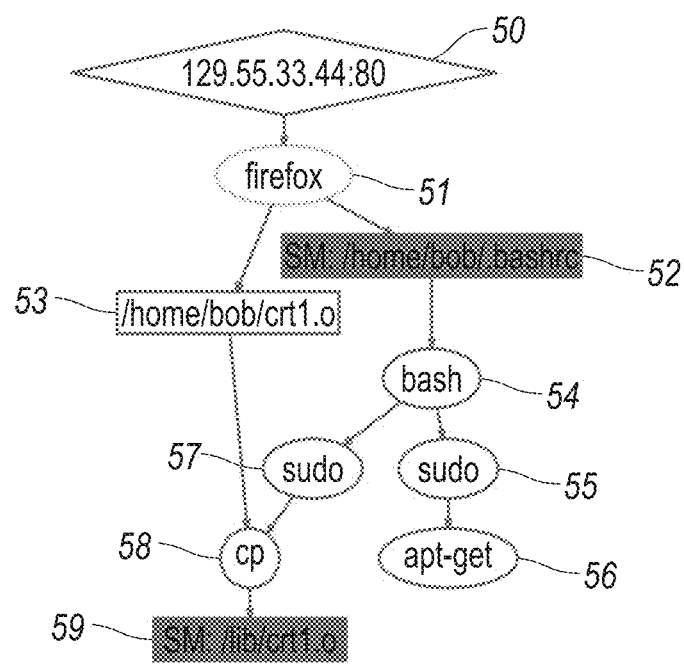

Proceeding to FIG. 3C, new steps or nodes 54-59 are now included. Various processes for example, base 54, sudo 55 and apt-get 56 are executed and in particular, apt-get node 56 requires software to install. Sudo 57 commanded the user to install new software apt-get 56. Node 58, cp indicates a copy is generated. However, in red box shown 59 with SM:/lib/crt1.0 flagged as suspicious modification, the shown attack actually required attacker to obtain administrative privileges on the machine. The user can not complete the next step until he/she obtains such administrative privileges to the machine. The file, lib/crt1.0 would have to be copied into a folder that only the administrator can achieve and hence, would have to trick the system so that the user obtains the administrative privileges thereto. A successful attack shown in FIG. 3C. would hence permit the user to obtain administrative privileges and gain access to the system, etc.

Figure 3D:
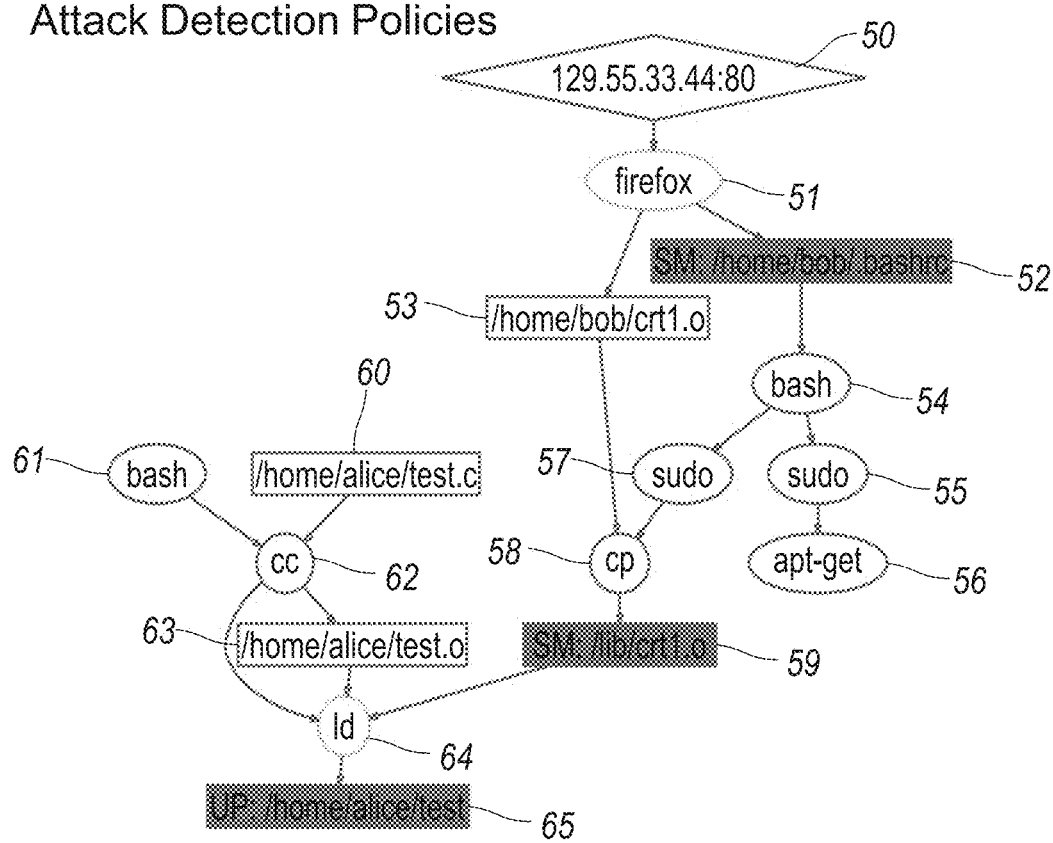

FIG. 3D is the next in the sequence of the attack scenario representation including steps or nodes 60-65. Step 60 (/home/alice/test.c) illustrates an innocent software developer using reputable software, ALICE. Alice is a software developer using source code to produce binary code and implementing innocuous steps at nodes 60-63. However, the attacker infects Alice at node 64 as shown in yellow-orange (which is indicative of an untrusted source). The Id shown at node 64 is used for applications during compilation and produces a final binary code that runs. The attacker code is now included in this test application that Alice deploys as indicated by flag UP (untrusted execution preparation) in the filed UP:/home/alice/test shown in red box 65. It is noted that innocent user "BOB" comprises the user machine at firefox node 51, with the attack shown as red box node 52 SM:/home/bob/.bashrc with download of file :/home/bob/bashrc, as well as at red node 59 shown. With respect to red box with SM:/lib/crt.o, it is noted that Bob acquired administrative privileges to the machine—occurring at process Id node 64 at which point node 64 is infected by node 59.

Figure 3E:
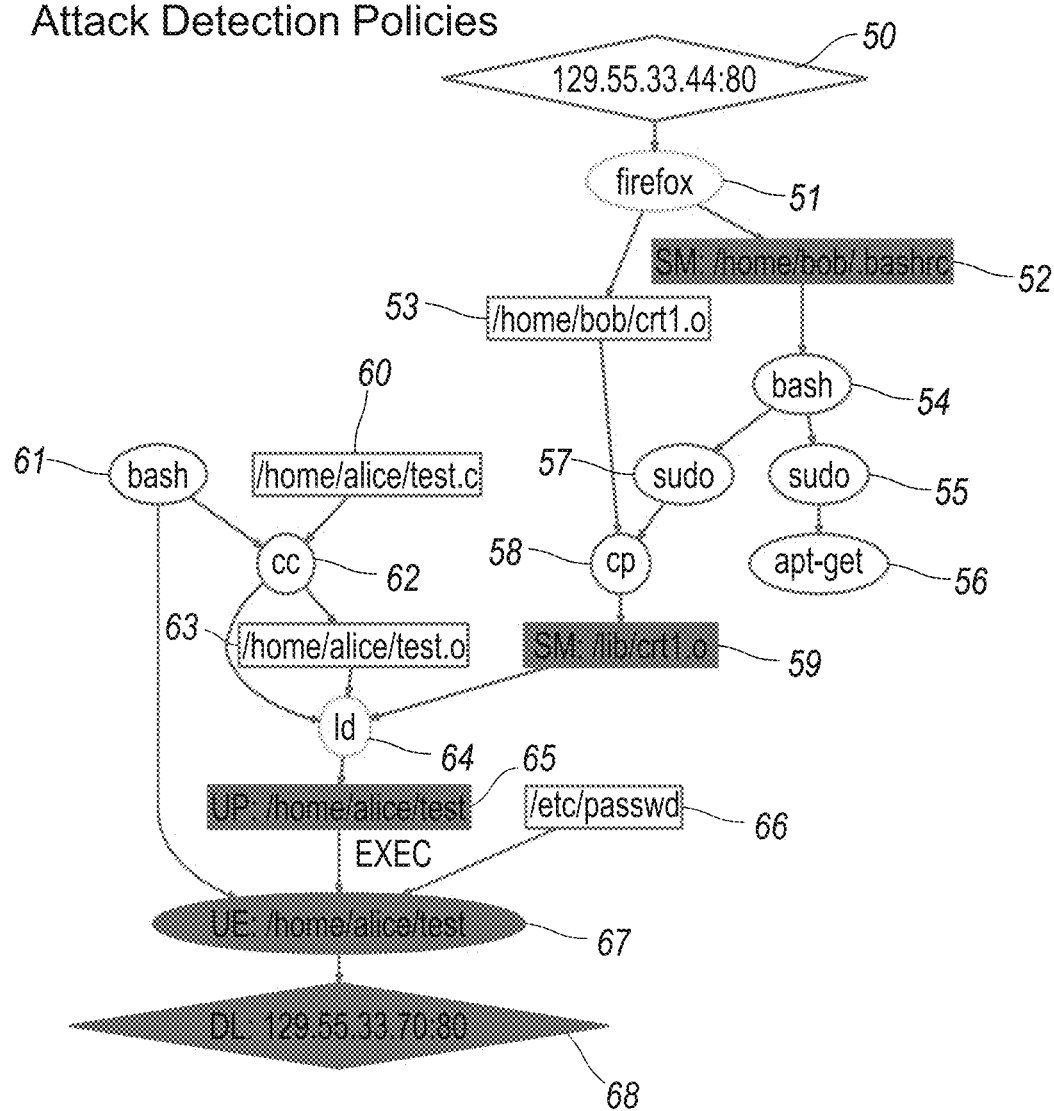

FIG. 3E is the final illustration in the sequence of the attack scenario representations, including new steps or nodes 66-68. Once node 61 bash seeks to execute a process, an alarm is triggered for node 67, flagging it as UP or "untrusted execution preparation" policy in which memory/file objects with low data trustworthiness are made executable. In addition the final diamond node 68 indicated in red color includes a data leak (DL) policy designation in which the untrusted subject, bob, writes confidential data to the network.

The attacker's goal shown in the scenario attack representations of FIGS. 3A-3E, was to insert his/her malware into software distributed by a reputed vendor, for example, ABC software. It is noted that no one will download and run code from the attacker, or anyone that the user does not trust much. However, users generally won't think twice about downloading a new version from a vendor that they trust. The approach used in the example shown was to replace a piece of code that is inserted into every binary by the C-language compiler. Such a piece of code exists within standard system folders. For the sake of concreteness, we say it is called /lib/crt1.o.

The challenge is that it is easy for attackers to use social engineering to get an ABC employee Bob to visit the attacker's web site. The system also assumes that the attacker has an exploit that can compromise Bob's web browser at this point. Unfortunately, this is not enough since the replacement of /lib/crt1.o requires admin access, but web browsers are usually run only with user privileges.

Hence, the solution for the attacker becomes that the attacker devise a two-step approach. In the first step, they compromise the web browser, which causes it to run attacker's code shown in steps 52-59 and 65-68. This code now modifies a user preference file called .bashrc in Bob's home folder in step 52.

Overwriting this file requires only user privileges, so the attacker succeeds. In a sense, a payload has been injected into this preference file that waits until such time Bob acquires admin privileges in order to install new software. At this point, this payload is triggered, and overwrites /lib/crt1.o.

As described hereinabove, tag assignment and propagation can be customized using policies. Policies as shown in connection with FIGS. 3A-3E can be invoked at trigger points, for example, object creation, removal, read, write, load, execute, chmod, and chown. The assignment can refer to subject, object and event attributes.

Tag initialization examples are provided below as:
init(o): match(o.name, "^IP:(10\.0|127)") → o.ttag = BENIGN_AUTH init(o): match(o.name, "^IP:") → o.ttag = UNKNOWN Tag propagation generally include a default initialization to propagate tags from input to output. However, customized policies can be created in order to capture exceptions during system implementation, for example to upgrade a tag after a hash/signature verification.

Referring back to FIG. 1, component 6 of an embodiment of the disclosed system and method includes tag-based root-cause and impact analysis. Such analysis can be accomplished by implementation of tag-based bi-directional analysis which in a preferred embodiment includes an initial backward analysis followed by a forward analysis. However, embodiments many cover alternate scenarios in which backward analysis or forward analysis alone is conducted or other variations thereof.

The general goal of backward analysis is to identify the entry points of an attack campaign. Entry points are the nodes in the graph with an in-degree of zero and are marked untrusted. Typically they represent network connections, but they can also be of other types, e.g., a file on a USB stick that was plugged into the victim host.

The starting points for the backward analysis are the alarms generated by the detection policies. In particular, each alarm is related to one or more entities, which are marked as suspect nodes in the graph. Backward search involves a backward traversal of the graph to identify paths that connect the suspect nodes to entry nodes. The direction of the dependency edges is reversed in such a traversal and in accordance with the description provided hereinbelow.

Backward searches can result in several significant challenges described further hereinbelow.

Performance: The dependence graph can easily contain hundreds of millions of edges. Alarms can easily number in thousands. Running backward searches on such a large graph is computationally expensive.

Multiple paths: Typically numerous entry points are backward reachable from a suspect node. However, in APT-style attacks, there is often just one real entry point. Thus, a naïve backward search can lead to a large number of false positives.

The key insight behind the novel approach of the disclosed system and method is that tags can be used to address both challenges. In fact, tag computation and propagation is already an implicit path computation, which can be re-used. Furthermore, a tag value of unknown on a node provides an important clue about the likelihood of that node being a potential part of an attack. In particular, if an unknown tag exists for some node A, that means that there exists at least a path from an untrusted entry node to node A. Hence, node A is more likely to be part of an attack than other neighbors with benign tags. Utilizing tags for the backward search greatly reduces the search space by eliminating many irrelevant nodes and sets the disclosed system and method apart from other scenario reconstruction approaches (citing Samuel T. King and Peter M Chen. Backtracking intrusions; In SOSP. ACM, 2003; Kyu Hyung Lee, Xiangyu Zhang, and Dongyan Xu. High accuracy attack provenance via binary-based execution partition. In NDSS, 2013).

Based on this insight, backward analysis is designed as an instance of shortest path problem, where tags are used to define edge costs. In effect, tags are able to "guide" the search along relevant paths, and away from unlikely paths. This factor enables the search to be completed without necessarily traversing the entire graph, thus addressing the performance challenge recited hereinabove. In addition, the shortest path formulation addresses the multiple paths challenge by preferring the entry point closest (as measured by path cost) to a suspect node.

In addition, in the determination of the shortest path, Dijkstra's algorithm is applied, as it discovers paths in increasing order of cost. In particular, each step of this algorithm adds a node to the shortest path tree, which consists of the shortest paths computed thus far. This enables the search to stop as soon as an entry point node is added to the tree.

Dijkstra's Shortest Path First algorithm, (SPF algorithm) is an algorithm for finding the shortest paths between nodes in a graph, which may represent, for example, road networks.

The algorithm exists in many variants. Dijkstra's original algorithm found the shortest path between two given nodes, but a more common variant fixes a single node as the "source" node and finds shortest paths from the source to all other nodes in the graph, producing a shortest-path tree.

In particular, for a given source node in the graph, the algorithm finds the shortest path between that node and every other. It can also be used for finding the shortest paths from a single node to a single destination node by stopping the algorithm once the shortest path to the destination node has been determined. For example, if the nodes of the graph represent towns or cities and edge path costs represent driving distances between pairs of respective towns or cities connected by a direct road (for simplicity, ignore red lights, stop signs, toll roads and other obstructions), Dijkstra's algorithm can be used to find the shortest route between one city and all other cities. A widely used application of shortest path algorithm is network routing protocols, most notably IS-IS (Intermediate System to Intermediate System) and Open Shortest Path First (OPSF). It is also employed as a subroutine in other algorithms such as Johnson's algorithm.

The Dijkstra algorithm uses labels that are positive integers or real numbers, which are totally ordered. It can be generalized to use any labels that are partially ordered, provided the subsequent labels (a subsequent label is produced when traversing an edge) are monotonically non-decreasing. This generalization is called the Generic Dijkstra shortest-path algorithm.

First, the system will define the node at which the analysis begins, as the initial node. Next, the distance of node Y is defined as the distance from the initial node to Y. Dijkstra's algorithm will assign some initial distance values and seeks to improve them step by step.

Second, the system next marks all nodes unvisited. It next creates a set of all the unvisited nodes called the unvisited set. It next will assign to every node a tentative distance value: set it to zero for the initial node and to infinity for all other nodes. Next, it will set the initial node as current.

Third, for the current node, the system will consider all of its unvisited neighbors and calculate their tentative distances through the current node. Next, it will compare the newly calculated tentative distance to the current assigned value and assign the smaller one. For example, if the current node A is marked with a distance of 6, and the edge connecting it with a neighbor B has length 2, then the distance to B through A will be 6+2=8. If B was previously marked with a distance greater than 8, then change it to 8. Otherwise, retain the current value.

Fourth, when the system has completed considering all of the unvisited neighbors of the current node, it marks the current node as visited and removes it from the unvisited set. A visited node will generally never be checked again.

Fifth, if the destination node has been marked visited (when planning a route between two specific nodes) or if the smallest tentative distance among the nodes in the unvisited set is infinity (when planning a complete traversal; occurs when there is no connection between the initial node and remaining unvisited nodes), then stop. The algorithm has completed it shortest path analysis. Otherwise, the system selects the unvisited node that is marked with the smallest tentative distance, sets it as the new "current node", and returns back to process the third step provided hereinabove.

In certain aspects or embodiments, when planning a route, it is actually not necessary to wait until the destination node is "visited" as above: the algorithm can stop once the destination node has the smallest tentative distance among all "unvisited" nodes (and thus could be selected as the next "current").

Cost-function design: In particular, the disclosed system and method using Dijkstra's shortest-path algorithm (or a variant thereof in certain embodiments), assigns low costs to edges representing dependencies on nodes with unknown tags, and assigns higher costs to other edges. Specifically, the costs are computed as follows in certain aspects or embodiments:

1) Edges that introduce a dependency from a node with unknown code or data t-tag to a node with benign code or data t-tag are assigned a cost of 0 (and/or low cost);

2) Edges introducing a dependency from a node with benign code and data t-tags are assigned a high cost; and/or 3) Edges introducing dependencies between nodes already having an unknown tag are assigned a cost of 1.

The intuition behind the above-described analysis is as follows. A benign subject or object immediately related to an unknown subject/object represents the boundary between the malicious and benign portions of the graph. Therefore, they must be included in the search, thus the cost of these edges is 0. Information flows among benign entities are not part of the attack, therefore we set their cost to very high so that they are excluded from the search. Information flows among untrusted nodes are likely part of an attack, so we set their cost to a low value. They will be included in the search result unless alternative paths consisting of fewer edges are available and/or determined to be available at some point during the analysis.

Therefore, in the determination of the shortest path, Dijkstra's algorithm is applied, in the backward analysis as it discovers paths in increasing order of cost. As described hereinabove, each step of this algorithm adds a node to the shortest path tree, which consists of the shortest paths computed thus far. This enables the search to stop as soon as an entry point node is added to the tree. Furthermore, such embodiment assigns low costs to edges representing dependencies on nodes with unknown tags and higher costs to other edges, for the reasons detailed hereinabove.

Even more particularly, during backward analysis, the system aims to identify each entry point of an attack. An entry point is a source (for example, a vertex with in-degree zero). The starting points become suspect vertices marked by the attack detectors of the disclosed system. Furthermore, the system processes each node to find source vertices from which a suspect vertex is reachable. The analysis can become quite complex as multiple sources may be identified by the system as a suspect vertex is reachable more multiple sources. Multiple suspect nodes can be identified such that many detectors can sound alarms or identify points of concern during such attacks, and hence, numerous vertices may appear suspicious when the system is reconstructing such COTS audit data.

FIG. 4 provides a flowchart illustration of tag-based bi-directional analysis used in generating a scenario graph reconstruction of audit data, in accordance with certain aspects or embodiments of the disclosed system. In particular, the tag-based bi-directional analysis process 70 shown in FIG. 4, begins with selection of forward or backward analysis in step 71. The selection of backward analysis in step 72 promulgates processing of at least 72-80 and in certain embodiments, forward analysis in steps 81-84 are next performed. Once backward analysis is selected in step 71, the starting point for backward analysis is set by alarms generated by attack detection policies in step 72.

In particular, in step 73 each alarm is related to one or more entities, which are marked as suspect nodes in the graph. A backward search involves a backward traversal of the graph to identify paths that connect the suspect nodes to entry nodes. The direction of the dependency edges 19 is reversed in such a traversal and in accordance with the below description. The edges 19 denote audit events (e.g., operations such as read, write, execute, and connect) and generally connect nodes 18 (e.g., vertices or nodes represent subjects (processes) and objects (files, sockets)).

The system next performs backward traversal of the graph in step 74, during which tags are used to address challenges. The dependence graph can easily contain hundreds of millions of edges. Alarms can easily number in the thousands and higher. Hence, running backward searches on such a large graph is computationally expensive. Typically numerous entry points are backward reachable from a suspect node. However, in APT-style attacks, there is often just one real entry point which the disclosed system is able to hone in on. Prior based back searches are naïve and can lead to a large number of false positives, which the currently disclosed system eliminates.

Tags as described hereinabove are implemented to avoid such issues with backward traversal. In fact, tag computation and propagation is already an implicit path computation, which can be reused. Furthermore, a tag value of unknown on a node provides an important clue about the likelihood of that node being a potential part of an attack. In particular, if an unknown tag exists for some node A, that means that there exists at least a path from an untrusted entry node to node A, therefore node A is more likely to be part of an attack than other neighbors with benign tags. Utilizing tags as described hereinabove in example FIGS. 1A-1F for the backward search, greatly reduces the search space by eliminating many irrelevant nodes and sets the system apart from other scenario reconstruction approaches.

In step 76, the system identifies paths that connect suspect nodes to entry nodes. An entry node corresponds to an incoming network connection, for example. The direction of dependency is reversed during the backward search based on the identified entry node(s) (for example the search starts at node 67, tracing backward to node 50, which is the suspect entry node shown in FIG. 4A).

The analysis is formulated in step 77 as a shortest weighted path in the dependence graph from a suspect node to any entry point node previously identified in steps 72-73. Based on this insight, backward analysis is performed as an instance of shortest path problem, where tags are used to define edge costs. In effect, tags are able to "guide" the search along relevant paths, and away from unlikely paths. This factor enables the search to be completed without necessarily traversing the entire graph, thus addressing the performance challenge. In addition, the shortest path formulation addresses the multiple paths challenge by preferring the entry point closest (as measured by path cost and/or weight) to a suspect node.

In step 78 the weight of an edge is considered in such analysis and is based on analysis of the tags of the two nodes connected by an edge. Edges propagating unknown code tags are given very low weight. While edges propagating unknown data tags are given medium weight. Edges propagating benign tags are given a high weight. In step 79, once these custom edge weights are set, any standard shortest weighted path algorithm on graphs can be implemented. The current embodiment implements Dijkstra's algorithm due to factors such as simplicity, among others.

In particular, for the shortest weighted path, the disclosed system implements Dijkstra's algorithm, as it discovers paths in increasing order of cost or weight. In particular, each step of this algorithm adds a node to the shortest path tree, which consists of the shortest paths computed so far. This enables the search to stop as soon as an entry point node is added to this tree.

If the shortest path is deemed unsatisfactory by the analysis, the system enumerates the next shorter path and so on, until the analyst is satisfied in step 80.

An example implementation of a backward analysis is shown and described in connection with FIGS. 4A-4D hereinbelow.

Referring back to FIG. 4, once forward analysis is selected in step 71 (in certain embodiments, forward analysis is selected following steps 72-80 of a backward analysis), the system begins analysis at the entry point node and discovers or identifies all possible effects of such entry point in step 81. The system uses the distance threshold value $d_{th}$ to exclude any nodes that are too distant from the entry_point_node in step 82. The analyst may start with a small value for the $d_{th}$ and refine it successively if needed or desired to achieves more refined results in step 83. In certain embodiments, edges between nodes with high confidentiality tags (eg, secret) and nodes assigned low integrity tags (eg. low code or low data) are assigned a cost value of low cost.

The distance is defined using the same edge weights as in the backward analysis (for example, as determined in step 78 of FIG. 4) but may be altered in certain embodiments to incorporate confidentiality as shown in step 84. More particularly, in step 84, edge weights for forward analysis are assigned using the same criteria as backward analysis, in certain aspects as defined in step 78 of backward analysis. For example the weight of an edge is based on the tags of the two nodes connected by an edge. Edges propagating unknown code tags are given low weight. Edges propagating unknown data tags are given medium weight, while edges propagating benign tags are given a high weight. In certain embodiments, during forward analysis the confidentiality further may change the weight. It is further noted that in certain embodiments, edges to nodes with a benign tag is assigned a high cost.

In this regard, it is noted that the way in which edge weights are assigned is similar in forward and backward analysis but there may be variations in some of the specifics which differ. The weight of a path is defined in certain aspects or embodiments, as the sum of the weights of the edges in the path. The threshold value $d_{th}$ sets a limit on this total weight—it can also be likened to a distance value, in certain embodiments. Nodes in the graph that are farther than $d_{th}$ are omitted during the forward analysis. In other words, the analysis starts from the entry node, and moves forward up to the distance value, $d_{th}$.

In step 85, the system during forward analysis will generate a final compact scenario graph representation including nodes most relevant to the detected attack using tag-based root-cause and impact analysis, which is based on the tags assigned to all relevant objects and subjects associated with received audit events.

An example implementation of a forward analysis is shown and described in greater detail herein below in connection with FIGS. 5A-5C hereinbelow, following the description of backward analysis in FIGS. 4A-4D.

FIGS. 4A-4D provide an overview illustration of reconstruction of scenario representations in graphical format, specifically as associated with backward analysis traversal implemented in step-wise fashion, as outlined in flowchart illustration in FIG. 4. Each of FIGS. 4A-4D provide respective illustrations of reconstruction scenarios representations in step-wise sequential fashion, each in accordance with an embodiment of the disclosed system and method.

During backward analysis, the system prefers to analyze shorter paths over longer ones and further favors paths that avoid redundant edges. In addition, the system prefers edges corresponding to flow of any untrusted code, and to a lesser extent, any untrusted data. The system preference encodes using a custom edge-weight function to Dijkstra's shortest path algorithm described hereinabove.

Beginning with step 67, shown in red-filled ellipse 67, is the file UE:/home/alice test (flagged as policy UE: untrusted execution preparation), the system starts the backward analysis tracing backwards to the diamond 50 (outlined in red color for untrusted source) which shows the IP address 129.55.44.80 of the untrusted source. Node 51 (outlined in orange-yellow color) represents the launch of the Firefox application from the untrusted source diamond 50 (or a "red" location and/or "red" IP address). Similar to the representation FIG. 3D, but shown with the addition of the red arrow paths shown are red dotted paths between node(s) 51-56, 52-59 and 53-59 which are analyzed in step-wise fashion during the backward analysis. The green nodes 60-63 shown with several alternate dotted green pathways therebetween such nodes 60-63, represent benign/trusted content which are considered higher cost edges and are excluded from the search since not part of the attack. The system considers any information flows among benign entities as not part of the attack, and therefore the system sets their cost to very high so that they are excluded from the search.

The system hence seeks to determine the shortest path between node 67 and diamond node 50 which is shown in red solid arrow lines in FIG. 4B, in particular between nodes 57, 65, 64, 59, 58 and 53 (now shown with solid colored red lines or circles). In certain aspects or embodiments, the system sets the costs of any edges (e.g., operations such as read, write, execute, and connect) according to a preference encoded using a custom edge-weight function to Dijkstra's shortest weight algorithm. In particular, the weight of an edge is based on the tags of the two nodes connected by such edge. Edges propagating unknown code tags are assigned a very low weight. Edges propagating unknown data tags are assigned a medium weight. Edges propagating benign tags are assigned a high weight as described hereinabove in steps 77-79 of FIG. 4.

FIG. 4C now shows a further solid colored red arrows between node 51 and node 53. It is noted that nodes 67, 65, 59, 58 and 53, which represent edges in the graphical representation are analyzed in backwards fashion starting with node 67 backwards in the time sequence of events, to node 51, in order to track back the operations performed to the source of the attack, IP address 129.55.44:80 at diamond node 50.

FIG. 4D now shows a solid red-filled diamond 50 to highlight or flag the source of the IP address (i.e. 129.55.33.44:80) of the attack in the platform-neutral graphical representation that essential tracks the source backwards in a backwards traversal beginning from node 67, 65, 64, 59, 58, 53, 51 and hence, the source diamond node 50, in the example embodiment.

The goal of backward analysis is to identify the entry points of an attack campaign (shown as node 50 in FIG. 4D). Entry points are the nodes in the graph with an in-degree of zero and are marked untrusted. Typically such nodes represent network connections, but they can also be of other types, e.g., a file on a USB stick that was plugged into the victim host.

The starting points for the backward analysis are based on the alarms generated by the detection policies. In particular, each alarm is related to one or more entities, which are marked as suspect nodes in the graph. The backward search involves a backward traversal of the graph to identify paths that connect the suspect nodes to entry nodes. The direction of the dependency edges is reversed in such a traversal.

It is noted that generally, audit data from these OS(es) is processed into a platform-neutral graph representation, where vertices represent subjects (processes) and objects (files, sockets), and edges denote audit events (e.g., operations such as read, write, execute, and connect). This graph (for example, as shown in FIG. 4D or FIGS. 6-12) serves as the basis for attack detection as well as causality analysis and scenario reconstruction.

Figure 5A:
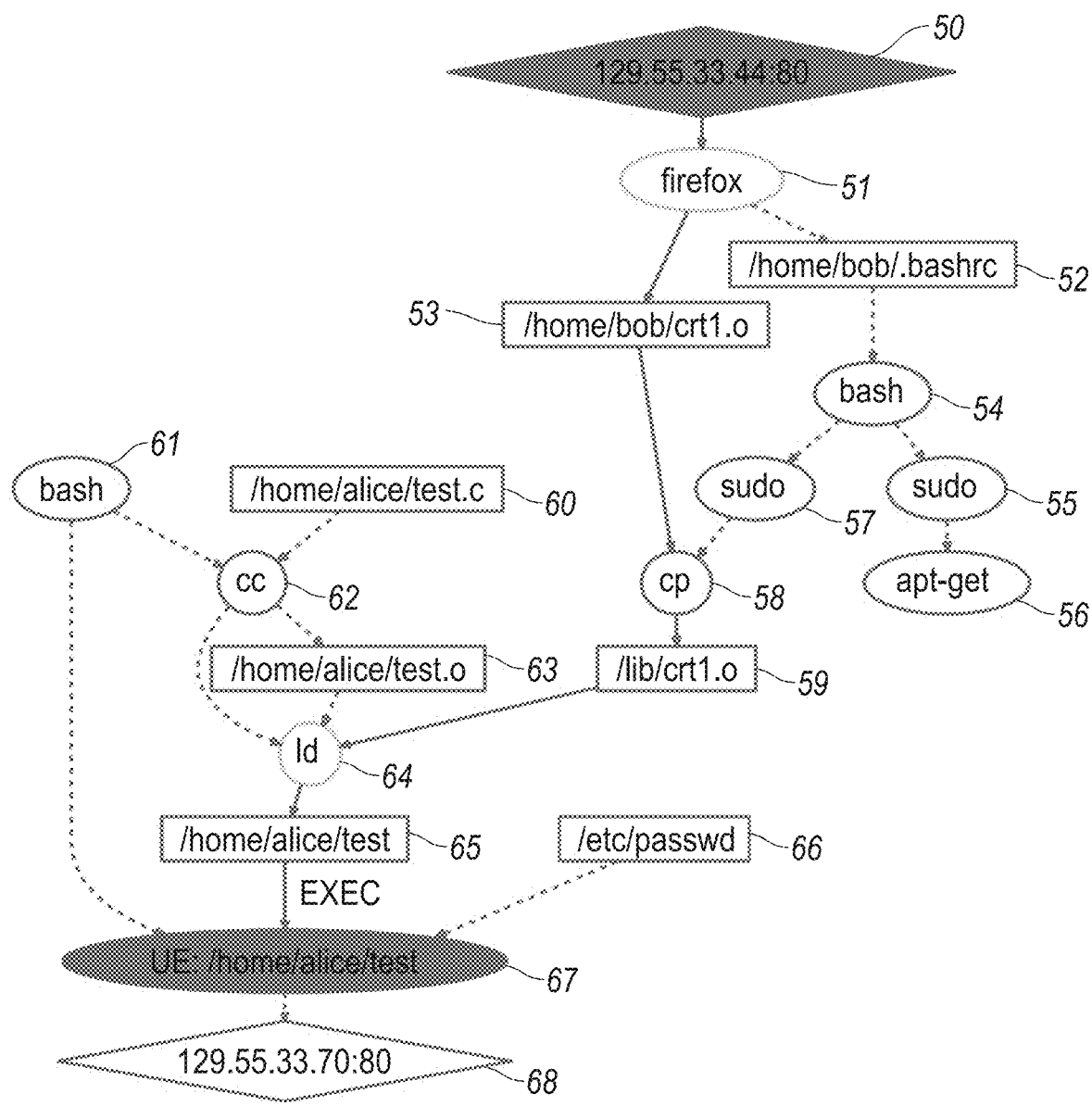
FIGS. 5A-5C provide overview illustrations of various reconstruction scenario representations in graphical format, specifically as associated with forward analysis traversal implemented in step-wise fashion, as outlined in flowchart illustration in FIG. 4. In particular, each of FIGS. 5A-5C provide respective illustrations of reconstruction scenario representations implemented incrementally in step-wise sequential formats, each in accordance with an embodiment of the disclosed system and method.
Figure 5B:
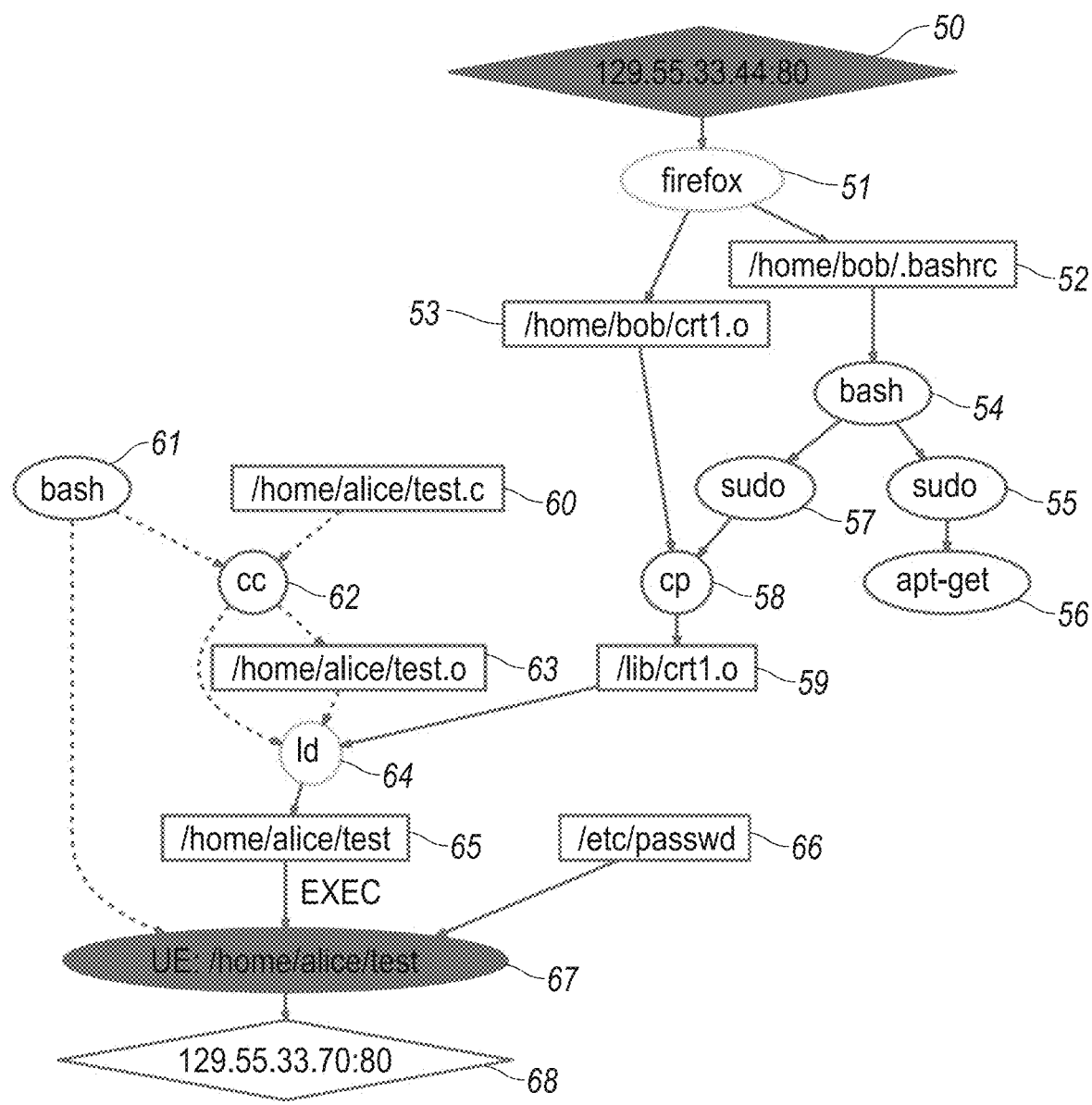
Figure 5C:
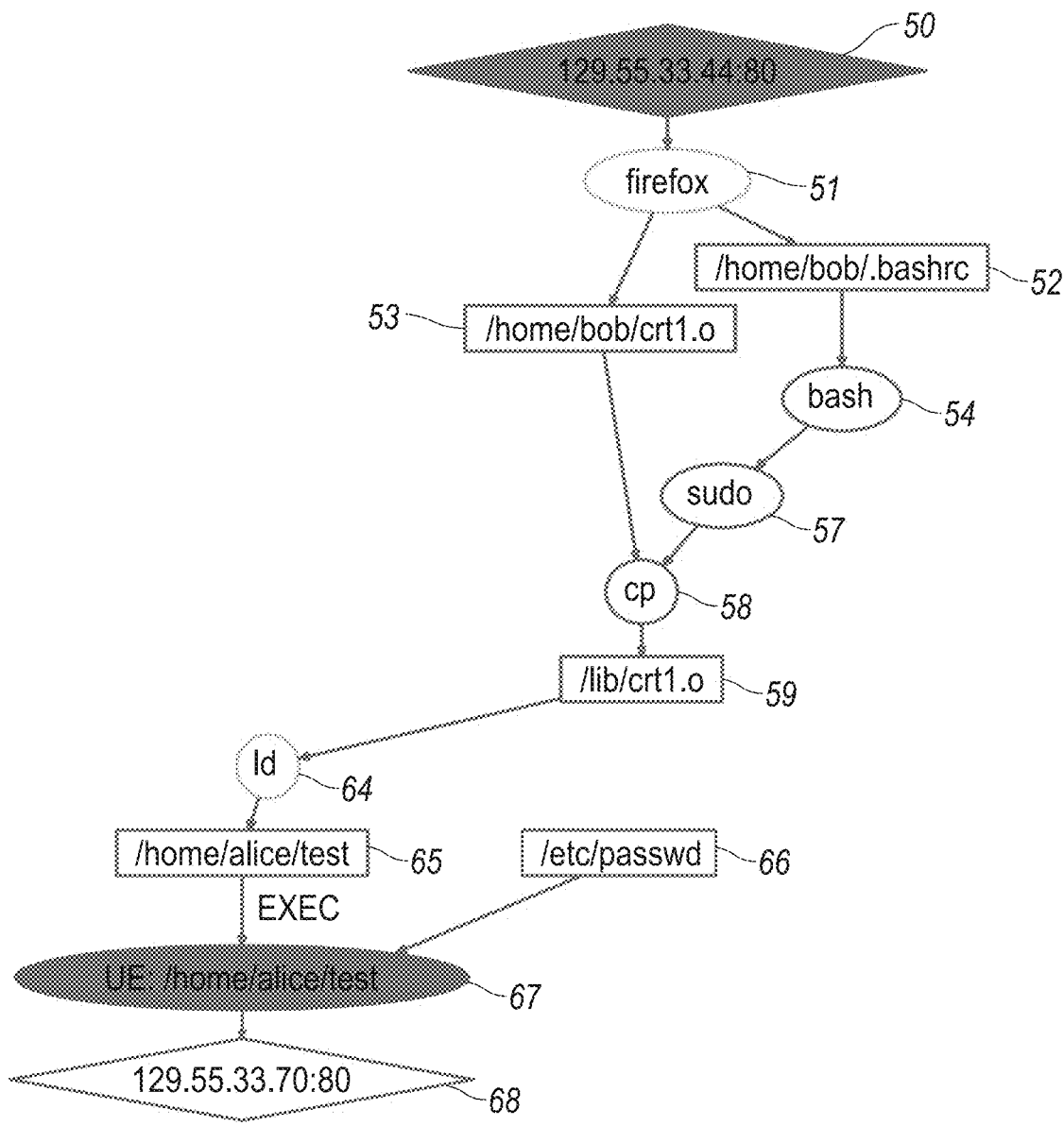

FIGS. 5A-5C provide overview illustrations of various reconstruction scenario representations in graphical format, specifically as associated with forward analysis traversal implemented in step-wise fashion, as outlined in flowchart illustration in FIG. 4. In particular, each of FIGS. 5A-5C provide respective illustrations of reconstruction scenarios representations implemented incrementally in step-wise sequential formats, each in accordance with an embodiment of the disclosed system and method.

The purpose of forward analysis is to assess the impact of a campaign, by starting from an entry point and discovering all the possible effects dependent on the entry point. Similar to backward analysis, the main challenge is the size of the graph. A naïve approach would identify and flag all subjects and objects reachable from the entry point(s) identified by backward analysis. Unfortunately, such an approach will result in an impact graph that is too large to be useful to an analyst. For instance, in experimental implementations, a naïve analysis produced impact graphs with millions of edges, whereas implementation using an embodiment of the disclosed refined algorithm reduces this number by for example, 100× to 500×.

In certain aspects or embodiments, one approach for reducing the size is to use a distance threshold $d_{th}$ to exclude nodes that are "too far" from the suspect nodes. Threshold $d_{th}$ can be interactively tuned by an analyst. The system can use the same cost metric that was used for backward analysis, but modified to consider confidentiality aspects as well. Certain alarms are related to exfiltration of confidential data so the system in such cases would also consider which edges representing the flow of confidential information should be included in the scenario. In particular with respect to implementation of cost metric, edges between nodes with high confidentiality tags (e.g., secret) and nodes with low code integrity tags (e.g., unknown process) or low data integrity tags (e.g., unknown socket) are assigned a cost of 0, while edges to nodes with benign tags are assigned a high cost.

As described in step 84 of FIG. 4, edge weights for forward analysis are assigned using the same criteria as backward analysis, in certain aspects as defined in step 78 of backward analysis. For example the weight of an edge is based on the tags of the two nodes connected by an edge. Edges propagating unknown code tags are given low weight. Edges propagating unknown data tags are given medium weight, while edges propagating benign tags are given a high weight. In certain embodiments, during forward analysis the confidentiality further may change the weight. It is further noted that in certain embodiments, edges to nodes with a benign tag is assigned a high cost.

Referring to FIGS. 5A-5C, the goal of the disclosed system and method is to identify attack impact in terms of all objects/subjects affected by the attack. The system will generate a subgraph of the provenance graph that only includes objects and subjects that are affected by the attack. In certain embodiments, the starting point of the forward analysis identified as the source (node 50), which is based on and identified during the initial implementation of the backward analysis described hereinabove in connection with FIGS. 4A-4D.

The challenge is that straight-forward dependence analysis may yield a graph with hundreds of thousands or even millions of edges. Hence, the system will implement a cost metric to actually prune off distant node, for example, nodes that lie at a distance greater than $d_{th}$ (i.e. distance≥$d_{th}$). In particular determine the initial point of entry of the attacker using the backward analysis described in FIGS. 4A-4D, and then move forward to perform a forward analysis to assess the impact of the campaign. Hence, the system will use the cost metric to prune off distant nodes (i.e. distance≥$d_{th}$). The cost metrics favor edges with untrusted code trustworthiness as their cost is set to zero (0) (i.e. cost for untrusted code=0). Next to a lesser degree, edges with untrusted data trustworthiness has a cost set to one (1) (i.e. cost for untrusted code=1).

The system focuses the initial phase of the analysis with the red dashed arrows shown in FIG. 5A between nodes 51-56 and nodes 54-58, beginning with identification of the source of the attack, shown at node 50 as IP address (129.55.33.44:80) at solid red-filled diamond node 50 and then tracking to edges indicating instances of untrusted code. It is noted that dotted pathways between red outlined nodes 51-56 and nodes 54-58 become relevant and/or interesting in the forward analysis as shown in FIG. 5B, and are now shown as solid red lines (i.e. shown as solid red lines between nodes 51-56 and nodes 54-58).

It is further noted that the system will prune off the green nodes 60-63, as those are trusted and not relevant or interesting since they are considered benign. The system will define further simplifications on output such as prune nodes lacking "interesting" descendants, merge "similar" entities and remove any repetitions throughout.

The greater the distance, the less control the attacker would have, hence the system finds distance as an indication of how much influence the attacker has influence or control on an attack. Hence, in FIG. 5C, the system has pruned off green outlined nodes 61-63 as they represent benign influence. It is further noted that the system will prune off red outlined nodes 54-56 shown in FIG. 5B, as the pathway represents a broken chain with respect to the relevant portions of the attack. The result of forward analysis may include many dependencies that are not relevant for the attack, e.g., subjects writing to cache and log files, or writing to a temporary file and then removing it. These nodes may appear in the results of the forward analysis but no suspect nodes depend on them, so they can be pruned (for example nodes 54-56 in FIG. 5B).

While visually, the shortest path is not always the shortest path because of cost metrics, the system considers factors such as relevant based on influence or control on the attack. In the shown embodiment, the pathway delineated by nodes 54-59 are considered more relevant, as shown in FIG. 5C, and the pathway defined by nodes 54-56 are not relevant and are hence, deleted or pruned from the final graphical representation as shown in FIG. 5C.

As described in step 85 of FIG. 4, during forward analysis the system will generate a final compact scenario graph representation that includes nodes most relevant to the detected attack using root-cause and impact analysis based on the assigned tags to all relevant objects and subjects (as shown and described in connection with component 6 and 7 of FIG. 1).

As an example, if a path has 1000 edges, all such edges if assigned a cost=0 will be included in the graphical representation (as they likely represent some level of untrusted code trustworthiness).

In certain aspects or embodiments of forward analysis, during reconstruction and presentation, the system will apply the following simplifications to the output of forward analysis, in order to provide a more succinct view of the attack into final compact form as described in step 85 of FIG. 4.

1) Pruning uninteresting nodes: The result of forward analysis may include many dependencies that are not relevant for the attack, e.g., subjects writing to cache and log files, or writing to a temporary file and then removing it. These nodes may appear in the results of the forward analysis but no suspect nodes depend on them, so they can be pruned.

2) Merging entities with the same name: This simplification merges subjects that have the same name, disregarding their process ids and command-line arguments.

3) Repeated event filtering: This simplification merges into one those events that happen multiple times (e.g., multiple writes, multiple reads) between the same entities. If there are interleaving events, then we show two events representing the first and the last occurrence of an event between the two entities.

FIGS. 6-12 each represent various implementations of different audit data sets that are processed by the disclosed system and method, resulting in platform-neutral graphical scenario representations. Specifically, vertices represent subjects (processes) and objects (files, sockets), and edges denote audit events (e.g., operations such as read, write, execute, and connect). Each of the graphs representations shown in FIGS. 6-12 serves as the basis for attack detection as well as causality analysis and scenario reconstruction. In addition, the events are labeled in sequence number beginning with 1-45, and represent the sequence of flow/steps in each of the FIGS. 6-12. In each of the graphs shown in FIGS. 6-12, edge labels include the event name and a sequence number that indicates the global order in which that event was performed. Ovals, diamonds and rectangles represent processes, sockets and files, respectively.

FIG. 6 provides an illustration of a scenario graph representation reconstructed from campaign F-3, in accordance with an embodiment of the disclosed system and method.

Figure 7:
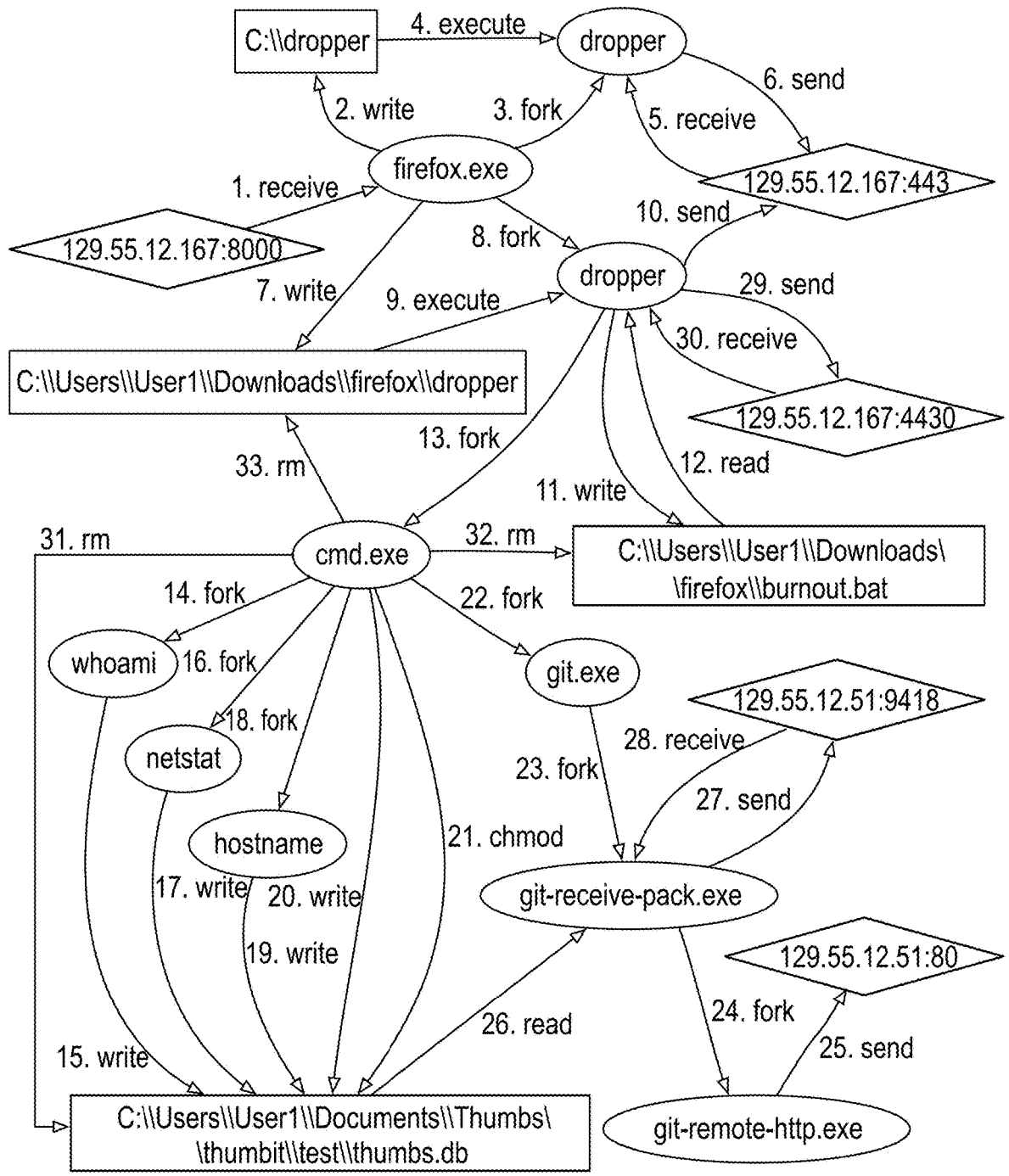
FIG. 7 provides an illustration of a scenario graph representation reconstructed from campaign W-2, in accordance with an embodiment of the disclosed system and method.

FIG. 7 provides an illustration of a scenario graph representation reconstructed from campaign W-2, in accordance with an embodiment of the disclosed system and method.

Figure 8:
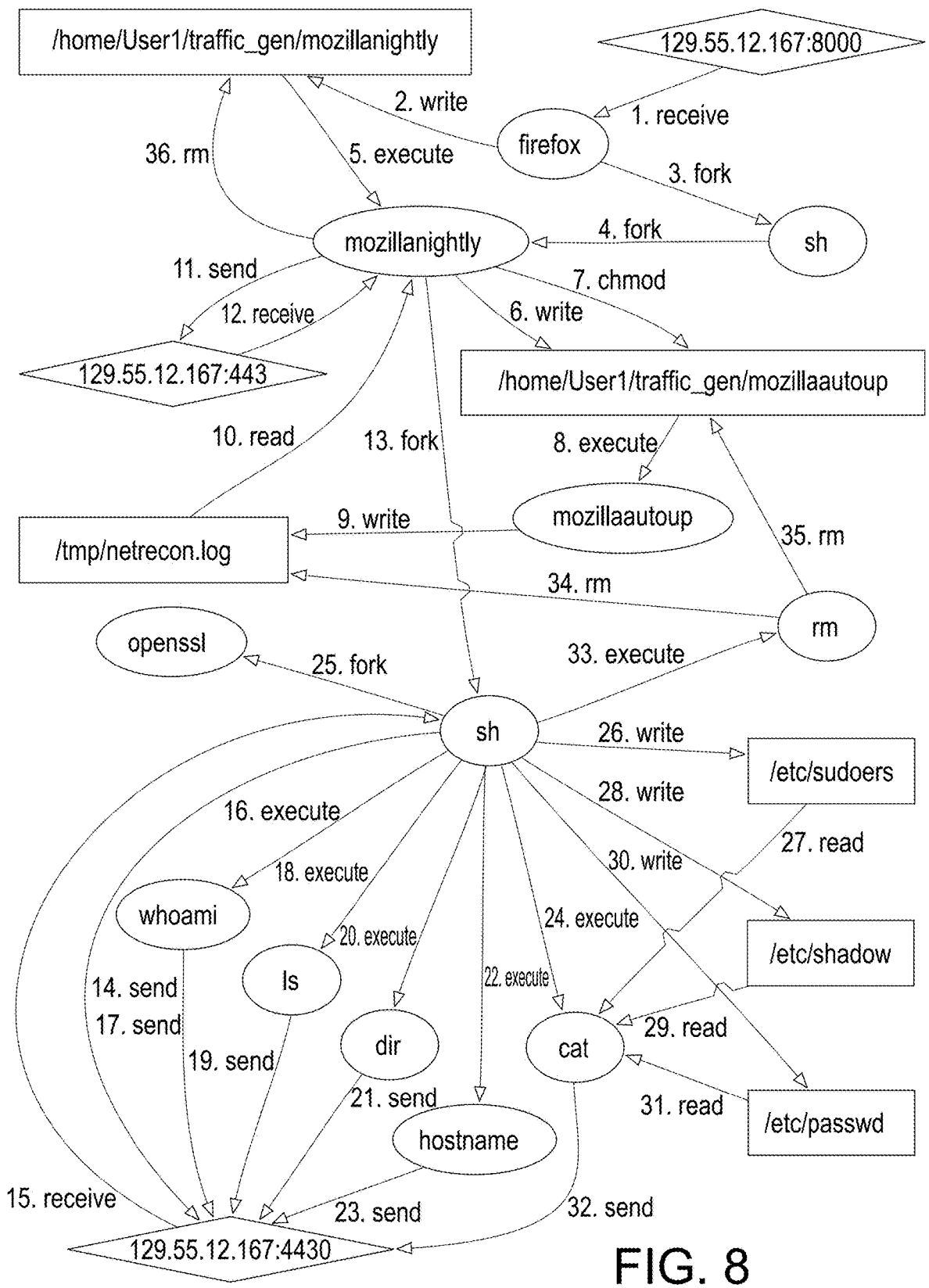
FIG. 8 provides an illustration of a scenario graph representation reconstructed from campaign L-1, in accordance with an embodiment of the disclosed system and method.

FIG. 8 provides an illustration of a scenario graph representation reconstructed from campaign L-1, in accordance with an embodiment of the disclosed system and method.

Figure 9:
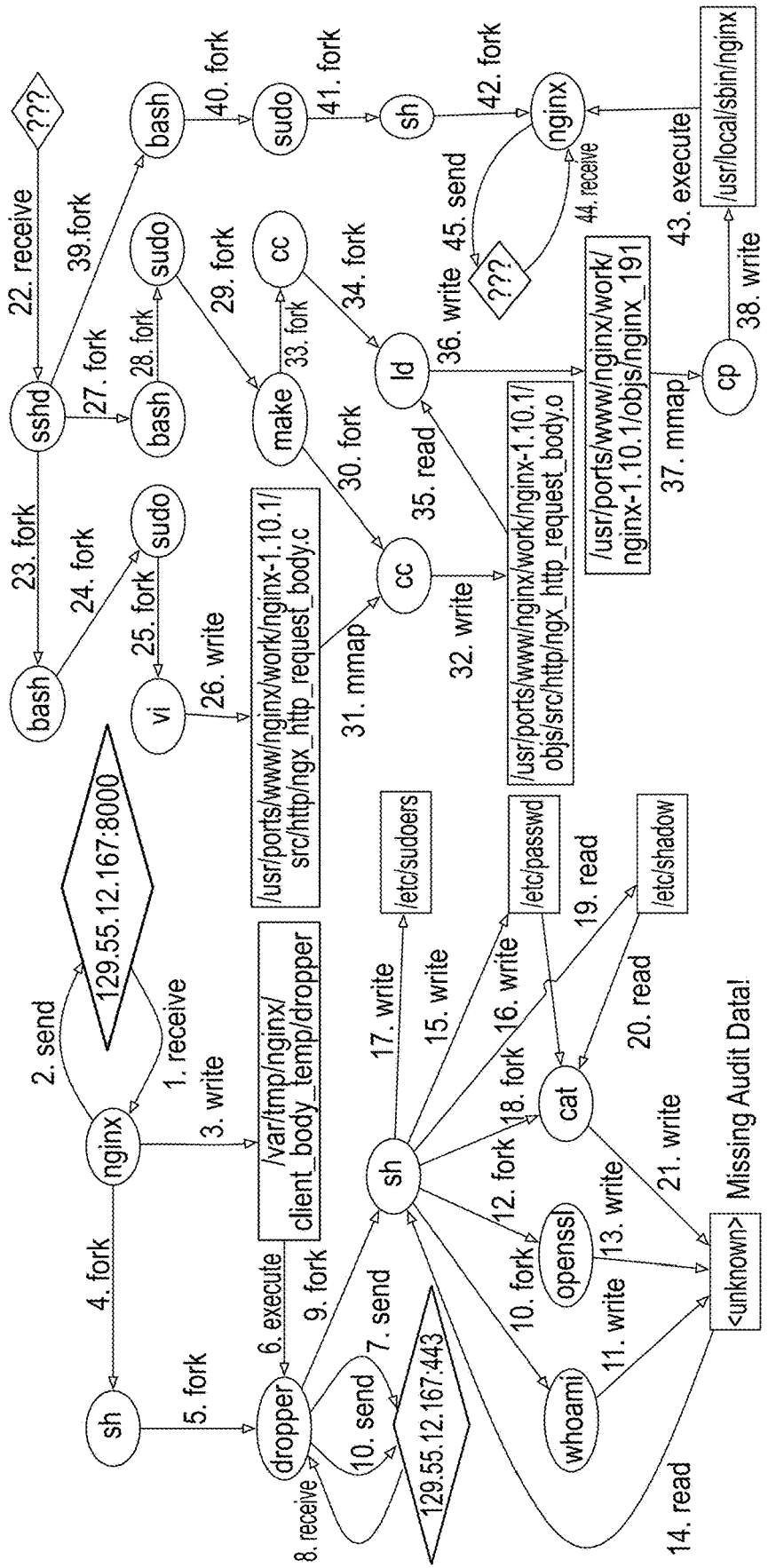
FIG. 9 provides an illustration of a scenario graph representation reconstructed from campaign F-1, in accordance with an embodiment of the disclosed system and method.

FIG. 9 provides an illustration of a scenario graph representation reconstructed from campaign F-1, in accordance with an embodiment of the disclosed system and method.

Figure 10:
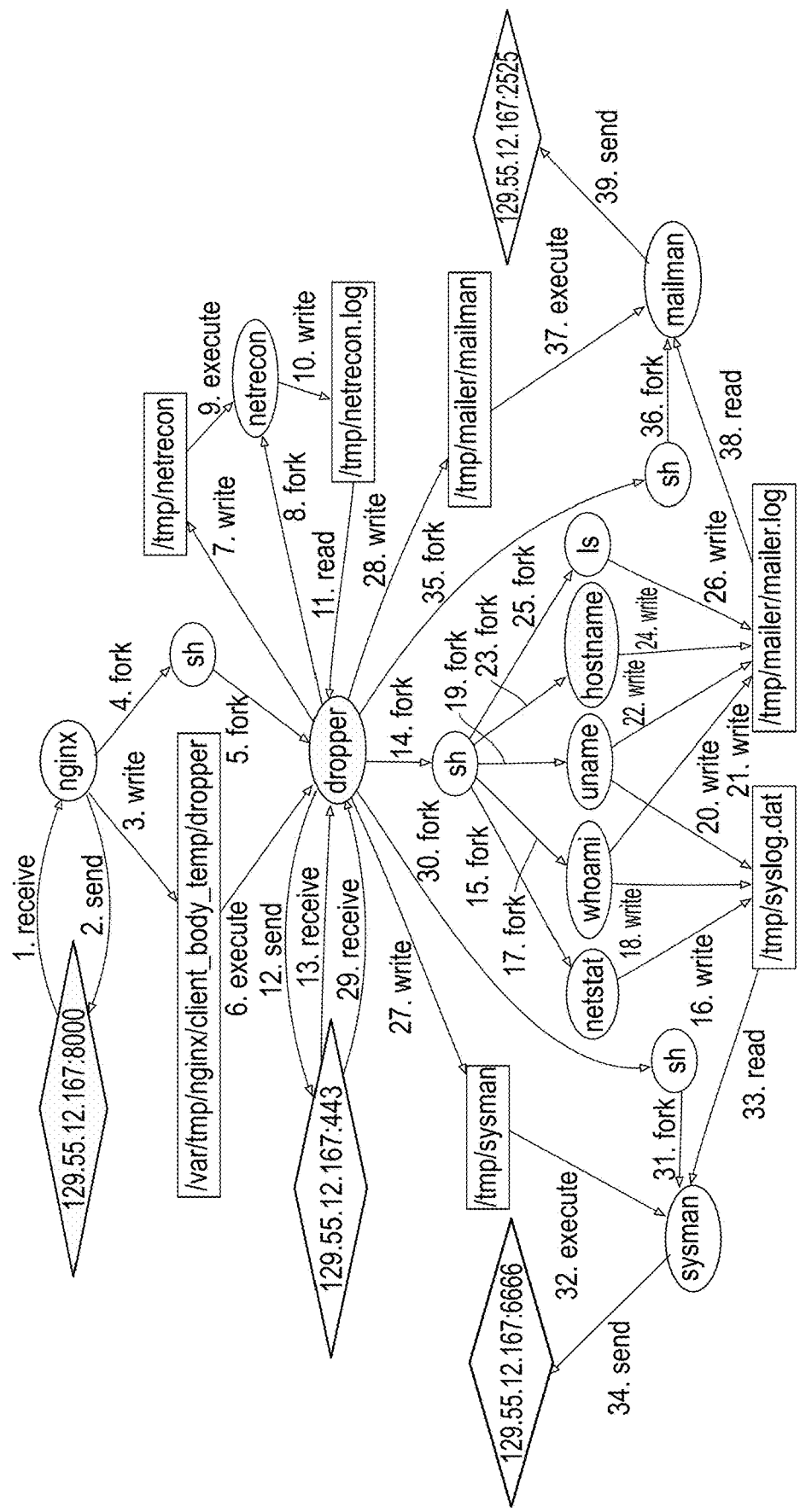
FIG. 10 provides an illustration of a scenario graph representation reconstructed from campaign F-2, in accordance with an embodiment of the disclosed system and method.

FIG. 10 provides an illustration of a scenario graph representation reconstructed from campaign F-2, in accordance with an embodiment of the disclosed system and method.

Figure 11:
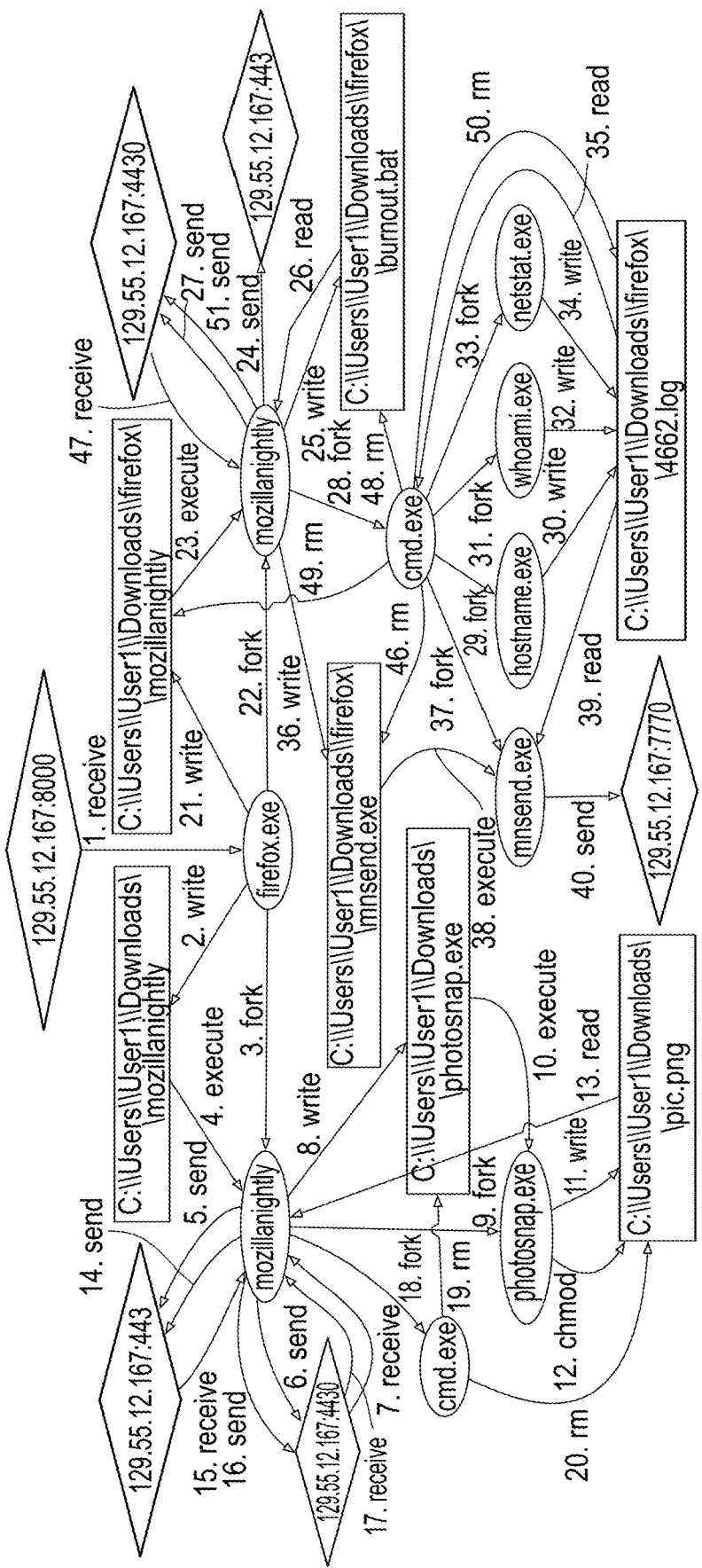
FIG. 11 provides an illustration of a scenario graph representation reconstructed from campaign W-1, in accordance with an embodiment of the disclosed system and method.

FIG. 11 provides an illustration of a scenario graph representation reconstructed from campaign W-1, in accordance with an embodiment of the disclosed system and method.

Figure 12:
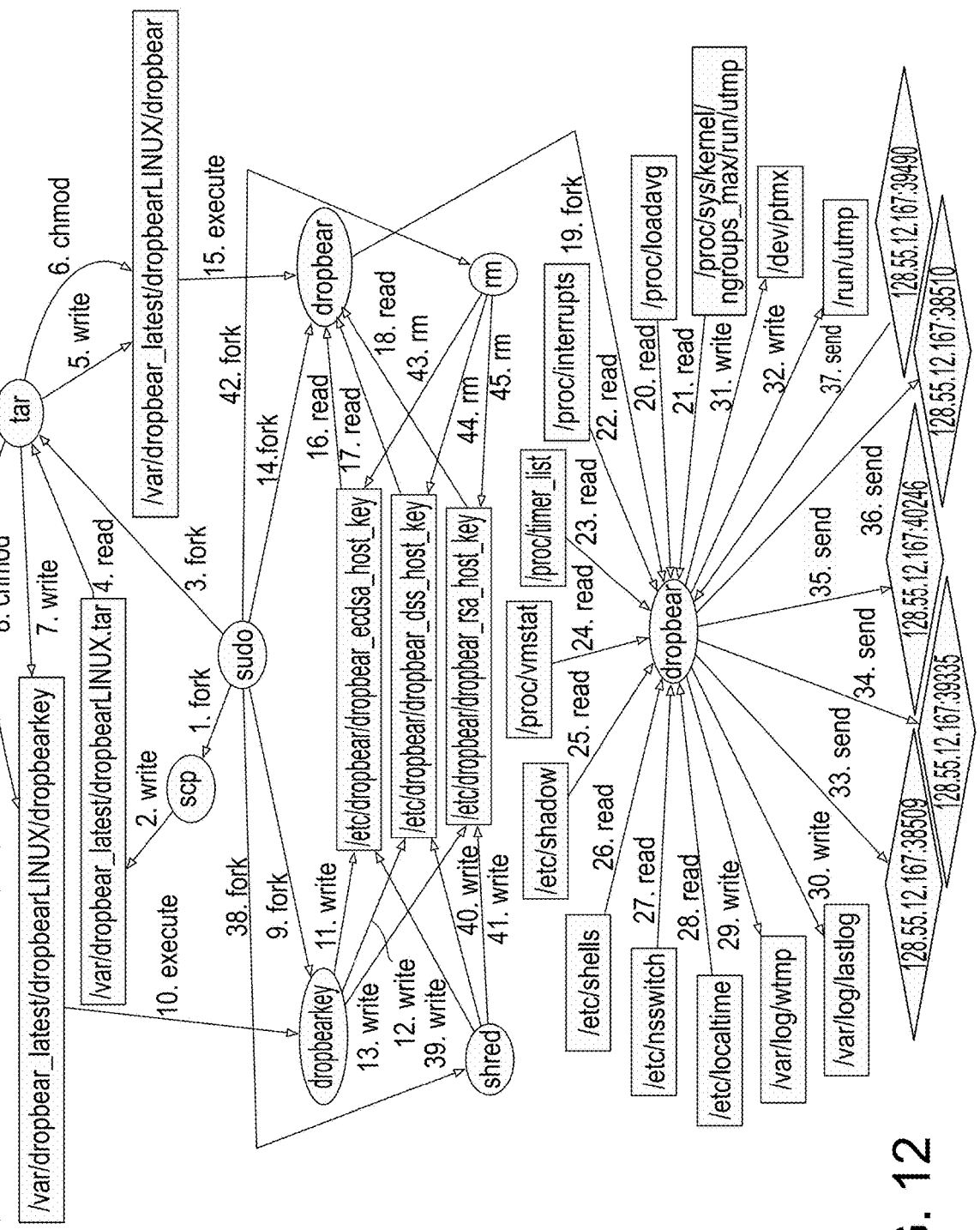
FIG. 12 provides an illustration of a scenario graph representation reconstructed from campaign L-3, in accordance with an embodiment of the disclosed system and method.

FIG. 12 provides an illustration of a scenario graph representation reconstructed from campaign L-3, in accordance with an embodiment of the disclosed system and method.

Further detail is provided hereinbelow with respect to description provided for FIGS. 6-12, respectively.

Experimental evaluations were conducted with implementation of the disclosed system and method. Most components of the disclosed system and method, including the graph model, policy engine, attack detection and some parts of the forensic analysis are implemented in various programming languages, for example, C++, and consist of about 9.5 KLoC. The remaining components, including that for reconstruction and presentation, are implemented for example, in Python, and consist of 1.6 KLoC.

Data sets implemented in such experimental evaluations are summarized in TABLE 2 hereinbelow.

TABLE 2

| Dataset | Duration (hh-mm-ss) | Open | Connect + Accept | Read | Write | Clone + Exec | Close + Exit | Mmap/ Loadlib | Others | Total # of Events | Scenario Graph |
|---|---|---|---|---|---|---|---|---|---|---|---|
| W-1 | 06:22:42 | N/A | 22.14% | 44.70% | 5.12% | 3.73% | 3.88% | 17.40% | 3.02% | 100K | FIG. 11 |
| W-2 | 19:43:46 | N/A | 17.40% | 47.63% | 8.03% | 3.28% | 3.26% | 15.22% | 5.17% | 401K | FIG. 7 |
| L-1 | 07:59:26 | 37% | 0.11% | 18.01% | 1.15% | 0.92% | 38.76% | 3.97% | 0.07% | 2.68M | FIG. 8 |
| L-2 | 79:06:39 | 39.58% | 0.08% | 12.19% | 2% | 0.83% | 41.28% | 3.79% | 0.25% | 38.5M | — |
| L-3 | 79:05:13 | 38.88% | 0.04% | 11.81% | 2.35% | 0.95% | 40.98% | 4.14% | 0.84% | 19.3M | FIG. 12 |
| F-1 | 08:17:30 | 9.46% | 0.40% | 24.65% | 40.86% | 2.10% | 12.55% | 9.08% | 0.89% | 701K | FIG. 9 |
| F-2 | 78:56:48 | 11.78% | 0.42% | 16.60% | 44.52% | 2.10% | 15.04% | 8.54% | 1.01% | 5.86M | FIG. 10 |
| F-3 | 79:04:54 | 11.31% | 0.40% | 19.46% | 45.71% | 1.64% | 14.30% | 6.16% | 1.03% | 5.68M | FIG. 6 |
| Benign | 329:11:40 | 11.68% | 0.71% | 26.22% | 30.03% | 0.63% | 15.42% | 14.32% | 0.99% | 32.83M | N/A |

In particular, TABLE 2 summarizes the datasets used in the evaluations, in particular, the dataset used for each campaign with duration, distribution of different system calls and total number of events. The first eight rows of TABLE 2 correspond to attack campaigns carried out by a red team as part of the DARPA Transparent Computing (TC) program. This set spans a period of 358 hours, and contains about 73 million events. The last row corresponds to benign data collected over a period of 3 to 5 days across four Linux servers in the research laboratory.

Various attack data sets were collected on Windows (W-1 and W-2), Linux (L-1 through L-3) and FreeBSD (F-1 through F-3) by three research teams that are also part of the DARPA TC program. The goal of these research teams is to provide fine-grained provenance information that goes far beyond what is found in typical audit data. However, at the time of the evaluation, these advanced features had not been implemented in the Windows and FreeBSD data sets. Linux data set did incorporate finer-granularity provenance (using the unit abstraction developed in Kyu Hyung Lee, Xiangyu Zhang, and Dongyan Xu. High accuracy attack provenance via binary-based execution partition. In NDSS, 2013). However, the implementation was not mature enough to provide consistent results in these tests. For this reason, any fine-grained provenance included in their dataset was omitted, falling back to the data they collected from the built-in auditing system of Linux. The FreeBSD team built their capabilities over DTrace. Their data also corresponded to roughly the same level as Linux audit logs. The Windows team's data was roughly at the level of Windows event logs. All of the teams converted their data into a common representation to facilitate analysis.

The "duration" column in TABLE 2 refers to the length of time for which audit data was emitted from a host. Note that this period covers both benign activities and attack related activities on a host. The next several columns provide a breakdown of audit log events into different types of operations. File open and close operations were not included in W-1 and W-2 data sets. Note that "read" and "write" columns include not only file reads/writes, but also network reads and writes on Linux. However, on Windows, only file reads and writes were reported. Operations to load libraries were reported on Windows, but memory mapping operations were not reported. On Linux and FreeBSD, there are no load operations, but most of the mmap calls are related to loading. Hence, the mmap count is considered a loose approximation of the number of loads on these two OSes. The "Others" column includes all the remaining audit operations, including rename, link, rm, unlink, chmod, setuid, and so on. The last column in the table identifies the scenario graph constructed by the disclosed system for each campaign. Due to space limitations, scenario graphs for campaign L-2 were omitted.

The attack scenarios in the evaluation were set-up as follows. Five of the campaigns (i.e., W-2, L-2, L3, F-2, and F3) ran in parallel for 4 days, while the remaining three (W-1, L-1, and F-1) were run in parallel for 2 days. During each campaign, the red team carried out a series of attacks on the target hosts. The campaigns are aimed at achieving varying adversarial objectives, which include dropping and execution of an executable, gathering intelligence about a target host, backdoor injection, privilege escalation, and data exfiltration.

Being an adversarial engagement, there was no prior knowledge of the attacks planned by the red team. The only information available was the broad range of attacker objectives described hereinabove. It is worth noting that, while the red team was carrying out attacks on the target hosts, benign background activities were also being carried out on the hosts. These included activities such as browsing and downloading files, reading and writing emails, document processing, etc. On average, more than 99.9% of the events corresponded to benign activity. Hence, the disclosed system and method had to automatically detect and reconstruct the attacks from a set of events including both benign and malicious activities.

The results were presented in comparison with the ground truth data released by the red team. Before the release of ground truth data, a report of the system's findings were provided to the red team. The findings reported matched the findings submitted to the red team. A summary of the detection and reconstruction results is provided in a tabular form in TABLE 3 hereinbelow. First presented are reconstructed scenarios for selected datasets before proceeding to a discussion of these summary results.

Selected Reconstruction Results:

Regarding the 8 attack scenarios successfully reconstructed by the disclosed system and method during evaluations, in particular, discussed hereinbelow are campaigns W-2 (Windows) and F-3 (FreeBSD) as shown in FIGS. 6 and 7, with description about the remaining 6 attack scenarios being provided in greater detail hereinbelow (with respect to FIGS. 8-12).

In order to simplify tracking activity in the scenario graph, a narrative is provided that explains how the attack unfolded. This narrative requires manual interpretation of the graph, but the graph generation itself is automated. In the exemplary scenario graphs shown in FIGS. 6-12, edge or audit event labels include the event name and a sequence number that indicates the global order in which that event was performed (and shown in numerical sequence values ranging from edge or audit event 1-45 for each graph, as applicable to indicate the sequence of respective actions). It is noted that these values 1-45 are not directed to any labels 1-45 as used in remaining figures throughout. It is noted that ovals, diamonds and rectangles represent processes, sockets and files, respectively in scenario graphs shown in FIGS. 6-12.

Campaign W-2: In particular with respect to FIG. 7, illustrated is the scenario graph reconstructed from campaign W-2 by the disclosed system and method based on system received Windows audit data, in accordance with an embodiment. The sequences provided as edge or audit event numbers 1-33 represent the global order of actions during the attack. Although the actual attack campaign lasted half an hour, the host was running benign background activities for 20 hours. These background activities corresponded to more than 99.8% of the events in the corresponding audit log.

Entry: The initial entry point for the attack is Firefox (near sequence 1), which is compromised on visiting the web server 129.55.12.167 (shown at audit event 10).

Backdoor insertion: Once the Firefox application is compromised, a malicious program called dropper is downloaded and executed (sequences 2-4). Dropper seems to provide a remote interactive shell, connecting to ports 443 and then 4430 on the attack host (at audit event 10 and 29 respectively), and executing received commands using cmd.exe.

Intelligence gathering: Dropper then invokes cmd.exe multiple times, using it to perform various data gathering tasks. The programs whoami, hostname and netstat are being used as stand-ins for these data gathering applications. The collected data is written to C:\Users\User1\Documents\Thumbs\thumbit\test\thumbs.db.

Data exfiltration: The collected intelligence is next exfiltrated to IP Address 129.55.12.51:9418 using git (at sequence 27).

Clean-up: Dropper downloads a batch file called burnout.bat. This file contains commands to clean up the attack footprint, which are executed by cmd.exe (see audit event or edges 11, 12, 31-33).

Campaign F-3. In particular with respect to FIG. 6, illustrated is the scenario graph reconstructed from campaign F-3 by the disclosed system and method based on system received Windows audit data, in accordance with an embodiment. The sequences provided as edge/sequence numbers 1-45 represent the global order of actions during the attack.

In particular, under the command of an attacker who uses stolen ssh credentials, sshd forks a bash process. Note that though there is no direct evidence from the audit data about the stolen ssh credentials. Because of the subsequent events (scp) from this shell, it can be concluded this is a sign of an attacker that uses stolen ssh credentials.

Dropbear next starts a shell process, which executes a series of commands 1s, bash, uname, ps, all of which write to a file /usr/home/user/procstats. Finally, dropbear starts a bash process, which uses scp to download a file called /usr/home/user/archiver (i.e. audit event 41), and executes that file. The resulting process, called archiver (i.e. audit event 43), reads the file/usr/home/user/procstats (i.e. audit event 44), which contains the data output earlier, and exfiltrates this information to 128.55.12.167:2525 (i.e. audit event 45).

Summary: The above-described graphs shown in FIGS. 6-7 were constructed automatically by the system from audit data. They demonstrate how the disclosed system enables an analyst to obtain compact yet complete attack scenarios from even just hours of audit data. The disclosed system is able to hone in on the attack activity with greater precision and particularity, even when the attack activity is hidden among benign data that is at least three orders of magnitude larger.

Overall Effectiveness: In order to assess the effectiveness of the system in capturing essential stages of an APT, shown in TABLE 3, are correlated portions of attack scenarios constructed by the disclosed system with APT stages documented in postmortem reports of notable APT campaigns (e.g., the MANDIANT report—Exposing One of China's Cyber Espionage Units. hups://www.fireeye.com/content/dam/fireeye-www/).

TABLE 3

| Dataset | Drop & Load | Intelligence Gathering | Backdoor Insertion | Privilege Escalation | Data Exfiltration | Cleanup |
|---|---|---|---|---|---|---|
| W-1 | ✓ | ✓ | | | ✓ | ✓ |
| W-2 | ✓ | ✓ | ✓ | | ✓ | ✓ |
| L-1 | ✓ | ✓ | ✓ | | ✓ | ✓ |
| L-2 | ✓ | ✓ | ✓ | ✓ | ✓ | ✓ |
| L-3 | ✓ | ✓ | ✓ | ✓ | ✓ | ✓ |
| F-1 | | | ✓ | | ✓ | |
| F-2 | ✓ | ✓ | ✓ | | ✓ | |
| F-3 | ✓ | ✓ | | | ✓ | |

TABLE 3 hereinabove provides in tabular format the system results with respect to a typical APT campaign. In particular, out of the 8 attack scenarios, the system uncovered the drop & load activity. In all the scenarios, the disclosed system captured concrete evidence of data exfiltration, a key stage in an APT campaign. In 7 of the exemplary scenarios, commands used by the attacker to gather information about the target host were captured by the disclosed system.

Another distinctive aspect of an APT is the injection of backdoors to targets and their use for C&C and data exfiltration. In this regard, 6 of the 8 scenarios reconstructed by the disclosed system involve backdoor injection. Cleaning the attack footprint is a common element of an APT campaign. In experiments, in 5 of the 8 scenarios, the disclosed system uncovered attack cleanup activities, e.g., removing dropped executables and data files created during the attack.

TABLE 4 provided hereinbelow illustrates a summary of attack scenario reconstruction.

The two missed entities were the result of the fact that there was no effort made in advance in cataloging sensitive data files and device files. As a result, these entities were filtered out during the forward analysis and simplification steps. Once the system marked the two files correctly, they were no longer filtered out, and all of the key entities were able to be identified.

In addition to the missed entities shown in TABLE 4, the red team reported that a few other attacks and entities were missed. Some of these were in data sets that were not examined. In particular, campaign W-2 (as shown in FIG. 7) was run multiple times, and the data set(s) were examined from only one instance of it. Also, there was a third attack campaign W-3 on Windows, but the team producing Windows data sets had difficulties during W-3 that caused the attack activities not to be recorded, so that data set is omitted from the results in TABLE 7. Similarly, the team responsible for producing Linux data sets experienced some issues during campaign L-3 that caused some attack activities not to be recorded. In order to account for these anomalies, TABLE 4 counts only the subset of key entities whose names are present in the L-3 data set that was provided.

TABLE 4

| Dataset | Entry Entities | Programs Executed | Key Files | Exit Points | Correctly Identified Entities | Incorrectly Identified Entities | Missed Entities |
|---|---|---|---|---|---|---|---|
| W-1 | 2 | 8 | 7 | 3 | 20 | 0 | 0 |
| W-2 | 2 | 8 | 4 | 4 | 18 | 0 | 0 |
| L-1 | 2 | 10 | 7 | 2 | 20 | 0 | 1 |
| L-2 | 2 | 20 | 11 | 4 | 37 | 0 | 0 |
| L-3 | 1 | 6 | 6 | 5 | 18 | 0 | 0 |
| F-1 | 4 | 13 | 9 | 2 | 13 | 0 | 1 |
| F-2 | 2 | 10 | 7 | 3 | 22 | 0 | 0 |
| F-3 | 4 | 14 | 7 | 1 | 26 | 0 | 0 |
| Total | 19 | 89 | 58 | 24 | 174 | 0 | 2 |

In particular, TABLE 4 shows another way of breaking down the attack scenario reconstruction results, counting the number of key files, network connections, and programs involved in the attack. Specifically, the system counts the number of attack entry entities (including the entry points and the processes that communicate with those entry points), attack-related program executions, key files that were generated and used during the campaign, and the number of exit points used for exfiltration (e.g., network sockets). This data was compared with the ground truth, which was made available after the results were obtained. The last two columns show the incorrectly reported and missed entities, respectively.

According to the ground truth provided by the red team, the disclosed system incorrectly identified 21 entities in F-1 (scenarios graph shown in FIG. 9) that were not part of an attack. Subsequent investigation showed that the auditing system had not been shutdown at the end of the F-1 campaign, and all of these false positives correspond to testing/administration steps carried out after the end of the engagement, when the auditing system should not have been running.

False Alarms in a Benign Environment: In order to study the system's performance in a benign environment, audit data was collected from four Ubuntu Linux servers over a period of 3 to 5 days. One of these is a mail server, another is a web server, and a third is an NFS/SSH/SVN server. The focus of the evaluation was on software updates and upgrades during this period, since these updates can download code from the network, thereby raising the possibility of untrusted code execution alarms. There were four security updates (including kernel updates) performed over this period. In addition, on a fourth server, data was collected when a software upgrade was performed, resulting in changes to 110 packages. Several thousand binary and script files were updated during this period, and the audit logs contained over 30M events. All of this information is summarized in TABLE 5 provided hereinbelow.

TABLE 5

| Dataset | Log Size on Disk | # of Events | Duration hh:mm:ss | Packages Updated | Binary Files Written |
|---|---|---|---|---|---|
| Server 1 | 1.1G | 2.17M | 00:13:06 | 110 | 1.8K |
| Server 2 | 2.7G | 4.67M | 105:08:22 | 4 | 4.2K |
| Server 3 | 12G | 20.9M | 104:36:43 | 4 | 4.3K |
| Server 4 | 3.2G | 5.09M | 119:13:29 | 4 | 4.3K |

In particular, TABLE 5 hereinabove provides an illustration in tabular format of false alarms in a benign environment with software upgrades and updates. No alerts were triggered during this period. As noted in the foregoing description, policies should be configured to permit software updates and upgrades using standard means approved in an enterprise. For Ubuntu Linux, one policy rule for this was implemented: when dpkg was executed by apt-commands, or by unattended-upgrades, the process is not downgraded even when reading from files with untrusted labels. This is because both apt and unattended-upgrades verify and authenticate the hash on the downloaded packages, and only after these verifications do they invoke dpkg to extract the contents and write to various directories containing binaries and libraries. Because of this policy, all of the 10K+files downloaded were marked benign. As a result of this, no alarms were generated from their execution by the disclosed system.

Runtime and Memory Use: TABLE 6 hereinbelow shows in tabular format the runtime and memory used by the disclosed system for analyzing various scenarios.

TABLE 6

| Dataset | Duration (hh:mm:ss) | Memory Usage | Runtime Time | Speed-up |
|---|---|---|---|---|
| W-1 | 06:22:42 | 3 MB | 1.19 s | 19.3K |
| W-2 | 19:43:46 | 10 MB | 2.13 s | 33.3K |
| W-Mean | | 6.5 MB | | 26.3K |
| L-1 | 07:59:26 | 26 MB | 8.71 s | 3.3K |
| L-2 | 79:06:39 | 329 MB | 114.14 s | 2.5K |
| L-3 | 79:05:13 | 175 MB | 74.14 s | 3.9K |
| L-Mean | | 177 MB | | 3.2K |
| F-1 | 08:17:30 | 8 MB | 1.86 s | 16K |
| F-2 | 78:56:48 | 84 MB | 14.02 s | 20.2K |

TABLE 6-continued

| Dataset | Duration (hh:mm:ss) | Memory Usage | Runtime Time | Speed-up |
|---|---|---|---|---|
| F-3 | 79:04:54 | 95 MB | 15.75 s | 18.1K |
| F-Mean | | 62.3 MB | | 18.1K |

In particular, TABLE 6 shows memory use and runtime values for scenario reconstruction. The measurements were made on a Ubuntu 16.04 server with 2.8 GHz AMD Opteron 62xx processor and 48 GB main memory. Only a single core of a single processor was used. The first column shows the campaign name, while the second shows the total duration of the data set. The third column shows the memory used for the dependence graph. As described in connection with main memory dependency graph in the foregoing, a main memory representation is generated that is more compact and/or refined. This compact representation enables the disclosed system to store data spanning very long periods of time. As an example, consider campaign L-2, whose data was the most dense. The disclosed system used approximately 329 MB to store 38.5 M events spanning about 3.5 days. Across all data sets, the disclosed system required about 8 bytes of memory per event on the larger data sets, and about 20 bytes per event on the smaller data sets.

The fourth column of TABLE 6, shows the total run time, including the times for consuming the dataset, constructing the dependence graph, detecting attacks, and reconstructing the scenario. This time was measured after the engagement when all the data sets were available. During the engagement, the disclosed system was consuming the data as they were being produced. Although the data typically covers a duration of several hours to a few days, the analysis itself is very fast as compared to prior systems, taking just seconds to a couple of minutes. Because of the system's implementation of novel tags, most information required for the analysis is locally available. This is the principal reason for the performance levels that the system achieves.

The "speed-up" column in TABLE 6, illustrates the performance benefits of the disclosed system. It can be thought of as the number of simultaneous data streams that can be handled by the system, if CPU use was the only constraint. In summary, the disclosed system is able to consume and analyze audit COTS data from several OSes in real time, while retaining a small memory footprint.

Benefit of split tags for code and data: As described in the foregoing, the system maintains two trustworthiness tags for each subject, one corresponding to its code, and another corresponding to its data. By prioritizing detection and forward analysis on code trustworthiness, the system minimizes vast numbers of alarms, while greatly decreasing the size of forward analysis output.

TABLE 7 hereinbelow shows the difference between the number of alarms generated by the exemplary four detection policies with single trustworthiness tag and with the split trustworthiness (code and integrity) tags. Note that the split reduces the alarms by a factor of 100 to over 1000 in some cases.

TABLE 7

| | Untrusted execution | | Modification by low code t-tag subject | | Preparation of untrusted data for execution | | Confidential data leak | |
|---|---|---|---|---|---|---|---|---|
| Dataset | Single t-tag | Split t-tags | Single t-tag | Split t-tags | Single t-tags | Split t-tags | Single t-tag | Split t-tags |
| W-1 | 21 | 3 | 1.2K | 3 | 0 | 0 | 6.1K | 11 |
| W-2 | 44 | 2 | 3.7K | 108 | 0 | 0 | 20.2K | 18 |
| L-1 | 60 | 2 | 53 | 5 | 1 | 1 | 19 | 6 |

TABLE 7-continued

|  | Untrusted execution | | Modification by low code t-tag subject | | Preparation of untrusted data for execution | | Confidential data leak | |
|---|---|---|---|---|---|---|---|---|
| Dataset | Single t-tag | Split t-tags | Single t-tag | Split t-tags | Single t-tags | Split t-tags | Single t-tag | Split t-tags |
| L-2 | 1.5K | 5 | 19.5K | 1 | 280 | 8 | 122K | 159 |
| L-3 | 695 | 5 | 26.1K | 2 | 270 | 0 | 62.1K | 5.3K |
| Average Reduction | | 45.39x | | 517x | | 6.24x | | 112x |

In particular, TABLE 7 provides reduction in (false) alarms by maintaining separate code and data trustworthiness tags. The average reduction shows the average factor of reduction obtained for alarms generation when using split trustworthiness tag over single trustworthiness tag.

TABLE 8

| | Initial | Final | Reduction Factor | | | |
|---|---|---|---|---|---|---|
| Dataset | # of Events | # of Events | Single t-tag | Split t-tag | SYSTEM Simplif. | Total |
| W-1 | 100K | 51 | 4.4x | 1394x | 1.4x | 1951x |
| W-2 | 401K | 28 | 3.6x | 552x | 26x | 14352x |
| L-1 | 2.68M | 36 | 8.9x | 15931x | 4.7x | 74875x |
| L-2 | 38.5M | 130 | 7.3x | 2971x | 100x | 297100x |
| L-3 | 19.3M | 45 | 7.6x | 1208x | 356x | 430048x |
| F-1 | 701K | 45 | 2.3x | 376x | 41x | 15416x |
| F-2 | 5.86M | 39 | 1.9x | 689x | 218x | 150202x |
| F-3 | 5.68M | 45 | 6.7x | 740x | 170x | 125800x |
| Average Reduction | | | 4.68x | 1305x | 41.8x | 54517x |

TABLE 8 hereinabove provides a comparison of selectivity achieved using forward analysis with single trustworthiness tags, forward analysis with split code and data trustworthiness tags, and finally simplifications.

In particular, TABLE 8 shows the improvement achieved in forward analysis as a result of this split. In particular, the increased selectivity reported in column 5 of this table comes from splitting the tag. Note that often, there is a 100× to 1000× reduction in the size of the graph.

Analysis Selectivity:

TABLE 8 further shows the data reduction pipeline of the analyses in the disclosed system. The second column shows the number of original events in each campaign. These events include all the events in the system (benign and malicious) over several days with an overwhelming majority having a benign nature, unrelated to the attack. The third column shows the final number of events that go into the attack scenario graph. The fourth column shows the reduction factor when a naïve forward analysis with single trustworthiness tag (single t-tag) is used from the entry points identified by the backward analysis. Note that the graph size is very large in most cases. The fifth column shows the reduction factor using the forward analysis of the disclosed system (for example shown in FIG. 4)—which is based on split (code and data) trustworthiness tags. As can be seen from the table, the disclosed system achieved two to three orders of magnitude reduction with respect to single t-tag based analysis.

The output of forward analysis is then fed into the simplification engine. The sixth column shows the reduction factor achieved by the simplifications over the output of the forward analysis. The last column shows the overall reduction we get over original events using split (code and data) trustworthiness tags and performing the simplification.

Overall, the combined effect of all of these steps is very substantial: data sets consisting of tens of millions of edges are reduced into graphs with perhaps a hundred edges, representing five orders of magnitude reduction in the case of L-2 and L-3 data sets, and four orders of magnitude reduction on other data.

Description of Additional Attacks During Evaluation:

Scenario graphs are provided that reconstruct attack campaigns that weren't discussed in the foregoing. Specifically, attacks L-1, F-1, F-2, W-1, and L-3 are described in greater detail hereinbelow (as shown in FIGS. 8-12).

Attack L-1. In this attack (as shown in FIG. 8), firefox is exploited to drop and execute via a shell the file mozillanightly. The process mozillanightly first downloads and executes mozillaautoup, then starts a shell, which spawns several other processes (referring to audit events and/or nodes sequence number 1-33). Next, the information gathered in file netrecon.log is exfiltrated and the file removed.

Attack F-1. In this attack (as shown in FIG. 9), the nginx server is exploited to drop and execute via shell the file dropper. Upon execution, the dropper process forks a shell that spawns several processes (referring to audit events and/or nodes sequence number 1-45), which write to a file and reads and writes to sensitive files. In addition, dropper communicates with the IP of the attacker. We report in the figure the graph related to the restoration and administration carried out after the engagement, as discussed in Section 6.5.

Attack F-2. The start of this attack (as shown in FIG. 10) is similar to F-1. However, upon execution, the dropper process downloads three files named recon, sysman, and mailman. Later, these files are executed and used which are used to exfiltrate data gathered from the system (referring to audit events and/or nodes sequence number 1-39).

Attack W-1. In this attack (as shown in FIG. 11), firefox is exploited twice to drop and execute a file mozillanightly. The first mozillanightly process downloads and executes the file photosnap.exe, which takes a screenshot of the victim's screen and saves it to a png file. Subsequently, the jpeg file is exfiltrated by mozillanightly. The second mozillanightly process downloads and executes two files: 1) burnout.bat, which is read, and later used to issue commands to cmd.exe to gather data about the system; 2) mnsend.exe, which is executed by cmd.exe to exfiltrate the data gathered previously (referring to audit events and/or nodes sequence number 1-51).

Attack L-3. In this attack (as shown in FIG. 12), the file dropbearLINUX.tar is downloaded and extracted. Next, the program dropbearkey is executed to create three keys, which are read by a program dropbear, which subsequently performs exfiltration (referring to audit events and/or nodes sequence number 1-45).

Related Work:

In the following description, the disclosed system is compared with efforts from academia and open source industry tools. Comparison to proprietary products from the industry was not performed as there is scarce technical documentation available for an in-depth comparison.

Provenance tracking and Forensics Several logging and provenance tracking systems have been built to monitor the activities of a system and build provenance graphs. Among these, Backtracker is one of the first works that used dependence graphs to trace back to the root causes of intrusions [citing Samuel T King and Peter M Chen. Backtracking intrusions. In SOSP. ACM, 2003; Samuel T King, Zhuoqing Morley Mao, Dominic G Lucchetti, and Peter M Chen. Enriching intrusion alerts through multi-host causality. In NDSS, 2005]. These graphs are built by correlating events collected by a logging system and by determining the causality among system entities, to help in forensic analysis after an attack is detected.

The disclosed system improves on the techniques of Backtracker in two important ways. First, Backtracker was intended to operate in a forensic setting, whereas the analysis and data representation techniques of the disclosed system are designed towards real-time detection. Setting aside hardware comparisons, Backtracker took 3 hours for analyzing audit data from a 24-hour period, whereas the disclosed system was able to process 358 hours of logs in a little less than 3 minutes. Secondly, Backtracker relies on alarms generated by external tools, therefore its forensic search and pruning cannot leverage the reasons that generated those alarms. In contrast, the currently disclosed analysis procedures leverage the results from the principled tag-based detection methods and therefore are inherently more precise. For example, if an attack deliberately writes into a well-known log file, Backtracker's search heuristics may remove the log file from the final graph, whereas the tag-based analysis will prevent that node from being pruned away.

In a similar spirit, BEEP [citing Kyu Hyung Lee, Xiangyu Zhang, and Dongyan Xu. High accuracy attack provenance via binary-based execution partition. In NDSS, 2013] and its evolution Pro-Tracer [citing Shiqing Ma, Xiangyu Zhang, and Dongyan Xu. ProTracer: Towards practical provenance tracing by alternating between logging and tainting. In NDSS, 2016] build dependence graphs that are used for forensic analysis.

In contrast, the disclosed system and method builds dependence graphs for real-time detection from which scenario sub-graphs are extracted during a forensic analysis. The forensic analysis of BEEP and Pro-Tracer ensures more precision than Backtracker by heuristically dividing the execution of the program into execution units, where each unit represents one iteration of the main loop in the program. The instrumentation required to produce units is not always automated, making the scalability of their approach a challenge and inefficient. Whereas, the disclosed system can make use of the additional precision afforded by BEEP in real-time detection, when such information is or becomes available.

While the majority of the aforementioned systems operate at the system call level, several other systems track information flows at finer granularities. Such systems typically instrument applications (for example, using Pin [35]) to track information flows through a program. Such fine-grained tainting can provide much more precise provenance information, but at the cost of higher overhead. Whereas the disclosed approach can take advantage of finer granularity provenance, when available, to further improve accuracy.

Attack Detection: A number of recent research efforts on attack detection/prevention focus on "inline" techniques that are incorporated into the protected system, e.g., address space randomization, control-flow integrity, taint-based defenses and so on. Offline intrusion detection using logs has also been studied for a much longer period. In particular, host-based IDS using system-call monitoring and/or audit logs has been investigated by numerous research efforts.

Host-based intrusion detection techniques mainly fall into three categories: (1) misuse-based, which rely on specifications of bad behaviors associated with known attacks; (2) anomaly-based, which rely on learning a model of benign behavior and detecting deviations from this behavior; and (3) specification-based, which rely on specifications (or policies) specified by an analyst/expert. The main drawback of misuse-based techniques is that the signature-based approach is not amenable to detection of previously unseen attacks. Anomaly detection techniques avoid this drawback, but their false positives rates deter widespread deployment. Specification/policy-based techniques can reduce these false positives, but would require application-specific policies that are time-consuming to develop and/or rely on expert knowledge. Unlike these approaches, the disclosed system relies on application-independent policies. Policies are developed by implementation and analysis of provenance information computed from audit data. In particular, an audit event is analyzed to determine if it advances an attacker's high-level objectives, thereby providing a motive for the attack; while the provenance derived from the entire audit history is used to determine if the attacker had the means to influence this event.

Information Flow Control (IFC): IFC techniques assign security labels and propagate them in a manner similar to the disclosed tags. Early works, such as Bell-LaPadula and Biba, relied on strict policies. These strict policies impact usability and hence have not found favor among contemporary OSes. Although IFC is available in SELinux, it is not often used, as users prefer its access control framework based on domain-and-type enforcement. While most above works centralize IFC, decentralized IFC (DIFC) techniques emphasize the ability of principals to define and create new labels. This flexibility comes with the cost of nontrivial changes to application and/or OS code.

Although the tags are conceptually similar to those in IFC systems, the central research challenges faced in these systems are very different from the disclosed system and method. In particular, the focus of IFC systems is enforcement and prevention. A challenge for IFC enforcement is that their policies tend to break applications. Thus, most recent efforts in this regard focus on refinement and relaxation of policies so that compatibility can be preserved without weakening security. In contrast, neither enforcement nor compatibility pose challenges in the current setting. On the other hand, IFC systems do not need to address the question of what occurs when policies are violated. Yet, this is the central challenge that is faced: how to distinguish attacks from the vast number of normal activities on the system; and more importantly, once attacks do take place, how to tease apart attack actions from the vast amounts of audit data.

Alert Correlation Network IDSs often produce myriad alerts. Alert correlation analyzes relationships among alerts, to help users deal with the deluge. The main approaches, often used together, are to cluster similar alerts, prioritize alerts, and identify causal relationships between alerts. Furthermore, they require manually supplied expert knowledge about dependencies between alert types (e.g., consequences for each network IDS alert type) to identify causal relationships. In contrast, the current system is not directed to clustering/statistical techniques to aggregate alerts. Instead, the goals of the current system are to use provenance tracking to determine causal relationships between different alarms to reconstruct the attack scenario, and to do so without relying on (application-dependent) expert knowledge.

Hence, the current system and method is associated with real-time detection of attacks and attack reconstruction from COTS audit logs. In certain aspects or embodiments, the disclosed system implements a main memory graph data model and a rich tag-based policy frame-work that make its analysis both efficient and precise. The disclosed system and method was evaluated on large datasets from 3 major OSes under attack by an independent red team, efficiently reconstructing all the attacks with very few errors.

Figure 13:
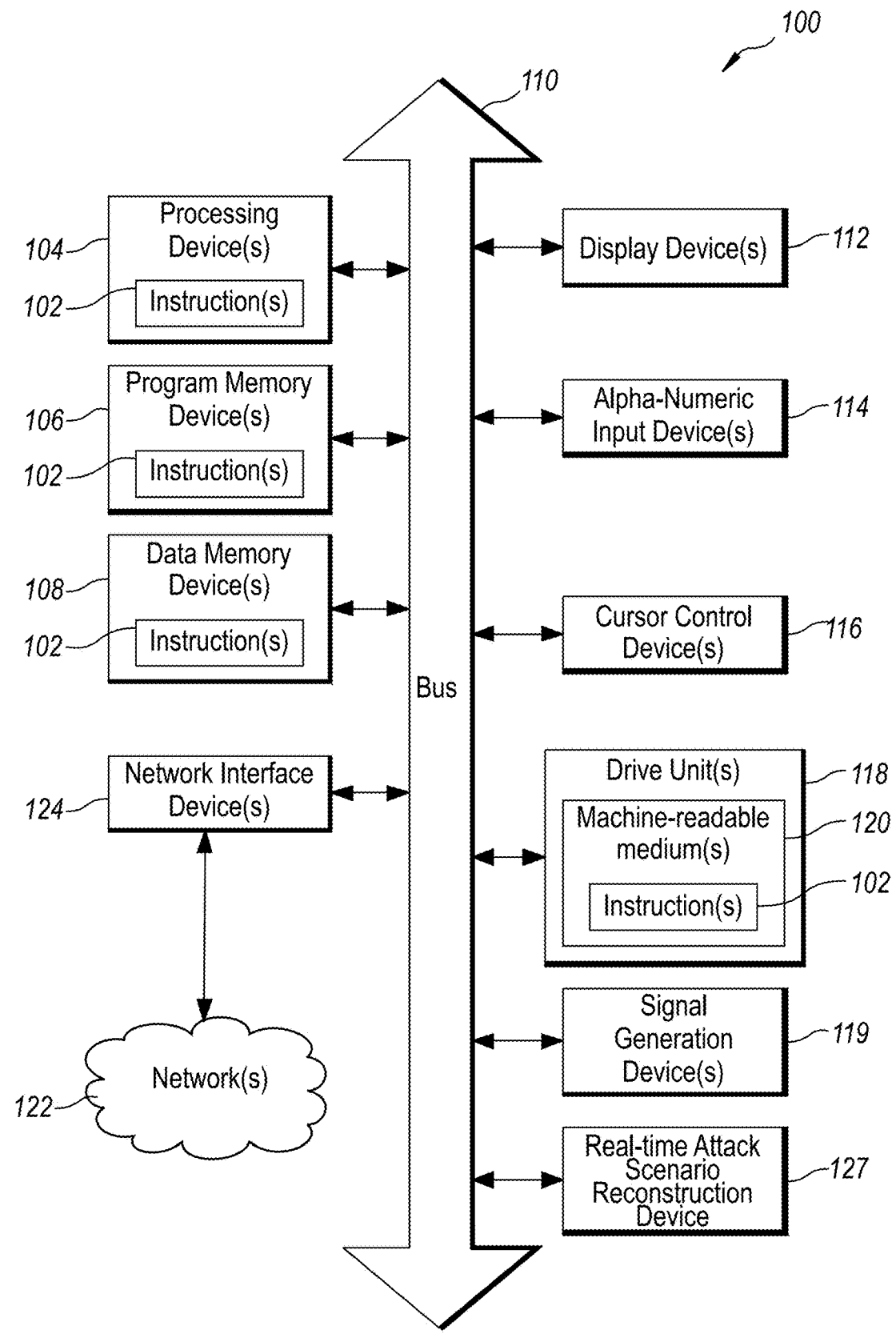
FIG. 13 illustrates a system block diagram in accordance with an embodiment of the real-time attack scenario reconstruction system, in the form of an example computing system that performs methods according to one or more embodiments.

FIG. 13 is a block diagram of an embodiment of a machine in the form of a computing system 100, within which a set of instructions 102 is stored, that when executed, causes the machine to perform any one or more of the methodologies disclosed herein. In certain embodiments, the machine operates as a standalone device. In certain embodiments, the machine may be connected (e.g., using a network) to other machines. In a networked implementation, the machine may operate in the capacity of a server or a client user machine in a server-client user network environment. In alternative embodiments, the machine operates as a standalone device and/or may be connected (e.g., networked) to other machines. In a networked deployment, the machine may operate in the capacity of either a server or a client machine in server-client network environments, or it may act as a peer machine in peer-to-peer (or distributed) network environments. The machine may comprise a server computer, a client user computer, a personal computer (PC), a tablet PC, a personal digital assistant (PDA), a cellular telephone, a mobile device, a palmtop computer, a laptop computer, a desktop computer, a communication device, a personal trusted device, a web appliance, a network router, a switch or bridge, or any machine capable of executing a set of instructions (sequential or otherwise) that specify actions to be taken by that machine. The machine may be an onboard vehicle system, wearable device, a hybrid tablet, a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

The computing system 100 may include a processing device(s) 104 (such as a central processing unit (CPU), a graphics processing unit (GPU), or both), processor cores, compute node, an engine, etc., program memory device(s) 106, and data memory device(s) 108, including a main memory and/or a static memory, which communicate with each other via a bus 110. The computing system 100 may further include display device(s) 112 (e.g., liquid crystals display (LCD), a flat panel, a solid state display, or a cathode ray tube (CRT)). The computing system 100 may further include an alphanumeric input device 114, a user interface (UI) navigation device (eg. mouse). In certain embodiments, a video display unit, input device and UI navigation device (and/or other control devices) may be incorporated into a touch screen display. The computing system 100 may include input device(s) 114 (e.g., a keyboard), cursor control device(s) 116 (e.g., a mouse), disk drive unit(s) 118, signal generation device(s) 119 (e.g., a speaker or remote control), and network interface device(s) 124.

The computer system 100 may additionally include a storage device 118 (e.g., a drive unit), a signal generation device 119 (e.g., a speaker), a real-time attack scenario reconstruction device 127 (for e.g., cyber-attack audit data analytics processor, module, engine, application, microcontroller and/or microprocessor), a network interface device 124, and one or more sensors (not shown), such as a global positioning system (GPS) sensor, compass, accelerometer, or other sensor (for e.g., touch or haptic-based sensor).

The disk drive unit(s) 118 may include machine-readable medium(s) 120, on which is stored one or more sets of instructions 102 (e.g., software) embodying any one or more of the methodologies or functions disclosed herein, including those methods illustrated herein. The instructions 102 may also reside, completely or at least partially, within the program memory device(s) 106, the data memory device(s) 108, main memory, static memory and/or within the processor, microprocessor, and/or processing device(s) 104 during execution thereof by the computing system 100. The program memory device(s) 106, main memory, static memory and/or the processing device(s) 104 may also constitute machine-readable media. Dedicated hardware implementations, not limited to application specific integrated circuits, programmable logic arrays, and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present embodiment contemplates a machine-readable medium or computer-readable medium 120 containing instructions 102, or that which receives and executes instructions 102 from a propagated signal so that a device connected to a network environment 122 can send or receive voice, video or data, and to communicate over the network 122 using the instructions 102. The instructions 102 may further be transmitted or received over a network 122 via the network interface device(s) 124. The machine-readable medium may also contain a data structure for storing data useful in providing a functional relationship between the data and a machine or computer in an illustrative embodiment of the disclosed systems and methods.

While the machine-readable medium 120 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present embodiment or that is capable of storing, encoding or carrying data structures utilized by or associated with such instructions.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include any one or more of a tangible machine-readable medium or a tangible distribution medium, as listed herein and including art-recognized equivalents and successor media, in which the software implementations herein are stored. The term "machine-readable medium" shall accordingly be taken to include, but not be limited to, solid-state memories, and optical and magnetic media.

Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 102 may further be transmitted or received over a communications network 122 using a transmission medium via the network interface device 124 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G. and 4G LTE/LTE-A or WiMAX networks). Other communications mediums include, IEEE 802.11 (including any IEEE 802.11 revisions), Cellular technology (such as GSM, CDMA, UMTS, EV-DO, WiMAX, or LTE), and/or Zigbee, Wi-Fi, Bluetooth or Ethernet, among other possibilities. The term "transmission medium" shall be taken to include any intangible medium that is capable of storing, encoding, or carrying instructions for execution by the machine, and includes digital or analog communications signals or other intangible medium to facilitate communication of such software.

Although the present specification describes components and functions implemented in the embodiments with reference to particular standards and protocols, the disclosed embodiment are not limited to such standards and protocols.

The above-described methods for the disclosed real-time attack scenario reconstruction system and method including data analytics, may be implemented on a computer, using well-known computer processors, memory units, storage devices, computer software, and other components.

In order to provide additional context for various aspects of the subject invention, FIG. 13 and the following discussion are intended to provide a brief, general description of a suitable computing environment 100 in which the various aspects of the invention can be implemented. While the disclosure has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices. The illustrated aspects of the invention may also be practiced in distributed computing environments where certain tasks are performed by remote processing devices that are linked through a communications network. In a distributed computing environment, program modules can be located in both local and remote memory storage devices. A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer. Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Figure 14:
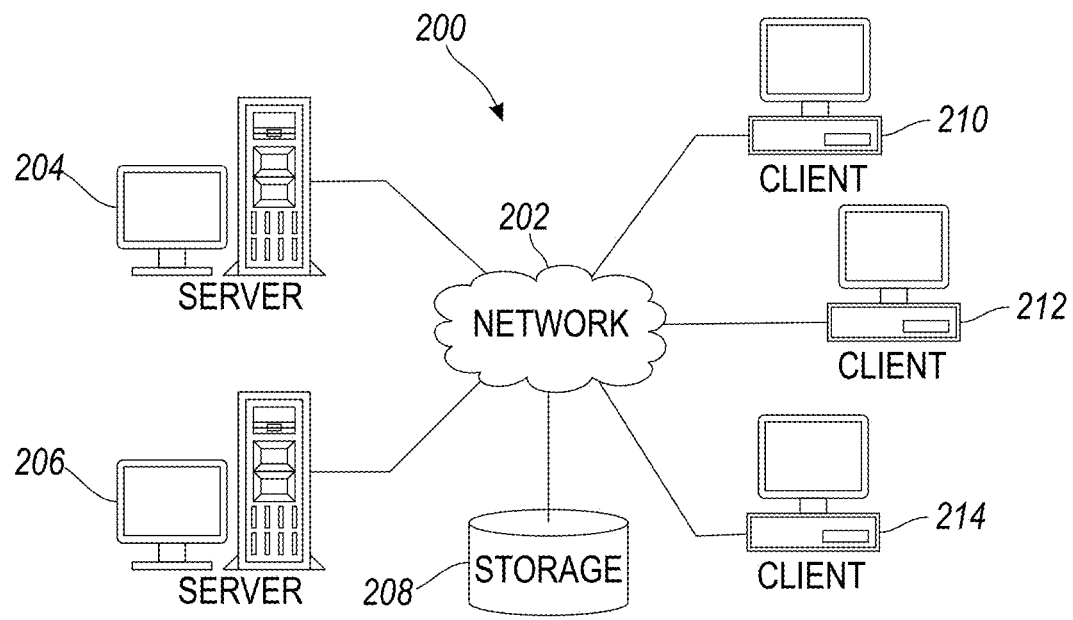
FIG. 14 illustrates an exemplary block diagram of a distributed data processing environment in which exemplary aspects of the illustrative embodiments may be implemented.
Figure 15:
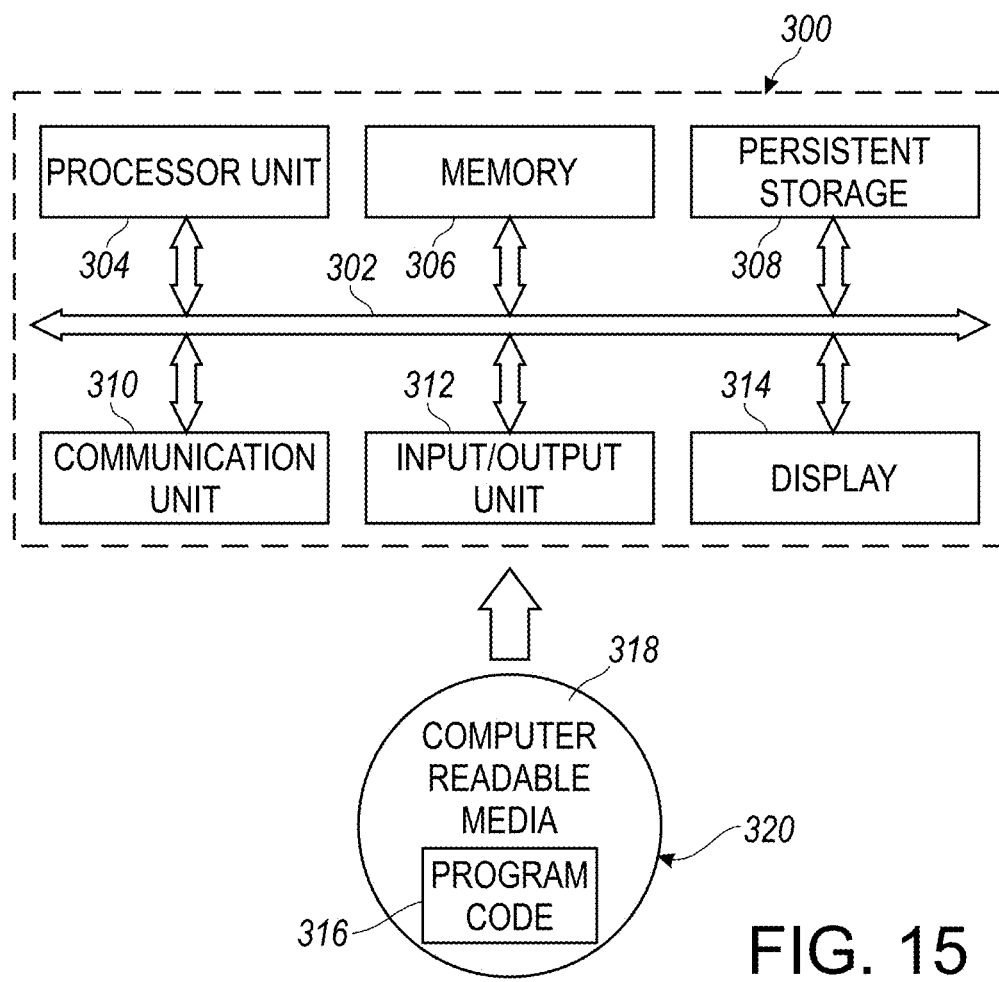
FIG. 15 illustrates an exemplary block diagram of a data processing system in which exemplary aspects of the illustrative embodiments may be implemented.

With reference now to FIGS. 14-15, exemplary diagrams of data processing environments are provided in which illustrative embodiments of the disclosure may be implemented. It should be appreciated that FIGS. 14-15 are only exemplary and are not intended to assert or imply any limitation with regard to the environments in which aspects or embodiments of the disclosed subject matter may be implemented. Many modifications to the depicted environments may be made without departing from the spirit and scope of the present invention.

FIG. 14 depicts a block diagram representation of an exemplary distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As provide above, FIG. 14 is intended as an example, not as an architectural limitation for different embodiments of the disclosed subject matter, and therefore, the particular elements shown in FIG. 14 should not be considered limiting with regard to the environments in which the illustrative embodiments of the present invention may be implemented.

With reference now to FIG. 15, a block diagram of an exemplary data processing system is shown in which aspects of the illustrative embodiments may be implemented. Data processing system 300 is an example of a computer, such as client 210 in FIG. 14, in which computer usable code or instructions implementing the processes for illustrative embodiments of the disclosure may be located.

More particularly, with reference FIG. 15, shown is a block diagram of a data processing system in which illustrative embodiments may be implemented. Data processing system 300 is an example of a computer, such as server 204 or client 210 in FIG. 14, in which computer-usable program code or instructions implementing the processes may be located for the illustrative embodiments. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor (SMP) system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer-usable program code, or computer-readable program code that may be read and executed by a processor in processor unit 304. The program code in the different embodiments may be embodied on different physical or tangible computer-readable media, such as memory 306 or persistent storage 308.

Program code 316 is located in a functional form on computer-readable media 318 that is selectively removable and may be loaded onto or transferred to data processing system 300 for execution by processor unit 304. Program code 316 and computer-readable media 318 form computer program product 320 in these examples. In one example, computer-readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer-readable media 318 also may take the form of a persistent storage, such as a hard drive, a thumb drive, or a flash memory that is connected to data processing system 200. The tangible form of computer-readable media 318 is also referred to as computer-recordable storage media. In some instances, computer-recordable media 318 may not be removable.

Alternatively, program code 316 may be transferred to data processing system 300 from computer-readable media 318 through a communications link to communications unit 310 and/or through a connection to input/output unit 312. The communications link and/or the connection may be physical or wireless in the illustrative examples. The computer-readable media also may take the form of non-tangible media, such as communications links or wireless transmissions containing the program code. The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 15 can be varied from the illustrative examples shown. As one example, a storage device in data processing system 300 is any hardware apparatus that may store data. Memory 306, persistent storage 308, and computer-readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Computer program code for carrying out operations of the present invention may be written in any combination of one or more programming languages, including an object-oriented programming language such as Java®, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 14-15 may vary depending on the implementation. Other internal hardware or peripheral devices, such as flash memory, equivalent non-volatile memory, or optical disk drives and the like, may be used in addition to or in place of the hardware depicted in FIGS. 14-15. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 14 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 15 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 16:
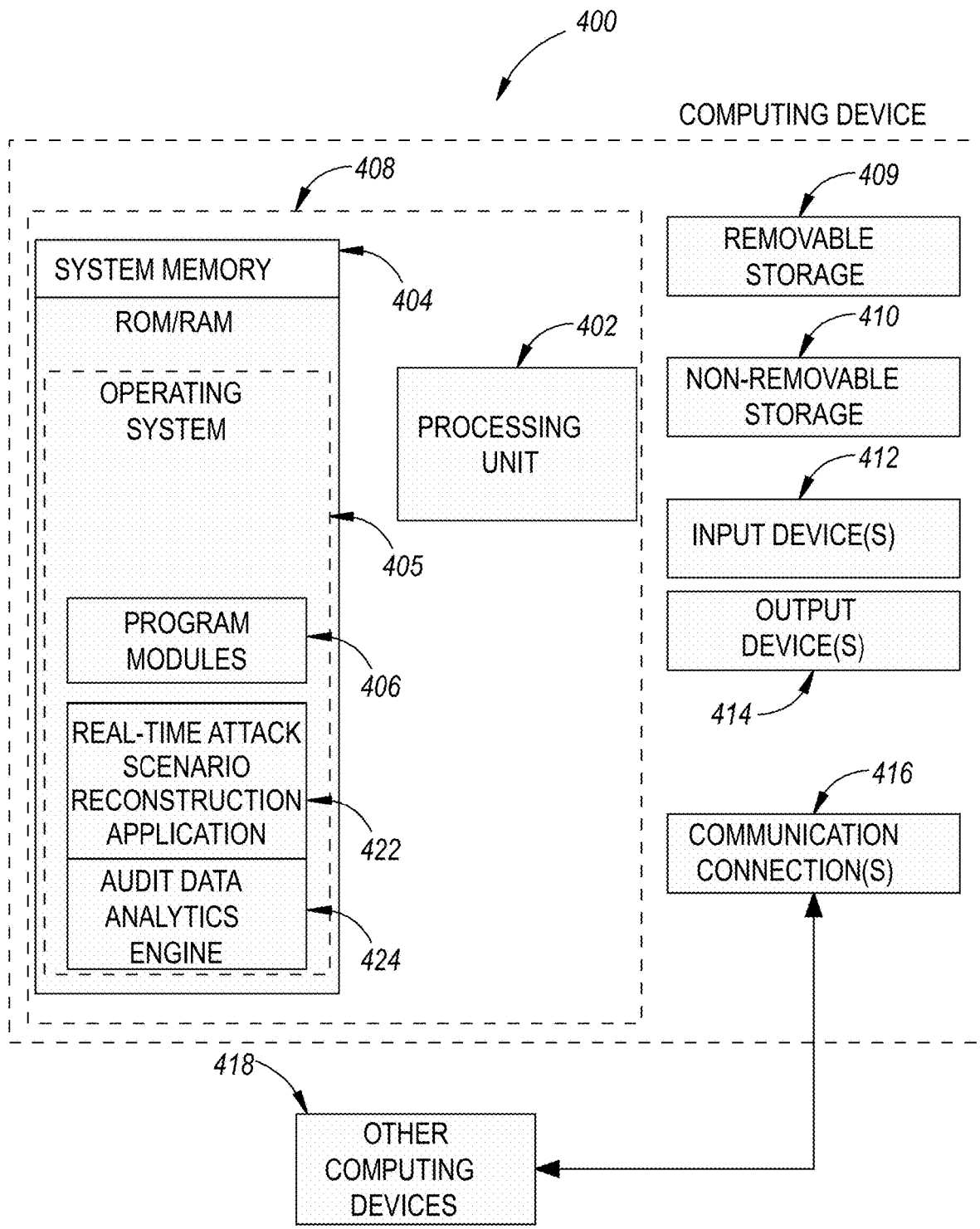
FIG. 16 illustrates a system block diagram of an example computing operating environment, where various embodiments of the disclosed system and method may be implemented.

FIG. 16 illustrates a system block diagram of an example computing operating environment, where various embodiments of the disclosed system and method may be implemented.

FIG. 16 and the below description are intended to provide a brief, general description of a suitable computing environment in which embodiments may be implemented. With reference to FIG. 16, a block diagram of an example computing operating environment for an application according to embodiments is illustrated, such as computing device 400. In a basic configuration, computing device 400 may include at least one processing unit 402 and system memory 404. Computing device 400 may also include a plurality of processing units that cooperate in executing programs. Depending on the exact configuration and type of computing device, the system memory 404 may be volatile (such as RAM), non-volatile (such as ROM, flash memory, etc.) or some combination of the two. System memory 404 typically includes an operating system 405 suitable for controlling the operation of the platform, such as the Windows® and Windows Phone® operating systems from Microsoft Corporation, Apple® IPhone, Android based or other contemplated operating systems. The system memory 404 may also include one or more software applications such as program modules 406, real-time attack scenario reconstruction application, module and/or engine 422, and audit data analytics engine 424.

A real-time attack scenario reconstruction application, module and/or engine 422 may detect a gesture interacting with a displayed visualization. A real-time attack scenario data and/or audit data analytics engine 424 of the application may determine the respective tags and/or policies for respective attack detection and/or creation of a final compact scenario graph representation that is based on root-cause and impact analysis using assigned tags to all relevant audited events. The disclosed system and method provides for effective realt-time detection of attacks and attack reconstruction from COTS audit logs on an enterprise host. The real-time cyber-attack/event scenario reconstruction application and/or engine 422 may execute one or more operations associated with detection, analysis, and reconstruction of audited events during an attack and generates a real-time cyber-attack scenario representation. The resulting representation assists an analyst by providing a refined graphical representation that permits the analyst to hone in on the source of the cyber-attack, and provides a respective mapping of all relevant events, etc. In certain aspects or embodiments, the system and method uses a main memory graph data model and a rich tag-based policy framework that renders its analysis both efficient, precise and targeted. The efficient, tag-based techniques for attack detection and reconstruction, include source identification and impact analysis. Related methods that reveal the big picture of such attacks by construction of compact, visual graphs of attack steps are implemented. This basic configuration is illustrated in FIG. 16 by those components within dashed line 408.

Computing device 400 may have additional features or functionality. For example, the computing device 400 may also include additional data storage devices (removable and/or non-removable) such as, for example, magnetic disks, optical disks, or tape. Such additional storage is illustrated in FIG. 24 by removable storage 409 and non-removable storage 410. Computer readable storage media may include volatile and nonvolatile, removable and non-removable media implemented in any method or technology for storage of information, such as computer readable instructions, data structures, program modules, or other data. Computer readable storage media is a computer readable memory device. System memory 404, removable storage 409 and non-removable storage 410 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer readable storage media may be part of computing device 400.

Computing device 400 may also comprise input device(s) 412 such as keyboard, mouse, pen, voice input device, touch input device, and comparable input devices. Output device(s) 414 such as a display, speakers, printer, and other types of output devices may also be included. These devices are well known in the art and need not be discussed at length here.

Computing device 400 may also contain communication connections 416 that allow the device to communicate with other devices 418, such as over a wireless network in a distributed computing environment, a satellite link, a cellular link, and comparable mechanisms. Other devices 418 may include computer device(s) that execute communication applications, storage servers, and comparable devices. Communication connection(s) 416 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human analytics experts and/or other operators performing same. These human operators need not be co-located with each other, but each can be only with a machine that performs a portion of the program.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computing systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computing system processing can be constructed to implement one or more of the methods or functionality as described herein.

It is also contemplated that a computer-readable medium includes instructions 102 or receives and executes instructions 102 responsive to a propagated signal, so that a device connected to a network 122 can communicate voice, video or data over the network 122. Further, the instructions 102 may be transmitted or received over the network 122 via the network interface device 124.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing or encoding a set of instructions for execution by a processor or that cause a computing system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture and store carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" or "embodiment" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus, the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

Although the present specification describes components and functions implemented in the embodiments with reference to particular standards and protocols, the disclosed embodiment are not limited to such standards and protocols.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Each of the non-limiting aspects or examples described herein may stand on its own, or may be combined in various permutations or combinations with one or more of the other examples. The above detailed description includes references to the accompanying drawings, which form a part of the detailed description. The drawings show, by way of illustration, specific embodiments in which the invention may be practiced. These embodiments are also referred to herein as "aspects" or "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like. The above description is intended to be illustrative, and not restrictive. For example, the above-described examples (or one or more aspects thereof) may be used in combination with each other. Other embodiments may be used, such as by one of ordinary skill in the art upon reviewing the above description.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

Such embodiments of the inventive subject matter may be referred to herein, individually and/or collectively, by the term "embodiment" merely for convenience and without intending to voluntarily limit the scope of this application to any single embodiment or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Those skilled in the relevant art will appreciate that aspects of the invention can be practiced with other computer system configurations, including Internet appliances, hand-held devices, cellular or mobile phones, multi-processor systems, microprocessor-based or programmable consumer electronics, network PCs, client-server environments including thin clients, mini-computers, mainframe computers and the like. Aspects of the invention can be embodied in a special purpose computer or data processor that is specifically programmed, configured or constructed to perform one or more of the computer-executable instructions or modules explained in detail below. Indeed, the term "computer" as used herein refers to any data processing platform or device.

Aspects of the invention can also be practiced in distributed computing environments, where tasks or modules are performed by remote processing devices, which are linked through a communications network. In a distributed computing environment, program modules or sub-routines may be located in both local and remote memory storage devices, such as with respect to a wearable and/or mobile computer and/or a fixed-location computer. Aspects of the invention described below may be stored and distributed on computer-readable media, including magnetic and optically readable and removable computer disks, as well as distributed electronically over the Internet or over other networks (including wireless networks). Those skilled in the relevant art will recognize that portions of the invention may reside on a server computer or server platform, while corresponding portions reside on a client computer. For example, such a client server architecture may be employed within a single mobile computing device, among several computers of several users, and between a mobile computer and a fixed-location computer. Data structures and transmission of data particular to aspects of the invention are also encompassed within the scope of the invention.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate example embodiment.

Although preferred embodiments have been described herein with reference to the accompanying drawings, it is to be understood that the disclosure is not limited to those precise embodiments and that various other changes and modifications may be affected herein by one skilled in the art without departing from the scope or spirit of the embodiments, and that it is intended to claim all such changes and modifications that fall within the scope of this disclosure.

What is claimed is:

1. A system for detecting a cyber-attack and reconstructing events associated with a cyber-attack campaign in a victim system environment, the system comprising:
   a memory configured to store instructions; and
   a processing device coupled to the memory, the processing device executing a real-time attack scenario reconstruction application with the instructions stored in memory, wherein the application is configured to:
   receive an audit data stream associated with cyber events;
   identify trustworthiness values in a portion of data associated with the cyber events;
   assign provenance tags to the portion of the data based on the identified trustworthiness values;
   generate an initial visual representation based on the assigned provenance tags to the portion of the data;
   condense the initial visual representation based on a backward traversal of the initial visual representation in identifying a shortest path from a suspect process and/or file to an entry point process and/or file; and generate a scenario visual representation that specifies processes and/or files in the victim system environment having a higher likelihood, compared to other processes and/or files in the victim system environment, of contributing to the cyber events associated with the cyber-attack based on the identified shortest path.

2. The system as recited in claim 1, wherein the system is further configured to condense the initial visual representation based on a forward traversal of the initial visual representation in identifying the shortest path from the suspect process and/or file to the entry point process and/or file.

3. The system as recited in claim 1, wherein the system is further configured to generate a scenario visual representation that specifies processes and/or files in the victim system environment having a higher likelihood, compared to other processes and/or files in the victim system environment, of contributing to the cyber events associated with the cyber-attack based on multiple identified shortest paths.

4. The system as recited in claim 1, wherein the provenance tags further comprise trustworthiness tags.

5. The system as recited in claim 1, wherein the provenance tags further comprise confidentiality tags assigned to the portion of the data based on identified confidentiality values.

6. The system as recited in claim 1, wherein the portion of the data comprises one or more of objects and subjects.

7. The system as recited in claim 6, wherein the objects are referenced within events using an index into a per-subject table of object identifiers.

8. The system as recited in claim 1, wherein the provenance tags are further assigned to the portion of the data based on identified sensitivity values.

9. A method for detecting a cyber-attack and reconstructing events associated with a cyber-attack campaign in a victim system environment, the method comprising:
a processing device coupled to a memory that stores instructions, the processing device executing a real-time attack scenario reconstruction application with the instructions stored in memory, wherein the application is configured to perform the following operations:
receiving an audit data stream associated with cyber events;
identifying trustworthiness values in a portion of data associated with the cyber events;
assigning provenance tags to the portion of the data based on the identified trustworthiness values;
generating an initial visual representation based on the assigned provenance tags to the portion of the data;
condensing the initial visual representation based on a backward traversal of the initial visual representation in identifying a shortest path from a suspect process and/or file to an entry point process and/or file; and
generating a scenario visual representation that specifies processes and/or files in the victim system environment having a higher likelihood, compared to other processes and/or files in the victim system environment, of contributing to the cyber events associated with the cyber-attack based on the identified shortest path.

10. The method as recited in claim 9, wherein the method further comprises condensing the initial visual representation based on a forward traversal of the initial visual representation in identifying the shortest path from the suspect process and/or file to the entry point process and/or file.

11. The method as recited in claim 9, wherein the method further comprises generating a scenario visual representation that specifies processes and/or files in the victim system environment having a higher likelihood, compared to other processes and/or files in the victim system environment, of contributing to the cyber events associated with the cyber-attack based on multiple identified shortest paths.

12. The method as recited in claim 9, wherein the provenance tags further comprise trustworthiness tags.

13. The method as recited in claim 9, wherein the provenance tags further comprise confidentiality tags assigned to the portion of the data based on identified confidentiality values.

14. The method as recited in claim 9, wherein the portion of the data comprises one or more of objects and subjects.

15. The method as recited in claim 14, wherein the objects are referenced within events using an index into a per-subject table of object identifiers.

16. The method as recited in claim 9, wherein the provenance tags are further assigned to the portion of the data based on identified sensitivity values.

17. A non-transitory computer-readable medium storing instructions that, when executed by a real-time attack scenario reconstruction processing device, performs operations that include:
receiving an audit data stream associated with cyber events associated with a cyber-attack in a victim system environment;
identifying trustworthiness values in a portion of data associated with the cyber events;
assigning provenance tags to the portion of the data based on the identified trustworthiness values;
generating an initial visual representation based on the assigned provenance tags to the portion of the data;
condensing the initial visual representation based on a backward traversal of the initial visual representation in identifying a shortest path from a suspect process and/or file to an entry point process and/or file; and
generating a scenario visual representation that specifies processes and/or files in the victim system environment having a higher likelihood, compared to other processes and/or files in the victim system environment, of contributing to the cyber events associated with the cyber-attack based on the identified shortest path.

18. The computer readable medium as recited in claim 17, wherein the operations further comprise condensing the initial visual representation based on a forward traversal of the initial visual representation in identifying the shortest path from the suspect process and/or file to the entry point process and/or file.

19. The computer readable medium as recited in claim 17, wherein the operations further comprise generating a scenario visual representation that specifies processes and/or files in the victim system environment having a higher likelihood, compared to other processes and/or files in the victim system environment, of contributing to the cyber events associated with the cyber-attack based on multiple identified shortest paths.

20. The computer readable medium as recited in claim 17, wherein the provenance tags further comprise trustworthiness tags.

21. The computer readable medium as recited in claim 17, wherein the provenance tags further comprise confidentiality tags assigned to the portion of the data based on identified confidentiality values.

22. The computer readable medium as recited in claim 17, wherein the portion of the data comprises one or more of objects and subjects.

23. The computer readable medium as recited in claim 22, wherein the objects are referenced within events using an index into a per-subject table of object identifiers.

24. The computer readable medium as recited in claim 17, wherein the provenance tags are further assigned to the portion of the data based on identified sensitivity values.

* * * * *